US009893865B2

(12) United States Patent
Hsieh

(10) Patent No.: US 9,893,865 B2
(45) Date of Patent: Feb. 13, 2018

(54) METHOD OF HANDLING COMMUNICATION OPERATION IN COMMUNICATION SYSTEM AND RELATED APPARATUS

(71) Applicant: Industrial Technology Research Institute, Hsinchu (TW)

(72) Inventor: Chia-Wen Hsieh, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 161 days.

(21) Appl. No.: 14/977,655

(22) Filed: Dec. 22, 2015

(65) Prior Publication Data

US 2016/0182204 A1   Jun. 23, 2016

Related U.S. Application Data

(60) Provisional application No. 62/095,717, filed on Dec. 22, 2014.

(30) Foreign Application Priority Data

Dec. 21, 2015 (TW) .............................. 104142930 A

(51) Int. Cl.
*H04L 5/00* (2006.01)
*H04L 1/18* (2006.01)
*H04W 72/04* (2009.01)

(52) U.S. Cl.
CPC .......... *H04L 5/0055* (2013.01); *H04L 1/1874* (2013.01); *H04L 1/1887* (2013.01); *H04L 1/1893* (2013.01); *H04W 72/0446* (2013.01)

(58) Field of Classification Search
None
See application file for complete search history.

(56) References Cited

U.S. PATENT DOCUMENTS 8,286,047 B2   10/2012   Che et al.
8,588,142 B2   11/2013   Seo et al.
(Continued)

FOREIGN PATENT DOCUMENTS

| CN | 103190110 | 7/2013 |
| EP | 2814196 | 12/2014 |

(Continued)

OTHER PUBLICATIONS

"Office Action of Taiwan Counterpart Application", dated Dec. 19, 2016, p. 1-p. 7, in which the listed references were cited.
(Continued)

*Primary Examiner* — Jamal Javaid
*Assistant Examiner* — Saad Khawar
(74) *Attorney, Agent, or Firm* — JCIPRNET

(57) ABSTRACT

The disclosure proposes a method of handling communication operation in communication system and related apparatus. According to one of the exemplary embodiments, the disclosure proposes a method of handling a communication operation of a mobile device in a wireless communication system, applicable to the mobile device which is configured with a plurality of serving cells comprising a first serving cell and a second serving cell by a network of the wireless communication system. The method would include receiving a first transmission in a first subframe via the first serving cell and decoding the first transmission; generating a decoding result in response to decoding the first transmission; transmitting an acknowledgement (ACK) or negative-acknowledgement (NACK) in a second subframe, wherein the ACK or NACK corresponds to the decoding result; and receiving a second transmission in a third subframe via the second serving cell wherein the second transmission is a retransmission of the first transmission.

46 Claims, 40 Drawing Sheets

(56) References Cited

U.S. PATENT DOCUMENTS

| | | | |
|---|---|---|---|
| 8,891,466 | B2 | 11/2014 | Hsieh et al. |
| 8,942,190 | B2 | 1/2015 | McBeath et al. |
| 2012/0039182 | A1 | 2/2012 | Zhou et al. |
| 2012/0188952 | A1 | 7/2012 | Baldemair et al. |
| 2012/0307689 | A1* | 12/2012 | Kim ............... H04L 1/1861 370/280 |
| 2013/0051289 | A1 | 2/2013 | Hsieh et al. |
| 2013/0083783 | A1 | 4/2013 | Gupta et al. |
| 2013/0176981 | A1 | 7/2013 | Earnshaw et al. |
| 2013/0322307 | A1 | 12/2013 | Yang et al. |
| 2014/0050086 | A1 | 2/2014 | Himayat et al. |
| 2014/0078941 | A1 | 3/2014 | Seo et al. |
| 2014/0086175 | A1 | 3/2014 | Hakola et al. |
| 2014/0092784 | A1 | 4/2014 | Khayrallah et al. |
| 2014/0185496 | A1 | 7/2014 | Wolf et al. |
| 2014/0204892 | A1 | 7/2014 | Oizumi et al. |
| 2015/0055589 | A1 | 2/2015 | Yerramalli et al. |
| 2015/0085720 | A1 | 3/2015 | Gaal et al. |
| 2015/0124740 | A1 | 5/2015 | Chen et al. |
| 2015/0131536 | A1 | 5/2015 | Kaur et al. |
| 2015/0181590 | A1* | 6/2015 | Park ............... H04L 1/1812 370/280 |
| 2016/0080963 | A1* | 3/2016 | Marinier ......... H04L 5/0053 370/252 |
| 2017/0149537 | A1* | 5/2017 | Seo ............... H04L 1/1861 |

FOREIGN PATENT DOCUMENTS

| | | |
|---|---|---|
| TW | 201230717 | 7/2012 |
| TW | 201310940 | 3/2013 |
| TW | 201511498 | 3/2015 |
| WO | 2013103274 | 7/2013 |

OTHER PUBLICATIONS

LG Electronics, "Summary of discussion on number of DL HARQ processes," 3GPP TSG RAN WG1 Meeting #77, R1-142128, R1-142128, May 19-23, 2014, pp. 1-4.

Catt, "Discussion on the number of DL HARQ processes for TDD SCell with FDD PCell," WG1 Meeting #77, R1-141980, May 19-23, 2014, pp. 1-3.

Samsung, "DL HARQ process for TDD SCell in TDD-FDD CA," 3GPP TSG RAN WG1 Meeting #77, R1-142081, May 19-23, 2014, pp. 1-2.

Itri, "Maximum number of DL HARQ processes for TDD serving cell with FDD PCell," 3GPP TSG-RAN WG1 Meeting #77, R1-142242, May 19-23, 2014, pp. 1-3.

Huawei, HiSilicon, "Maximum number of DL HARQ processes for TDD SCell with FDD PCell," 3GPP TSG RAN WG1 Meeting #77, R1-142331, May 19-23, 2014, pp. 1-2.

ITL Inc. "Discussion on the number of DL HARQ processes for TDD serving cell with FDD PCell," 3GPP TSG RAN WG1 Meeting #77, R1-142528, May 19-23, 2014, pp. 1-3.

Ericsson, Qualcomm, Huawei, Alcatel-Lucent, "Study on Licensed-Assisted Access using LTE," 3GPP TSG RAN Meeting #65, RP-141664, Sep. 9-12, 2014, pp. 1-8.

NTT Docomo, "Text proposal on Rel-13 LAA deployment scenarios for TR36.889," 3GPP TSG RAN WG1 Meeting #78bis, R1-144469, Oct. 6-10, 2014, pp. 1-2.

Ericsson, "Number of DL HARQ processes for TDD," TSG-RAN WG1 #52, R1-080891, Feb. 11-15, 2008, pp. 1-2.

"3rd Generation Partnership Project; Technical Specification Group Radio Access Network; Evolved Universal Terrestrial Radio Access (E-UTRA); Physical channels and modulation (Release 12)," 3GPP TS 36.211, V12.6.0, Jun. 2015.

"3rd Generation Partnership Project; Technical Specification Group Radio Access Network; Evolved Universal Terrestrial Radio Access (E-UTRA) Physical layer procedures (Release 12)," 3GPP TS 36.213, V12.6.0, Jun. 2015.

"3rd Generation Partnership Project; Technical Specification Group Radio Access Network; Evolved Universal Terrestrial Radio Access (E-UTRA); User Equipment (UE) radio access capabilities (Release 12)." 3GPP TS 36.306, V12.5.0, Jun. 2015.

CMCC, "Discussion on possible solutions for LAA", 3GPP TSG-RAN WG1 #79 R1-144940, Nov. 17-21, 2014, pp. 1-6.

"Office Action of Europe Counterpart Application", dated Sep. 28, 2016, p. 1-p. 23, in which the listed references were cited.

* cited by examiner

| UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 2

| UE Category | Maximum number of bits of a DL-SCH transport block received within a TTI | Total number of soft channel bits ($N_{soft}$) |
|---|---|---|
| 1 | 10296 | 250368 |
| 2 | 51024 | 1237248 |
| 3 | 75376 | 1237248 |
| 4 | 75376 | 1827072 |
| 5 | 149776 | 3667200 |
| 6 | 149776 (4 layers)<br>75376 (2 layers) | 3654144 |
| 7 | 149776 (4 layers)<br>75376 (2 layers) | 3654144 |
| 8 | 299856 | 35982720 |
| 9 | 149776 (4 layers)<br>75376 (2 layers) | 5482126 |
| 10 | 149776 (4 layers)<br>75376 (2 layers) | 5482126 |
| 11 | 149776 (64QAM, 4 layers)<br>195816 (256QAM, 4 layers)<br>75376 (64QAM, 2 layers)<br>97896 (256QAM, 2 layers) | 7308288 |
| 12 | 149776 (64QAM, 4 layers)<br>195816 (256QAM, 4 layers)<br>75376 (64QAM, 2 layers)<br>97896 (256QAM, 2 layers) | 7308288 |
| 13 | 195816 (4 layers)<br>97896 (2 layers) | 3654144 |
| 14 | 195816 (4 layers)<br>97896 (2 layers) | 3654144 |
| 15 | 391656 | 47431680 |

| UL/DL Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | 5,4 | - | - | - | - | - |
| 4 | - | - | 12,8,7,11 | 6,5,4,7 | - | - | - | - | - | - |
| 5 | - | - | 13,12,9,8,7,5,4,11,6 | - | - | - | - | - | - | - |
| 6 | - | - | 7 | 7 | 5 | - | - | 7 | 7 | - |

FIG. 12

| Set # | (Primary cell UL/DL configuration, Secondary cell UL/DL configuration) | DL-reference UL/DL Configuration |
|---|---|---|
| Set 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| Set 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| Set 3 | (3,1),(1,3) | 4 |
| | (3,2),(4,2),(2,3),(2,4) | 5 |
| Set 4 | (0,1),(0,2),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| Set 5 | (1,3) | 1 |
| | (2,3),(2,4) | 2 |
| | (3,1),(3,2) | 3 |
| | (4,2) | 4 |

FIG. 14

| | 1901 |
|---|---|
| The licensed serving cell assists at least on unlicensed serving cell | $M_{limit}$ |
| No | 8 |
| Yes | 12 |

FIG. 19A

| | 1902 |
|---|---|
| Number of Unlicensed Serving Cells of the LAA Group | $M_{limit}$ |
| 1 | 12 |
| 2 | 16 |
| ≥3 | 20 |

FIG. 19B

| | 1903 |
|---|---|
| Traffic Load of the Unlicensed Serving Cell of the LAA Group | $M_{limit}$ |
| High (1904) | 16 |
| Medium (1905) | 12 |
| Low (1906) | 8 |

FIG. 19C

| Traffic load of the unlicensed serving cell of the LAA group | The Number of Unlicensed Serving Cells of the LAA group | | |
|---|---|---|---|
| | 1 | 2 | $\geq 3$ |
| High | $M_{limit} = 16$ | $M_{limit} = 24$ | $M_{limit} = 32$ |
| Medium | $M_{limit} = 12$ | $M_{limit} = 14$ | $M_{limit} = 16$ |
| Low | $M_{limit} = 8$ | $M_{limit} = 10$ | $M_{limit} = 12$ |

FIG. 19D

| Congestion rate of the unlicensed serving cell in the LAA group | $M_{limit}$ |
|---|---|
| High | 8 |
| Medium | 12 |
| Low | 16 |

FIG. 19E

| Unlicensed serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 6 | 4 | 4 | - | - | 6 | 4 | 4 |
| 2 | - | - | 6 | 5, 4 | 4 | - | - | 6 | 5, 4 | 4 |
| 3 | - | - | 6, 5 | 5, 4 | 4 | - | - | 6 | - | 4 |
| 4 | - | - | 6, 5 | 5, 4 | 4 | - | - | 6 | 4 | 4 |
| 5 | - | - | 6, 5 | 5, 4 | 4 | - | - | 6 | 5, 4 | 4 |
| 6 | - | - | 6 | 4 | 4 | - | - | 6 | - | 4 |

FIG. 25

| Unlicensed serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | - | - | 7, 6 | - | - | - | - | 7, 6 | - | - |
| 1 | - | - | 7, 6 | 4 | - | - | - | 7, 6 | 4 | - |
| 2 | - | - | 7, 6 | 5, 4 | - | - | - | 7, 6 | 5, 4 | - |
| 3 | - | - | 7, 6 | 6, 5, 4 | - | - | - | 7, 6 | - | - |
| 4 | - | - | 7, 6 | 6, 5, 4 | - | - | - | 7, 6 | 4 | - |
| 5 | - | - | 7, 6 | 6, 5, 4 | - | - | - | 7, 6 | 6, 5, 4 | - |
| 6 | - | - | 7, 6 | 4 | - | - | - | 7, 6 | - | - |

FIG. 26

| Unlicensed serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | - | - | 7,6 | - | - | - | - | 7,6 | - | - |
| 1 | - | - | 8,7,6 | - | - | - | - | 8,7,6 | - | - |
| 2 | - | - | 8,7,4,6 | - | - | - | - | 8,7,4,6 | - | - |
| 3 | - | - | 7,6,5,4 | - | - | - | - | 8,7,6 | - | - |
| 4 | - | - | 8,7,6,5,4 | - | - | - | - | 8,7,6 | - | - |
| 5 | - | - | 8,7,6,5,4 | - | - | - | - | 8,7,6,4 | - | - |
| 6 | - | - | 7,6 | - | - | - | - | 8,7,6 | - | - |

FIG. 27

| Unlicensed serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | - | - | 11,7,6 | - | 4 | - | - | - | - | - |
| 1 | - | - | 11,8,7,6 | - | 5,4 | - | - | - | - | - |
| 2 | - | - | 11,9,8,7,6 | 5 | 5,4 | - | - | - | - | - |
| 3 | - | - | 7,6,11 | 6,5 | 5,4 | - | - | - | - | - |
| 4 | - | - | 11,8,7,6 | 6,5 | 5,4 | - | - | - | - | - |
| 5 | - | - | 11,9,8,7,6 | 6,5 | 5,4 | - | - | - | - | - |
| 6 | - | - | 11,7,6 | - | 5,4 | - | - | - | - | - |

FIG. 28

| Unlicensed serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | - | - | 12,11,7 | 7 | - | - | - | - | - | - |
| 1 | - | - | 12,11,8,7 | 7,4 | - | - | - | - | - | - |
| 2 | - | - | 12,11,9,8,7 | 7,5,4 | - | - | - | - | - | - |
| 3 | - | - | 12,11,7 | 7,6,5,4 | - | - | - | - | - | - |
| 4 | - | - | 12,8,7,11 | 6,5,4,7 | - | - | - | - | - | - |
| 5 | - | - | 12,11,9,8,7 | 7,6,5,4 | - | - | - | - | - | - |
| 6 | - | - | 12,11,7 | 7,4 | - | - | - | - | - | - |

FIG. 29

| Unlicensed serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | - | - | 12,11,7,6, | - | - | - | - | - | - | - |
| 1 | - | - | 13,12,11,8,7,6 | - | - | - | - | - | - | - |
| 2 | - | - | 13,12,11,9,8,7,6,4 | - | - | - | - | - | - | - |
| 3 | - | - | 13,12,11,7,6,5,4 | - | - | - | - | - | - | - |
| 4 | - | - | 13,12,11,8,7,6,5,4 | - | - | - | - | - | - | - |
| 5 | - | - | 13,12,9,8,7,5,4,11,6 | - | - | - | - | - | - | - |
| 6 | - | - | 13,12,11,7,6 | - | - | - | - | - | - | - |

FIG. 30

| Unlicensed serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | - | - | 7 | 7 | - | - | - | 7 | 7 | - |
| 1 | - | - | 8,7 | 7 | 5 | - | - | 7 | 7 | - |
| 2 | - | - | 8,7 | 7 | 6,5 | - | - | 7 | 7,5 | - |
| 3 | - | - | 7 | 7,6 | 6,5 | - | - | 7 | 7 | - |
| 4 | - | - | 8,7 | 7,6 | 6,5 | - | - | 7 | 7 | - |
| 5 | - | - | 8,7 | 7,6 | 6,5 | - | - | 7 | 7,6,5 | - |
| 6 | - | - | 7 | 7 | 5 | - | - | 7 | 7 | - |

FIG. 31

METHOD OF HANDLING COMMUNICATION OPERATION IN COMMUNICATION SYSTEM AND RELATED APPARATUS

CROSS REFERENCE TO RELATED APPLICATION

This application claims the priority benefit of U.S. provisional application Ser. No. 62/095,717, filed on Dec. 22, 2014, and Taiwan application serial no. 104142930, filed on Dec. 21, 2015. The entirety of each of the above-mentioned patent applications is hereby incorporated by reference herein and made a part of specification.

TECHNICAL FIELD

The present disclosure is directed to a method of handling communication operation in communication system and related apparatus.

BACKGROUND

A long-term evolution (LTE) communication system of 3rd Generation Partnership Project (3GPP) Rel-8 standard and/or the 3GPP Rel-9 standard has been developed as a successor to the universal mobile telecommunications system (UMTS) in order to further enhance the performance of the UMTS and to satisfy increasing demands of users. A LTE system would include an improved radio interface as well as improved radio network architecture to provide a high data rate, low latency, packet optimization, improved system capacity, and improved coverage over a predecessor.

FIG. 1 illustrates a typical LTE system 100 of which a radio access network (RAN) known as an evolved UTRAN (E-UTRAN) would include one or multiple evolved Node-B (eNB) 101 for communicating with one or more user equipment (UEs) 102. The E-UTRAN may communicate with a core network 103 that includes a mobility management entity (MME) 104, a serving gateway (S-GW) 105, and etc., for Non Access Stratum (NAS) control.

A LTE communication system currently has available at least two division duplexing mechanisms which would include the frequency-division duplexing (FDD) mechanism and the time-division duplexing (TDD) mechanism. When FDD is being implemented, a UE would be able to transmit and receive signals in different carriers simultaneously. When TDD is being implemented, a UE would be able to separate uplink and downlink transmissions in different time slots. Also, a TDD system may offer flexible resource utilizations through different TDD configurations.

FIG. 2 illustrates seven different UL/DL configurations currently implemented by a LTE communication system. Based on the traffic characteristic, different DL:UL ratios ranging from 2:3 to 9:1 could be selected at one time as specified in a FIG. 2. In detail, any "U" (e.g., 201) represents that the subframe is a UL subframe where UL data is transmitted, any "D" (e.g., 202) represents that the subframe is a DL subframe where DL data is transmitted, and any "S" (e.g., 203) represents that the subframe is a special subframe where control information and maybe data (according to the special subframe configuration) is transmitted.

FIG. 3A illustrates a typical downlink subframe 300 of a LTE communication system. The downlink subframe 300 may comprise a physical downlink control channel (PDCCH) 301 and physical downlink shared channel (PDSCH) 303. The PDSCH 303 is a data bearing channel which is allocated for a specific user. The indicate a downlink assignment. When a UE detects a downlink assignment in a subframe, the UE will receive a corresponding PDSCH in the same subframe. In general, a PDSCH typically is scheduled by a downlink assignment in the same subframe as shown in FIG. 3B.

The DCI 302 may indicate a downlink resource in the PDSCH 303 for scheduling a downlink resource of hybrid automatic repeat request (HARQ) process. The DCI 302 may include a field that indicates a DL HARQ process number where the related maximum numbers of DL HARQ processes ($M_{DL\_HARQ}$) are shown in FIG. 4A. As it can be seen in FIG. 4A that the (per carrier) $M_{DL\_HARQ}$ would be related to the TDD/FDD duplex setting and/or the TDD configuration operated by a communication device. For example, $M_{DL\_HARQ}$ 402 would typically be set to 8 for a FDD carrier 401. The $M_{DL\_HARQ}$ 402 would be set as 4, 7, 10, 9, 12, 15 and 6 for the TDD carrier 403 with UL/DL configurations 0, 1, 2, 3, 4, 5 and 6, respectively. Thus, 3 bits in DCI are needed to represent up to 8 HARQ processes for the FDD carrier 401, whereas for the TDD carrier 403, 4 bits in DCI are needed to represent various maximum numbers of HARQ processes according to UL/DL configurations.

FIG. 4B is a flow chart which illustrates the current LTE HARQ retransmission process. In step S411a, a base station would transmit a first transmission in a first subframe via a serving cell. In step S411b, a UE would receive a first transmission in a first subframe via a serving cell. In step S412, the UE would decode the first transmission. In step S413a, a UE would transmit an acknowledgment (ACK) or negative acknowledgment (NACK) in a second subframe wherein the ACK or NACK (ACK/NACK) is corresponding to the decoding result. In step S413b, the base station would receive an acknowledgment (ACK) or negative acknowledgment (NACK) in a second subframe corresponding to the first transmission. In step S414a, a base station would transmit a second transmission in a third subframe via the serving cell wherein the second transmission is a retransmission of the first transmission. In step S414b, the UE would receive a second transmission in a third subframe via the serving cell wherein the second transmission is a retransmission of the first transmission. For the current LTE HARQ retransmission process, when a first transmission is transmitted in a serving cell, the second transmission would also be transmitted in the same serving cell.

FIG. 5A illustrates an example of HARQ processes in FDD mode. In general, up to 8 downlink HARQ processes, or $M_{DL\_HARQ}=8$, is supported in a conventional FDD system. In FIG. 5A, each of the $P_0 \sim P_7$ signify each of the 8 DL HARQ processes. The DL process number is indicated by the field HARQ number in DCI which is a 3 bit field for FDD and a 4 bit field for TDD. Referring to FIG. 5A, in step S501, assuming that a UE receives a first transmission of a DL HARQ process $p_0$ in subframe index 0, the UE transmits an acknowledgement (ACK)/negative-acknowledge (NACK) corresponding to the first transmission of the DL HARQ process $p_0$ as soon as subframe index 4. In step S502, assuming that the UE transmits a NACK corresponding to the first transmission of the DL HARQ process $p_0$ in subframe index 4, then in step S503, the UE may receive a retransmission of the DL HARQ process $p_0$ in subframe index 8 wherein the first transmission and the retransmission is received on the same serving cell.

In FIG. 5A, during the time between the first transmission and the retransmission, UE may receive up to 8 DL HARQ processes ($P_0$~$P_7$). Therefore, the maximum number of DL HARQ process is 8 ($M_{DL\_HARQ}$=8) in a conventional FDD system.

FIG. 5B and FIG. 5C illustrates examples of a HARQ processes in TDD mode UL/DL configuration 0 and in TDD mode UL/DL configuration 5 respectively. The $M_{DL\_HARQ}$ is related to its UL/DL configuration. In FIG. 5B, the $P_0$~$P_3$ number signifies each DL HARQ process as the maximum number of DL HARQ processes is 4 in TDD mode UL/DL configuration 0; whereas in FIG. 5C, the $P_0$~$P_{14}$ number indicates that the maximum number of DL HARQ processes is 15 in TDD UL/DL configuration 5. In step S511, assuming that a UE receives a first transmission of a DL HARQ process $p_0$ in subframe index 0 of the radio frame m. In step S512, the UE transmits a NACK corresponding to the first transmission of the DL HARQ process $p_0$ in a subframe configured for uplink as soon as subframe index 4. However, there is no downlink subframe configured with 4 subframes of subframe index 4, and therefore in step S513, the UE receives a retransmission of the DL HARQ process $p_0$ in subframe index 0 of the frame m+1 wherein the first transmission and the retransmission is received on the same serving cell.

In FIG. 5B, during the time between the first transmission and the retransmission, UE may receive up to 4 DL HARQ processes ($P_0$~$P_3$). Therefore, the maximum number of DL HARQ process is 4 ($M_{DL\_HARQ}$=4) in a conventional TDD system if the UL/DL configuration is 0.

AS for the example shown in figure SC, in step S521, assuming that a UE receives a first transmission of a DL HARQ process $p_0$ in subframe index 0 of the frame m. However, there is no uplink subframe available for uplink within 4 subframes of subframe index 0, and therefore, in step S522, the UE transmits a NACK corresponding to the first transmission of the DL HARQ process $p_0$ in a next available uplink subframe which is subframe index 2 of the frame m+1. In step S523, the UE receives a retransmission of the DL HARQ process $p_0$ in subframe index 6 of the frame m+1 wherein the first transmission and the retransmission are received on the same serving cell.

In FIG. 5C, during the time between the first transmission and the retransmission, UE may receive up to 15 DL HARQ processes ($P_0$~$P_{14}$). Therefore, the maximum number of DL HARQ process is 15 ($M_{DL\_HARQ}$=15) in a conventional TDD system if the UL/DL configuration is 5.

A LTE-advanced (LTE-A) system, as its name implies, is an upgrade over Rel-8 and Rel-9 of the LTE system. A LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (MIMO), etc. For a UE and an eNB to communicate with each other in a LTE-A system, the UE and the eNB may adhere to standards developed for the LTE-A system, such as the 3GPP Rel-10 standard or later versions.

CA is introduced to the LTE-A Rel-10 system and beyond by which more than one carriers (e.g., component carriers, serving cells) may be aggregated to achieve a wider band transmission. The CA would increase bandwidth flexibility by aggregating multiple carriers. When a UE is configured with the CA, the UE has the ability to receive and/or transmit packets via one or multiple carriers to increase the overall system throughput. FIG. 6A illustrates an example of a FDD CA scheme in which 2 FDD DL serving cells are aggregated, and FIG. 6B illustrates a TDD CA scheme in which 2 TDD serving cells are aggregated. Accordingly, the LTE-A system could support a wider bandwidth up to 100 MHz by aggregating a maximum number of 5 serving cells as a maximum bandwidth of 20 MHz is available for each serving cell which is backward compatible with the 3GPP Rel-8 standard. The LTE-A system supports the CA for both contiguous and non-contiguous serving cells in which each serving cell is limited to a maximum of 110 resource blocks. The CA would thus increase bandwidth flexibility by aggregating the serving cells.

When a UE is configured with the CA, the UE has the ability to receive and/or transmit packets via one or multiple serving cells, or namely configured component carriers (CCs), to increase its transmission throughput. If the FDD mode is being implemented in a LTE-A system, it is possible for an eNB to configure a UE for different numbers of uplink (UL) and downlink (DL) serving cells. Otherwise if the TDD mode is being implemented in the LTE-A system, it is possible for an eNB to configure the UE with different TDD UL/DL configurations for different serving cells.

Moreover, serving cells configured to a UE in the FDD mode would typically include one or only one DL primary serving cell (DL PCell) and one or only one UL primary serving cell (UL PCell). As for operating in the TDD mode, the serving cells configured to a UE would typically include one or only one PCell and one or more secondary serving cell (SCell). The number of the configured SCell is arbitrary and would typically be related to UL and/or DL aggregation capabilities of the UE and available radio resources.

The hybrid automatic repeat request (HARQ) process has been used in a LTE system to provide efficient and reliable communications. As being different from an automatic repeat request (ARQ) process, a forward correcting code (FEC) has been used for a HARQ process. For example, a mobile device may feedback a positive acknowledgment (ACK) to inform a network that a packet has been received correctly by the mobile device assuming that the mobile device has decoded the packet correctly. Oppositely, the mobile device may feedback a negative acknowledgment (NACK) to the network if the mobile device cannot decode the packet correctly. Under the circumstance in which NACK has been received by a UE, the UE may store a part or the whole of a received data packet in a soft buffer of the UE.

A soft buffer size of a UE could be indicated by the total number of soft channel bits ($N_{soft}$) and is a function of its UE category as illustrated in FIG. 7. The detailed descriptions with regard to specific operations related to FIG. 7 are described in 3GPP TS 36.306, "E-UTRA; User Equipment (UE) radio access capabilities (Release 12)" which is incorporated by reference. In response to receiving a retransmitted packet from a wireless transmitter of another wireless node, the UE may combine the soft values of the retransmitted packet and the stored packet. The receiver of the UE may decode the packets by using the combined soft values. Furthermore, the combination of a one or more former erroneously received packets and a currently received packet would increase the probability of a successful decode. The UE would continue the HARQ process until a packet is decoded correctly or until a maximum number of retransmissions have been sent. When the maximum number of retransmissions has been exhausted, the HARQ process would produce a failure and the consequently the UE may allow the ARQ process of a radio link control (RLC) to try again. In other words, the space of a soft buffer would be reserved for the HARQ process such that the UE could store results of a HARQ process which has not been decoded correctly. Otherwise, if a soft buffer is fully occupied, the HARQ could potentially be hindered. When multiple packets are transmitted to the UE, the UE would normally need to store multiple HARQ processes because of unsuccessful attempts of decoding packets.

As stated previously, a UE could store a maximum of 8 HARQ processes per serving cell in a soft buffer in a LTE/LTE-A system. Each HARQ process may carry at least one packet. A packet could be, for example, a transport block in a LTE system. A transport block (TB) is a data unit transmitted on a PDSCH (e.g., 303) from an eNB (e.g., 101) to at least one UE (e.g., 102) in a LTE radio subframe. Each LTE radio subframe has the duration of 1 millisecond (ms). Each LTE radio frame is 10 ms and contains 10 LTE radio subframes. When operating under a method of multiple input multiple output (MIMO) such as spatial multiplexing for example, more than one transport blocks could be transmitted per transmission time interval (TTI) for a UE. Thus, a soft buffer partition method in a network comprising at least one serving cell is introduced as follows.

The following descriptions are made with reference to FIG. 4A and FIG. 7. According to 3GPP TS 36.213, "E-UTRA; Physical layer procedures (Release 12)" which is incorporated by reference, $N_{soft}$ could be divided into multiple partitions for storing soft channel bits according to:

$$n_{SB} = \min\left(N_{cb}, \left\lfloor \frac{N_{soft}}{C \cdot N_{cells}^{DL} \cdot K_{MIMO} \cdot \min(M_{DL\_HARQ}, M_{limit})} \right\rfloor\right)$$ (Equation 1)

To describe more plainly, for FDD, TDD and FDD-TDD, if a UE is configured with more than one serving cell or if a UE is configured with a secondary cell group (SCG), then for each serving cell, for at least ($K_{MIMO} \cdot \min(M_{DL\_HARQ}, M_{limit})$) transport blocks, upon detecting a decoding failure of a code block of a transport block, the UE may store received soft channel bits corresponding to a range of at least $n_{SB}$ soft channel bits, where:
C is the number of code blocks of the transport block (TB).
$N_{cb}$ is the size of code block of the transport block (TB).
$K_{MIMO}$ is the maximum number of transport blocks transmittable to the UE in the TTI of the serving cell.
$M_{limit}$ is a positive value which equals to 8.
$M_{DL\_HARQ}$ is the maximum number of DL HARQ processes as shown in FIG. 4.
$N_{cells}^{DL}$ is the number of configured serving cells across both mandatory cell group
(MCG) and secondary cell group (SCG) if the UE is configured with a SCG; otherwise,
$N_{cells}^{DL}$ is the number of configured serving cells.
$\min(M_{DL\_HARQ}, M_{limit})$ compares $M_{DL\_HARQ}$ and $M_{limit}$ and returns the smaller one of $M_{DL\_HARQ}$ and $M_{limit}$.

FIG. 8 illustrates the steps of a conventional method of soft buffer partitioning. As shown in Equation 1, the soft buffer is partitioned for each configured serving cell and/or each cell group while the UE is configured with more than one serving cell or if the UE is configured with a secondary cell group (SCG). The soft buffer is partitioned according to the following steps:

In step S801, the UE would determine the total number of soft channel bits ($N_{soft}$) and the number of DL serving cells ($N_{cells}^{DL}$).

In step S802, the UE may divide the entire soft buffer into $N_{cells}^{DL}$ sub-blocks of soft buffer for each serving cell if the UE is configured $N_{cells}^{DL}$ serving cells wherein each sub-block of soft buffer with a size $$\left\lfloor \frac{N_{soft}}{N_{cells}^{DL}} \right\rfloor.$$

In step S803, the UE may further divide each sub-block of soft buffer into $\min(M_{DL\_HARQ}, M_{limit})$ partitions for a HARQ process wherein each partition for a HARQ process with a size $$\left\lfloor \frac{N_{soft}}{N_{cells}^{DL} \cdot \min(M_{DL\_HARQ}, M_{limit})} \right\rfloor.$$

For example, if a UE is configured $N_{cells}^{DL}$ serving cells, the soft buffer is partitioned for the $N_{cells}^{DL}$ serving cells. In other words, the entire soft buffer may be divided into $N_{cells}^{DL}$ sub-blocks for each serving cell if the UE is configured $N_{cells}^{DL}$ serving cells where each sub-block of soft buffer has a size of $$\left\lfloor \frac{N_{soft}}{N_{cells}^{DL}} \right\rfloor.$$

For each serving cell, up to $\min(M_{DL\_HARQ}, M_{limit})$ HARQ processes could be stored in the soft buffer, and the soft buffer size for each HARQ process is at least $$\left\lfloor \frac{N_{soft}}{N_{cells}^{DL} \cdot \min(M_{DL\_HARQ}, M_{limit})} \right\rfloor$$

soft channel bits. Furthermore, for each transport block within the HARQ process, the soft buffer size for each HARQ process is at least $$\left\lfloor \frac{N_{soft}}{N_{cells}^{DL} \cdot K_{MIMO} \cdot \min(M_{DL\_HARQ}, M_{limit})} \right\rfloor$$

soft channel bits.

An application of the concept of FIG. 8 is shown in FIG. 9 which illustrates the steps of a conventional soft buffer partitioning in a FDD system with 3 DL serving cells (one DL PCell and two DL SCells), and thus $N_{cells}^{DL}$ is equal to 3. In this FDD example, $M_{DL\_HARQ}$ is equals to 8 for each DL serving cell, and transmit diversity is configured to the UE; hence, $K_{MIMO}$ is set to be 1. Referring FIG. 8 and FIG. 9 together, the soft buffer is partitioned as follows. In step S801, the UE would determine the total number of soft channel bits ($N_{soft}$) (e.g., 905) and the number of DL serving cells (e.g., $N_{cells}^{DL}$=3). In step S802, the UE may divide the entire soft buffer into 3 sub-blocks (e.g., 902, 903, 904) of soft buffer for each serving cell if the UE is configured 3 serving cells wherein each sub-block of soft buffer with a size $$\left\lfloor \frac{N_{soft}}{3} \right\rfloor.$$

In step S803, the UE may further divide each sub-block of soft buffer into 8 partitions for a HARQ process wherein each partition (e.g., 901) for a HARQ process with a size $$\left\lfloor \frac{N_{soft}}{24} \right\rfloor.$$

Referring to FIG. 9, the UE would divides the entire soft buffer into 3 sub-blocks of soft buffer including 1$^{st}$ sub-block 902, 2$^{nd}$ sub-block 903, and 3$^{rd}$ sub-block 904 for each serving cell if the UE is configured with 3 serving cells. Each sub-block of soft buffer is divided into 8 partitions (e.g., 1-1~1-8 for the 1$^{st}$ sub-block 902, 2-1~2-8 for the 2$^{nd}$ sub-block 903, 3-1~3-8 for the 3$^{rd}$ sub-block 904) for a HARQ process wherein each partition for a HARQ process with a size $$\left\lfloor \frac{N_{soft}}{24} \right\rfloor.$$

The 1$^{st}$ sub-block 902 could be for a PCell, the 2$^{nd}$ sub-block 903 could be for a first SCell, and the 3$^{rd}$ sub-block 904 could be for a second SCell.

As an application of FIG. 8, FIG. 10 illustrates the steps of a conventional soft buffer partitioning in a TDD system with 3 TDD serving cells. In this example, the 3 TDD serving cells would include a PCell with UL/DL configuration 0 and two SCells with UL/DL configuration 5, and thus $N_{cells}^{DL}$ is equal to 3. In this example, $M_{DL\_HARQ}$ is equals to 4 and 15 for the PCell and SCells respectively. And transmit diversity is configured to the UE; hence, $K_{MIMO}$ is set to be 1. Referring to FIG. 8 and FIG. 10 together, the soft buffer is partitioned as follows. In step S801, the UE would determine the total number of soft channel bits ($N_{soft}$) (e.g., 1006) and the number of DL serving cells (e.g., $N_{cells}^{DL}$=3). In step S802, the UE may divide the entire soft buffer into 3 sub-blocks (e.g., 1003, 1004, 1005) of soft buffer for each serving cell if the UE is configured 3 serving cells wherein each sub-block of soft buffer with a size $$\left\lfloor \frac{N_{soft}}{3} \right\rfloor.$$

In step S803, the UE may further divide each sub-block of soft buffer into min($M_{DL\_HARQ}$,$M_{limit}$) partitions (e.g., 1001, 1002) for a HARQ process wherein each partition for a HARQ process with a size $$\left\lfloor \frac{N_{soft}}{3 \cdot \min(M_{DL\_HARQ}, M_{limit})} \right\rfloor.$$

For PCell, each partition (e.g., 1001) for a HARQ process has a size $$\left\lfloor \frac{N_{soft}}{12} \right\rfloor.$$

For SCell, each partition (e.g., 1002) for a HARQ process has a size $$\left\lfloor \frac{N_{soft}}{24} \right\rfloor.$$

Referring to FIG. 10, the entire soft buffer 1006 is divided into 3 sub-blocks of soft buffer (1$^{st}$ sub-block 1003, 2$^{nd}$ sub-block 1004, and 3$^{rd}$ sub-block 1005) for each serving cell if the UE is configured 3 serving cells. For PCell, the sub-block of soft buffer is divided into 4 partitions (1-1~1-4 for the 1$^{st}$ sub-block 1003 for a HARQ process wherein each partition for a HARQ process with a size $$\left\lfloor \frac{N_{soft}}{12} \right\rfloor.$$

For SCell, the sub-block of soft buffer is divided into 8 partitions (2-1~2-8 for the 2$^{nd}$ sub-block 1004, 3-1~3-8 for the 3$^{rd}$ sub-block 1005) for a HARQ process wherein each partition for a HARQ process with a size $$\left\lfloor \frac{N_{soft}}{24} \right\rfloor.$$

The 1$^{st}$ sub-block 1003 would be for the PCell, the 2$^{nd}$ sub-block 1004 would be for the first SCell, and the 3$^{rd}$ sub-block 1005 would be for the second SCell.

FIG. 11 illustrates a conventional DL HARQ ACK or NACK (ACK/NACK) feedback timeline in a FDD system. For a FDD system, a UE transmits a HARQ ACK/NACK feedback in response to at least one PDSCH transmission in subframe n to report a DL HARQ transmission indicated by a corresponding DL control channel (e.g., physical downlink control channel (PDCCH) or enhanced physical downlink control channel (ePDCCH)) within subframe n−4. As shown in FIG. 11, the ACK/NACK response would be transmitted within 4 subframes of an initial transmission.

As for a TDD single serving cell system, the downlink association set index K: $\{k_0, k_1, \ldots, k_{M-1}\}$ for TDD of FIG. 12 would apply wherein M is the number of elements in the downlink association set, and the downlink association set comprising at least one element. The detailed descriptions related to the application of FIG. 12 could be seen in Table 10.1.3.1-1 of TS 36.213 which is incorporated by reference. Essentially, a UE would transmit a HARQ ACK or NACK (ACK/NACK) feedback in response to at least one PDSCH transmission in subframe n 1202 to report a DL HARQ transmission as indicated by a corresponding DL control channel (e.g., physical downlink control channel (PDCCH) or enhanced physical downlink control channel (ePDCCH)) within subframe n−k where k∈K related to its UL/DL configuration 1201 of the serving cell. In plain language, for configuration 0 as an example, a UE would transmit a DL HARQ ACK/NACK feedback in subframe index 1202 n=4 in response to receiving a transmission in subframe index 0 (4−4=0). Similarly, a UE would transmit a HARQ ACK/NACK feedback in subframe index 7 and 9 in response to receiving a transmission in subframe index 1 (i.e., 7−6=1) and subframe index 5 (i.e., 9−4=5) respectively.

FIG. 13A illustrates DL HARQ ACK or NACK (ACK/NACK) feedback timeline in a TDD single serving cell system which is configured with UL/DL configuration 0. Referring to both FIG. 12 and FIG. 13A, a UE would transmit a DL HARQ ACK/NACK feedback in response to at least one physical DL shared channel (PDSCH) transmission in subframe n to report DL HARQ transmission indicated by a corresponding DL control channel (e.g., physical downlink control channel (PDCCH) or enhanced physical downlink control channel (ePDCCH)) within subframe n−k where k∈K related to its UL/DL configuration 0. In this example, the UE would transmit a DL HARQ ACK/NACK feedback in subframe 4, 7, or 9 of frame m in order to report DL HARQ transmission which is indicated by a corresponding DL control channel (e.g., physical downlink control channel (PDCCH) or enhanced physical downlink control channel (ePDCCH)) within subframe 0, 1, or 5 of frame m. Subsequently the UE would transmit DL HARQ ACK/NACK feedback in subframe 2 of frame m+1 in order to report DL HARQ transmission indicated by a corresponding DL control channel (e.g., physical downlink control channel (PDCCH) or enhanced physical downlink control channel (ePDCCH)) within subframe 6 of frame m.

In the example as illustrated by FIG. 13, the transmission of a HARQ ACK/NACK would be delayed because of the unavailability of an uplink subframe within 4 subframes. The special subframe "S" would be considered as a downlink subframe. Similar concept would be applicable for DL HARQ ACK/NACK feedback timeline in a TDD single serving cell system which is configured with UL/DL configuration 1 as illustrated in FIG. 13B.

FIG. 13C illustrates DL HARQ ACK or NACK (ACK/NACK) feedback timeline in a TDD single serving cell system which is configured with UL/DL configuration 5. For FIG. 13C, a UE would transmit a DL HARQ ACK/NACK feedback in response to at least one PDSCH transmission in subframe n in order to report DL HARQ transmission indicated by a corresponding DL control channel (e.g., physical downlink control channel (PDCCH) or enhanced physical downlink control channel (ePDCCH)) within subframe n−k where k∈K related to its UL/DL configuration 5. In this example, UE should transmit DL HARQ ACK/NACK feedback in subframe 2 of frame m+2 to report DL HARQ transmission indicated by a corresponding DL control channel (e.g., physical downlink control channel (PDCCH) or enhanced physical downlink control channel (ePDCCH)) within subframe 9 of frame m and DL HARQ transmission indicated by a corresponding DL control channel (e.g., physical downlink control channel (PDCCH) or enhanced physical downlink control channel (ePDCCH)) within subframe 0/1/3/4/5/6/7/8 of frame m+1.

For TDD inter-band CA case, at least one SCell may be configured with a different UL/DL configuration from the PCell. In this particular situation, for a serving cell c, a UE may transmit a DL HARQ ACK or NACK (ACK/NACK) feedback in response to at least one physical DL shared channel (PDSCH) transmission in subframe n in order to report DL HARQ transmission indicated by a corresponding DL control channel (e.g., physical downlink control channel (PDCCH) or enhanced physical downlink control channel (ePDCCH)) within subframe n−k where k∈$K_C$ related to its DL-reference UL/DL configuration of the serving cell wherein $K_C$ is the downlink association set of the serving cell c. Moreover, the determination of $K_C$ according to its DL-reference UL/DL configuration is described as follows.

For PCell, DL-reference UL/DL configuration is PCell's UL/DL configuration. For SCell, DL-reference UL/DL configuration is determined according to FIG. 14. FIG. 14 illustrates different sets 1401 of DL-reference UL/DL configurations 1403 for serving cell based on one or more pairs formed by primary cell UL/DL configuration and secondary cell UL/DL configuration 1402.

As an example, FIG. 15 illustrates DL HARQ ACK or NACK (ACK/NACK) feedback timeline in a TDD CA system in which the PCell 1501 is configured with UL/DL configuration 0 and SCell 1502 is configured with UL/DL configuration 5. Thus, DL-reference UL/DL configuration of PCell 1501 is UL/DL configuration 0 and DL-reference configuration of SCell 1502 is UL/DL configuration 5, as shown in FIG. 15. Since the DL HARQ ACK/NACK feedback timeline is determined according to the serving cell's DL-reference UL/DL configuration, DL HARQ ACK/NACK feedback timeline of PCell and SCell is UL/DL configuration 0 and 5 respectively. Because different UL/DL configurations are configured to different serving cells, the DL HARQ ACK/NACK feedback corresponding to the same subframe may be transmitted on different subframes according to the corresponding DL-reference UL/DL configurations. In the scenario of FIG. 15, since a UE may receive DL HARQ process in subframe 0 of frame m of both serving cells, the UE may transmit the corresponding DL HARQ ACK/NACK feedback of PCell's DL HARQ process on subframe 4 of frame m, and the UE may transmit the corresponding DL HARQ ACK/NACK feedback of SCell's DL HARQ process on subframe 2 of frame m+1.

SUMMARY OF THE DISCLOSURE

Accordingly, the disclosure is directed to a method of handling communication operation in communication system and related apparatus.

In one of the exemplary embodiments, the disclosure proposes a method of handling communication operation in communication system and related apparatus. According to one of the exemplary embodiments, the disclosure proposes a method of handling a communication operation of a mobile device in a wireless communication system, applicable to the mobile device which is configured with a plurality of serving cells comprising a first serving cell and a second serving cell by a network of the wireless communication system. The method would include receiving a first transmission in a first subframe via the first serving cell and decoding the first transmission; generating a decoding result in response to decoding the first transmission; transmitting an acknowledgement (ACK) or negative-acknowledgement (NACK) in a second subframe, wherein the ACK or NACK (ACK/NACK) corresponds to the decoding result; and receiving a second transmission in a third subframe via the second serving cell, wherein the second transmission is a retransmission of the first transmission.

In one of the exemplary embodiments, the disclosure proposes a method of handling a communication operation of a mobile device in a wireless communication system for a network of the wireless communication system, applicable to a network which configures the mobile device with a plurality of serving cells comprising a first serving cell and a second serving cell. The method would include transmitting a first transmission in a first subframe via the first serving cell; receiving an acknowledgement (ACK) or negative-acknowledgement (NACK) in a second subframe wherein the ACK or NACK (ACK/NACK) is corresponding to the first transmission; and transmitting a second transmission in a third subframe via the second serving cell wherein the second transmission is a retransmission of the first transmission.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 illustrates UL/DL configurations currently implemented by a LTE communication system.

FIG. 7 illustrates a soft buffer size of a UE as indicated by the total number of soft channel bits as a function of its UE category.

FIG. 12 illustrates the downlink association set index K: $\{k_0, k_1, \ldots, k_{M-1}\}$ for TDD.

FIG. 14 illustrates different sets of DL-reference UL/DL configurations for secondary serving cell based on one or more pairs formed by primary cell UL/DL configuration and secondary cell UL/DL configuration.

FIG. 19A illustrates determining $M_{limit}$ based on whether a licensed serving cell assists at least one unlicensed serving cell in accordance with the third exemplary embodiment of the disclosure.

FIG. 19B illustrates determining $M_{limit}$ based on the number of unlicensed serving cells of a LAA group in accordance with the third exemplary embodiment of the disclosure.

FIG. 19C illustrates determining $M_{limit}$ based on traffic load of the unlicensed serving cell of the LAA group in accordance with the third exemplary embodiment of the disclosure.

FIG. 19D illustrates determining $M_{limit}$ based on the permutation of the traffic load on the unlicensed serving cell of the LAA group and the number of unlicensed serving cells of the LAA group in accordance with the third exemplary embodiment of the disclosure.

FIG. 19E illustrates determining $M_{limit}$ based on the congestion rate of the unlicensed serving cell in the LAA group in accordance with the third exemplary embodiment of the disclosure.

FIG. 25 illustrates a modified downlink associated set index $K_0$: $\{k_0, k_1, \ldots, k_{M-1}\}$ for the unlicensed TDD serving cell when the unlicensed TDD serving cell is assisted by the licensed TDD serving cell wherein the licensed TDD serving cell is configured with UL/DL configuration 0.

FIG. 26 illustrates a modified downlink associated set index $K_1$: $\{k_0, k_1, \ldots, k_{M-1}\}$ for the unlicensed TDD serving cell when the unlicensed TDD serving cell is assisted by the licensed TDD serving cell wherein the licensed TDD serving cell is configured with UL/DL configuration 1.

FIG. 27 illustrates a modified downlink associated set index $K_2$: $\{k_0, k_1, \ldots, k_{M-1}\}$ for the unlicensed TDD serving cell when the unlicensed TDD serving cell is assisted by the licensed TDD serving cell wherein the licensed TDD serving cell is configured with UL/DL configuration 2.

FIG. 28 illustrates a modified downlink associated set index $K_3$: $\{k_0, k_1, \ldots, k_{M-1}\}$ for the unlicensed TDD serving cell when the unlicensed TDD serving cell is assisted by the licensed TDD serving cell wherein the licensed TDD serving cell is configured with UL/DL configuration 3.

FIG. 29 illustrates a modified downlink associated set index $K_4$: $\{k_0, k_1, \ldots, k_{M-1}\}$ for the unlicensed TDD serving cell when the unlicensed TDD serving cell is assisted by the licensed TDD serving cell wherein the licensed TDD serving cell is configured with UL/DL configuration 4.

FIG. 30 illustrates a modified downlink associated set index $K_5$: $\{k_0, k_1, \ldots, k_{M-1}\}$ for the unlicensed TDD serving cell when the unlicensed TDD serving cell is assisted by the licensed TDD serving cell wherein the licensed TDD serving cell is configured with UL/DL configuration 5.

FIG. 31 illustrates a modified downlink associated set index $K_6$: $\{k_0, k_1, \ldots, k_{M-1}\}$ for the unlicensed TDD serving cell when the unlicensed TDD serving cell is assisted by the licensed TDD serving cell wherein the licensed TDD serving cell is configured with UL/DL configuration 6.

DETAILED DESCRIPTION OF DISCLOSED EMBODIMENTS

Figure 1:
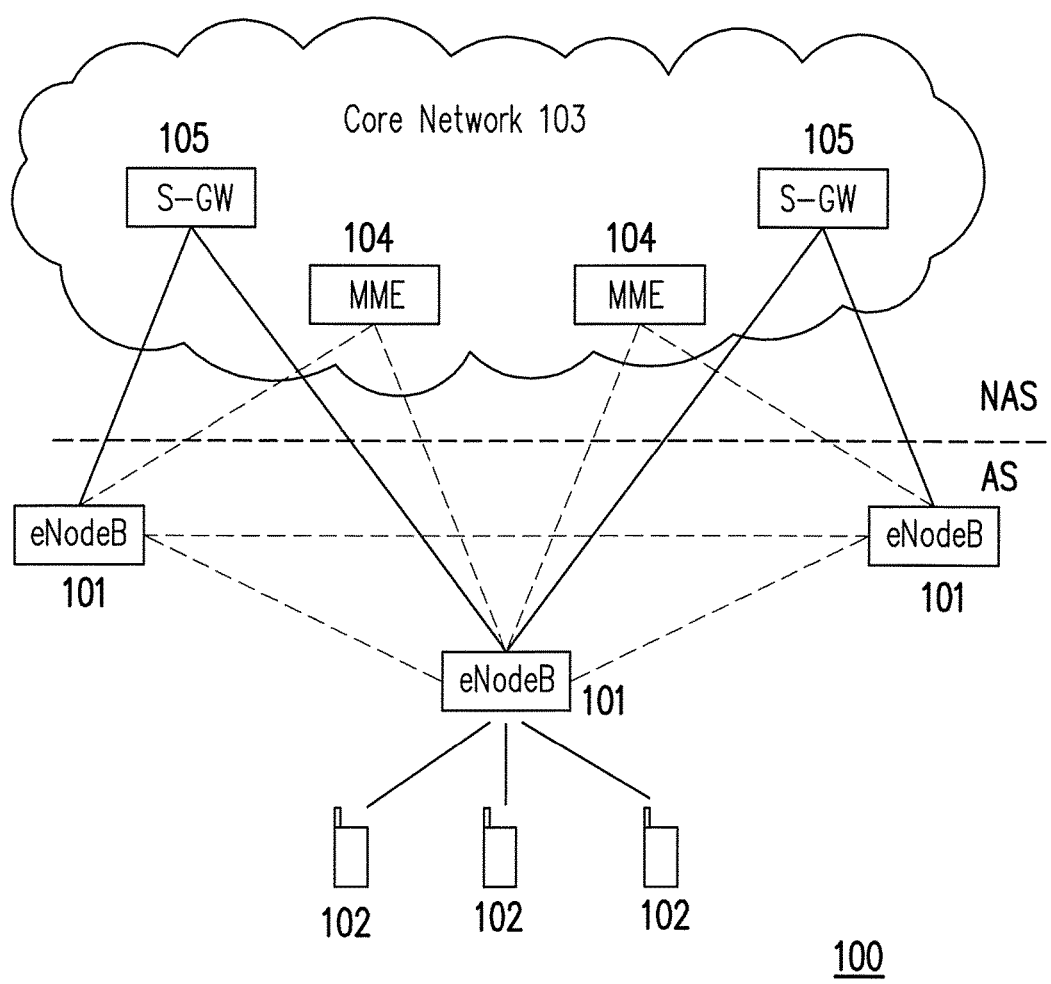
FIG. 1 is a block diagram which illustrates a typical LTE communication system as an example.
Figure 3A:
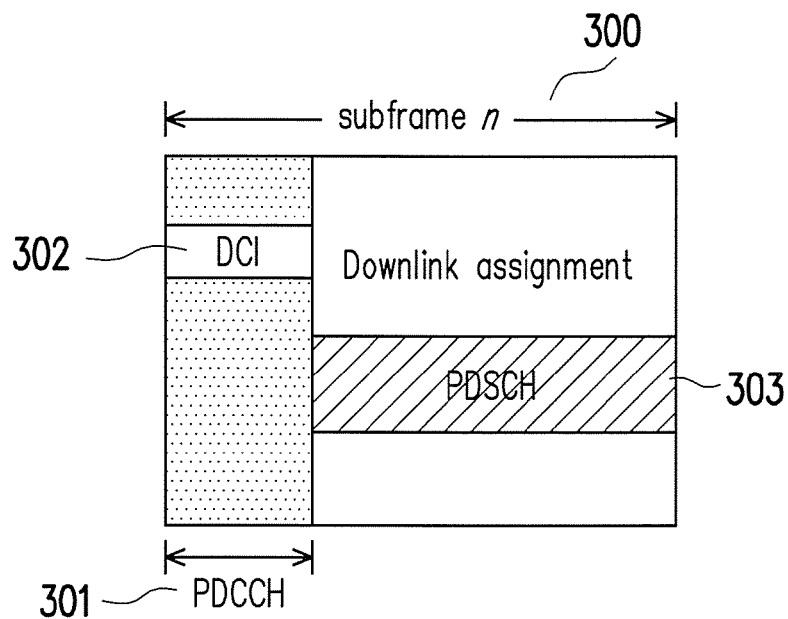
FIG. 3A illustrates using a downlink control information (DCI) for scheduling a downlink resource in a typical LTE communication system.
Figure 3B:
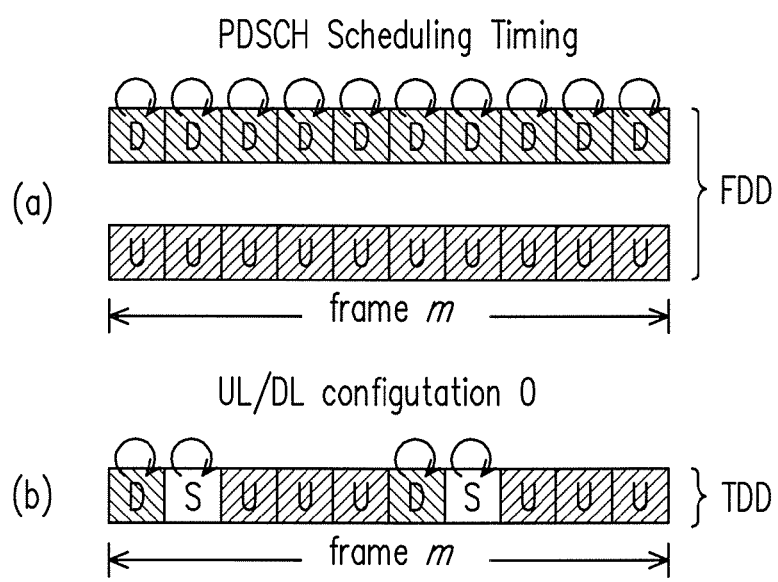
FIG. 3B illustrates PDSCH scheduling timeline in a typical LTE communication system.

Reference will now be made in detail to the present exemplary embodiments of the disclosure, examples of which are illustrated in the accompanying drawings. Wherever possible, the same reference numbers are used in the drawings and the description to refer to the same or like parts.

Figure 16A:
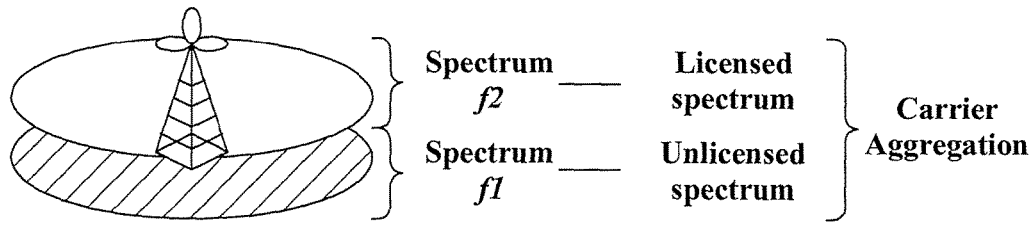
FIG. 16A illustrates carrier aggregation realized by aggregating at least one serving cell deployed on licensed spectrum and at least one serving cell deployed on unlicensed spectrum.

For the legacy CA techniques, each serving cell is deployed on a licensed frequency spectrum which supports non-contention-based communication. By the virtue of the CA enhancement, data-offloading and coexistence with other unlicensed spectrum deployments are increasingly important for the future LTE deployments in order to cope with increased throughput and capacity needs. Hence, with CA enhancement, at least one serving cell could be deployed on unlicensed band which supports contention-based communication and at least one serving cell is deployed on licensed band which supports non-contention-based communication. The unlicensed spectrum is also known as free spectrum such as the Industrial, Scientific and Medical (ISM) band for example as well as any other radio frequency which is currently not proprietary. The overall scheme of utilizing both licensed spectrum and unlicensed spectrum is known as Licensed-Assisted Access (LAA) using LTE as shown in FIG. 16A.

Figure 16B:
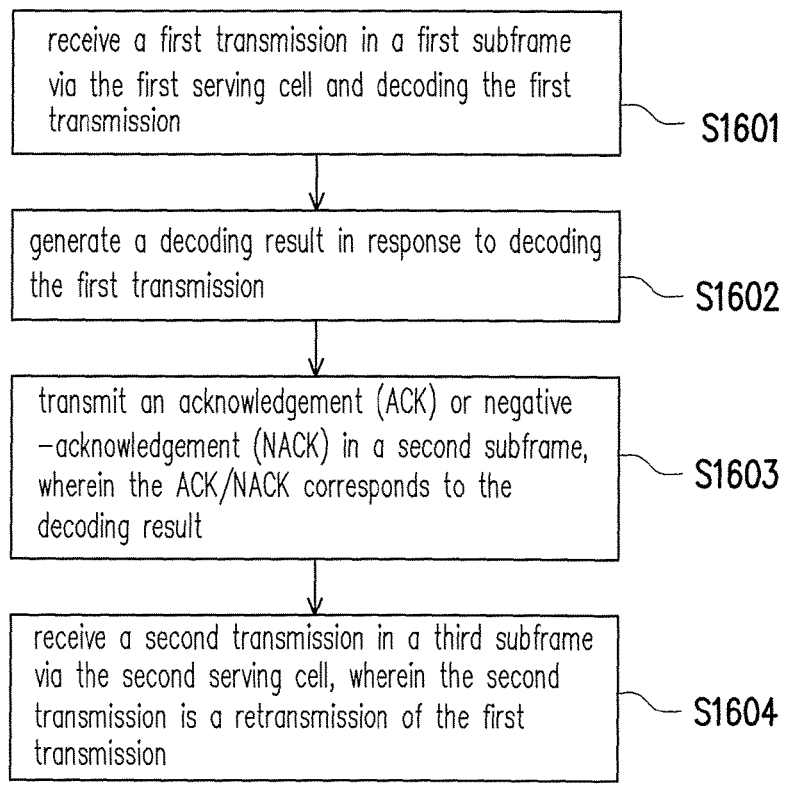
FIG. 16B illustrates a proposed method of cross-carrier HARQ retransmission mechanism in accordance with a first exemplary embodiment of the disclosure.

FIG. 16B illustrates a proposed method of handling a communication operation of a mobile device in a wireless communication system, applicable to the mobile device. The mobile device could be configured with a plurality of serving cells which comprise a first serving cell and a second serving cell by a network of the wireless communication system. In step S1601, the mobile device would receive a first transmission in a first subframe via the first serving cell and decoding the first transmission. In step S1602, the mobile device would generate a decoding result in response to decoding the first transmission. In step S1603, the mobile device would transmit an acknowledgement (ACK) or negative-acknowledgement (NACK) in a second subframe, wherein the ACK or NACK (ACK/NACK) corresponds to the decoding result. In step S1604, the mobile device would receive a second transmission in a third subframe via the second serving cell wherein the second transmission is a retransmission of the first transmission.

The proposed method of handling communication operation in a communication system includes four exemplary embodiments. The first exemplary embodiment is related to cross-carrier HARQ retransmission. The second exemplary embodiment is related to determinations of $M_{DL\_HARQ}$ based on combinations of the serving cells. The third exemplary embodiment provides specific details with regard to soft buffer partitioning. The fourth exemplary embodiment determines the HARQ acknowledgement (ACK)/negative-acknowledge (NACK) feedback timeline in response to the first transmission of the step S1602.

According to the first exemplary embodiment, the first serving cell could be either a licensed serving cell or an unlicensed serving cell. The second serving cell could be either a licensed serving cell or an unlicensed serving cell. The first serving cell and the second serving cell could be either the same or different. The second subframe could be after the first subframe; and the third subframe could be after the second subframe. The proposed method of FIG. 16B may further include storing at least one soft channel bits of the first transmission in at least one partition of a soft buffer, if the first transmission is not successfully decoded.

According to the second exemplary embodiments of the disclosure, the $M_{DL\_HARQ}$ is determined according to a combination of a first $M_{DL\_HARQ}$ of a licensed serving cell and a second $M_{DL\_HARQ}$ of an unlicensed serving cell, wherein the first $M_{DL\_HARQ}$ and the second $M_{DL\_HARQ}$ are both maximum downlink HARQ processes when the licensed serving cell and the unlicensed serving cells operate independently.

According to the second exemplary embodiments of the disclosure, the $M_{DL\_HARQ}$ is the same for both the unlicensed serving cell and the licensed serving cell when the unlicensed serving cell and the licensed serving cell are in a LAA group.

According to the second exemplary embodiments of the disclosure, if the licensed serving cell is a frequency domain duplexing (FDD) DL serving cell, and the unlicensed serving cell is an all DL serving cell, the $M_{DL\_HARQ}$ is 16 and a field in a downlink control indicator (DCI) which indicates the $M_{DL\_HARQ}$ is 4 bits.

According to the second exemplary embodiments of the disclosure, if the LAA group further comprises a second unlicensed all DL serving cell, the $M_{DL\_HARQ}$ is 24, and the field in DCI is 5 bits.

According to the second exemplary embodiments of the disclosure, if both the licensed serving cell and the unlicensed serving cell are configured with uplink (UL)/DL configuration of 0, then the $M_{DL\_HARQ}$ is 8 and a field in a downlink control indicator (DCI) which indicates the $M_{DL\_HARQ}$ is 3 bits.

According to the second exemplary embodiments of the disclosure, if both the licensed serving cell and the unlicensed serving cell are configured with UL/DL configuration 5 then the $M_{DL\_HARQ}$ is 30 and a field in a downlink control indicator (DCI) which indicates the $M_{DL\_HARQ}$ is 5 bits According to the second exemplary embodiments of the disclosure, if the licensed serving cell is configured with UL/DL configuration of 0 and the unlicensed serving cell is configured with UL/DL configuration of 5, then the $M_{DL\_HARQ}$ is 13 and a field in a downlink control indicator (DCI) which indicates the $M_{DL\_HARQ}$ is 4 bits.

According to the second exemplary embodiments of the disclosure, if the licensed serving cell is configured with UL/DL configuration of 0 and the unlicensed serving cell is an all DL serving cell then the $M_{DL\_HARQ}$ is 14 and a field in a downlink control indicator (DCI) which indicates the $M_{DL\_HARQ}$ is 4 bits.

According to the second exemplary embodiments of the disclosure, if the licensed serving cell is configured as a FDD DL serving cell and the unlicensed serving cell is configured with UL/DL configuration 0 then the $M_{DL\_HARQ}$ is 12 and a field in a downlink control indicator (DCI) which indicates the $M_{DL\_HARQ}$ is 4 bits.

According to the third exemplary embodiments of the disclosure, each sub-block is partitioned into a plurality of partitions per HARQ process according to $K_{MIMO}*\min(M_{DL\_HARQ}, M_{limit})$ wherein the $\min(M_{DL\_HARQ}, M_{limit})$ uses the lesser of $M_{DL\_HARQ}$ and $M_{limit}$ while discarding the greater.

According to the third exemplary embodiments of the disclosure, the each partition for each HARQ process per transport block has a size of soft channel bits according to at least:

$$\left\lfloor \frac{N_{soft}}{N_{licensed\ cells}^{DL} \cdot K_{MIMO} \cdot \min(M_{DL\_HARQ}, M_{limit})} \right\rfloor.$$

According to the third exemplary embodiments of the disclosure, $M_{limit}$ is determined according to whether the licensed serving cell assists the unlicensed serving cell. In particular, $M_{limit}$ would be 12 if the licensed serving cell assist the unlicensed serving cell; otherwise $M_{limit}$ would be 8.

According to the third exemplary embodiments of the disclosure, $M_{limit}$ is determined according to a number of unlicensed serving cells configured to the mobile device. In particular, $M_{limit}$ is 12, 16, or 20 if the number of unlicensed serving cells configured to the mobile device is 1, 2, or ≥3 respectively.

According to the third exemplary embodiments of the disclosure, $M_{limit}$ is determined according to a traffic load category of the unlicensed serving cell. In particular, $M_{limit}$ would be 16, 12, and 8 if the traffic load category of the unlicensed serving cell is high, medium, and low respectively.

According to the third exemplary embodiments of the disclosure, $M_{limit}$ is determined according to a congestion rate of the unlicensed serving cell. In particular, $M_{limit}$ is 8, 12, and 16 if the congestion rate of the unlicensed serving cell is high, medium, and low respectively.

According to the third exemplary embodiments of the disclosure, $M_{limit}$ is determined according to a permutation of a traffic load category of at least one unlicensed serving cell and the number of at least one configured unlicensed serving cell.

According to the third exemplary embodiments of the disclosure, assuming that the licensed serving cell operates with a first component carrier (CC#1), the unlicensed serving cell operates with a third component carrier (CC#3), and the mobile device is further configured to a second licensed serving cell which operates with a second component carrier (CC#2), and all of the licensed serving cell, the second licensed serving cell, and the unlicensed serving cell is a part of a LAA group, wherein the CC#2 and the CC#2 share a same sub-block of the soft buffer.

According to the fourth exemplary embodiments of the disclosure, if a subframe n is DL for both the licensed serving cell and the unlicensed serving cell, a HARQ transmission which corresponds to the subframe n is transmitted by the mobile device in a same UL subframe.

According to the fourth exemplary embodiments of the disclosure, DL HARQ transmissions which corresponds to DL subframes of the unlicensed serving cell is uniformly distributed over UL subframes of the unlicensed serving cell as much as possible.

According to the fourth exemplary embodiments of the disclosure, the DL HARQ transmissions which corresponds to a DL subframe n of the unlicensed serving cell is transmitting on an uplink subframe which is closest to the subframe n+c where c is a constant such as 4 for example.

According to the fourth exemplary embodiments of the disclosure, if the licensed serving cell is configured with UL/DL configuration 0 and the unlicensed serving cell is configured with UL/DL configuration 5, if a first HARQ transmission occur in subframe 2 of frame m, then a first downlink which corresponds to the first HARQ transmission occurs in subframe 6 or 7 of frame m−1.

According to the fourth exemplary embodiments of the disclosure, if a second HARQ transmission occur in subframe 3 of frame m, then a second downlink which corresponds to the second HARQ transmission occurs in subframe 7 or 8 of frame m−1.

According to the fourth exemplary embodiments of the disclosure, if a third HARQ transmission occur in subframe 4 of frame m, then a second downlink which corresponds to the third HARQ transmission occurs in subframe 0 of frame m−1.

Figure 16C:
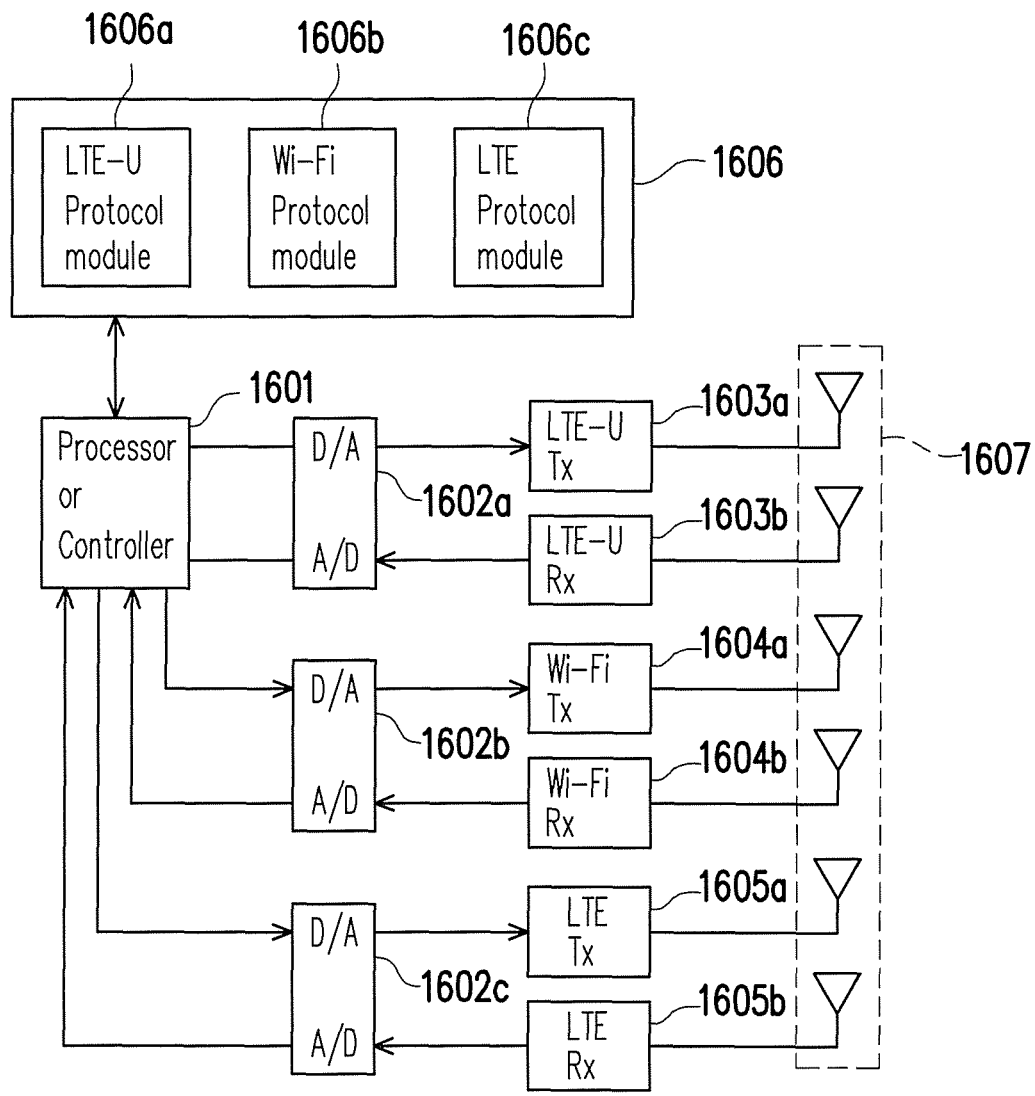
FIG. 16C illustrates a proposed mobile device of the disclosure.

FIG. 16C illustrates a proposed mobile device which would implement the proposed method of handling a communication operation in a communication system of the disclosure as shown in FIG. 16B and its corresponding written descriptions. From the hardware perspective, a mobile device such as a UE may be represented by, not limited to, the functional elements as illustrated in FIG. 16C. Referring to FIG. 16C, the mobile device 1600 would include at least but not limited to a processor and/or a controller 1601 (hereinafter referred to as "processor 1601"), one or more digital-to-analog (D/A)/analog-to-digital (A/D) converters 1602a-1602c, optionally a LTE-U transmitter (TX) 1603a and a LTE-U receiver (RX) 1603b, a Wi-Fi TX 1604a and a Wi-Fi RX 1604b, a LTE TX 1605a and a LTE RX 1605b, a memory module 1606, and an antennas 1607 (or antenna array).

The processor 1601 is configured to process digital signal and to perform procedures of the proposed method of handling a communication operation in a communication system as described in the disclosure. Also, the processor 1601 may be coupled to a memory module 1606 to store software programs such as a LTE-U protocol module 1606a, a Wi-Fi protocol module 1606b, and a LTE protocol module 1606c, programming codes, device configurations, a codebook, buffered or permanent data, and so forth. The processor 1601 is configured to access and execute the modules recorded in the memory module 1606. The functions of the processor 1601 could be implemented by using programmable units such as a micro-processor, a micro-controller, digital signal processor (DSP) chips, a field-programmable gate array (FPGA), etc. The functions of the processor 1601 may also be implemented with separate electronic devices or ICs, and functions performed by the processor 1601 may also be implemented within the domains of either hardware or software.

The LTE-U protocol module 1606a would support LTE-U protocol. That means the processor 1601 executed the LTE-U protocol module 1606a would convert a digital message into a format that is compatible with LTE-U protocol, and could access the cellular network such as Evolved Universal Terrestrial Radio Access Network (E-UTRAN). The Wi-Fi protocol module 1606b would support 802.11 (or Wi-Fi) protocol. That means the processor 1601 executed the Wi-Fi protocol module 1606b would convert a digital message into a format that is compatible with Wi-Fi protocol according to the IEEE 802.11 standard or similar standards such as IEEE 802.11x, and could access the wireless local access network (WLAN). The LTE protocol module 1606c would support LTE protocol. That means the processor 201 executed the LTE protocol module 1606c would convert a digital message into a format that is compatible with LTE protocol, and could access the cellular network such as E-UTRAN. Notice that the LTE protocol module 1606c may be optionally combined with 3G and/or 2G protocol module.

The D/A/A/D converters 1602a-1602c is configured to convert from an analog signal format to a digital signal format during uplink signal processing and from a digital signal format to an analog signal format during downlink signal processing.

The LTE-U TX 1603a and the LTE-U RX 1603b operated at an unlicensed spectrum such as 5 GHz, 2.4 GHz, other Industrial, Scientific and Medical (ISM) radio bands, or Unlicensed National Information Infrastructure (U-NII) band are respectively used for transmitting and receiving modulated signals which could be wireless RF signals (through one or more antennas 1607) for LTE-U protocol module 1606a. The Wi-Fi TX 1604a and the Wi-Fi RX 1604b operating at the unlicensed spectrum are respectively used for transmitting and receiving modulated signals which could be wireless RF signals (through one or more antennas 1607) for Wi-Fi protocol module 1606b. The unlicensed spectrum operated by the LTE-U TX 1603a, the LTE-U RX 1603b, Wi-Fi TX 1604a, and the Wi-Fi RX 1604b could be the same or different. The LTE TX 1605a and the LTE RX 1605b operated at a licensed spectrum such as frequency bands 700 MHz, 850 MHz, 1800 MHz, 1900 MHz, 2100 MHz, and etc. are respectively used for transmitting and receiving modulated signals which could be wireless RF signals (through one or more antennas 1607) for LTE protocol module 1606c. The LTE-U TX 1603a and the LTE-U RX 1603b, the Wi-Fi TX 1604a and the Wi-Fi RX 1604b, and the LTE TX 1605a and the LTE RX 1605b may also perform operations such as low noise amplifying, impedance matching, frequency mixing, up or down frequency conversion, filtering, amplifying, and so forth.

The memory module 1606 may be a fixed or a movable device in any possible forms including non-transitory computer readable recording medium such as a random access memory (RAM), a read-only memory (ROM), a flash memory or other similar devices, or a combination of the above-mentioned devices.

The Wi-Fi device in this disclosure could represent various embodiments which for example could include but not limited to a desktop computer, a laptop, a computer, a server, a client, a workstation, a personal digital assistant (PDA), a tablet personal computer (PC), a scanner, a telephone device, a pager, a camera, a television, a hand-held video game device, a musical device, a wireless sensor, and so like. In some applications, a Wi-Fi device may be a fixed computer device operating in a mobile environment, such as a bus, train, an airplane, a boat, a car, and so forth.

A base station such as an eNB would have similar hardware components as the mobile device including not limited to a processor, a storage medium or memory, a A/D D/A complex, a wireless transmitter, a wireless receiver, an antenna array, and so forth. The functions of these elements are similar to those of the mobile device and thus will not be repeated.

To operate under LAA using LTE would require a communication system to meet its regulatory requirement. In particular, for a transmission on an unlicensed band, there is a limitation of the maximum transmission time for contention based communication). For the conventional CA operation, there is no limitation on the maximum transmission time in any non-contention based communication for each serving cell; whereas for CA in LTE-LAA, at least one serving cell has a limitation on the maximum transmission time in a contention based communication because at least one serving cell would be deployed on unlicensed spectrum. For example, Europe has a Listen-Before-Talk (LBT) requirement for Frame-Based-Equipment (FBE) which requires the maximum channel occupancy time or maximum burst length to be less than 10 millisecond (ms) as well as a Listen-Before-Talk (LBT) requirement for Load-Based-Equipment (LBE) which requires the maximum channel occupancy time or maximum burst length to be less than 13 ms. Japan is more stringent as the maximum channel occupancy time in 5 GHz is required to be less than 4 ms. Therefore, the regulatory requirement would induce a change to the system design.

Several items may need to be addressed if a UE is configured with more than one serving cells wherein at least one serving cell deployed on licensed spectrum and at least one serving cell is deployed on unlicensed spectrum. In one of the exemplary embodiments, if a licensed serving cell which operates with non-contention-based transmission assists at least one unlicensed serving cell which would be contention-based transmission, the licensed and unlicensed serving cells may be considered as a licensed-assisted access (LAA) group which could be defined as a licensed serving cell assisting at least one unlicensed serving cell. In this scenario, the licensed serving cell and unlicensed serving cells may be considered as a licensed-assisted access (LAA) set.

Figure 16D:
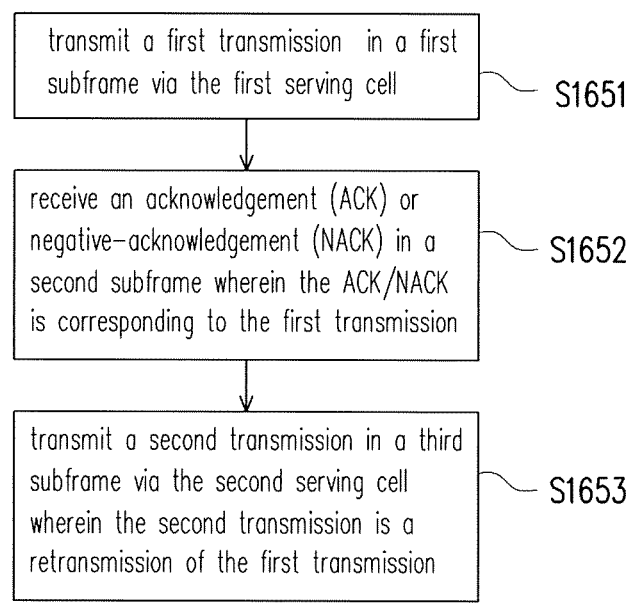
FIG. 16D illustrates a proposed method of handling a communication operation of a mobile device in a wireless communication system, applicable to a network, in accordance with one of the exemplary embodiments of the disclosure.

FIG. 16D illustrates a proposed method of handling a communication operation of a mobile device in a wireless communication system, applicable to a network, in accordance with one of the exemplary embodiments of the disclosure. The network of the wireless communication system configures a plurality of serving cells which comprise a first serving cell and a second serving cell to the mobile device. In step S1651, the network would transmit a first transmission in a first subframe via the first serving cell. In step S1652, the network would receive an acknowledgement (ACK) or negative-acknowledgement (NACK) in a second subframe wherein the ACK or NACK (ACK/NACK) is corresponding to the first transmission. In step S1653, the network would transmit a second transmission in a third subframe via the second serving cell wherein the second transmission is a retransmission of the first transmission.

In the first exemplary embodiment, the first serving cell could be either a licensed serving cell or an unlicensed serving cell. The second serving cell could be either a licensed serving cell or an unlicensed serving cell. The first serving cell and the second serving cell could be the same or different. The second subframe could be after the first subframe; and the third subframe could be after the second subframe.

In the second exemplary embodiment, the maximum number of DL HARQ processes ($M_{DL\_HARQ}$) is to be modified if a UE is configured with more than one serving cells in which at least one serving cell is deployed on licensed spectrum and at least one serving cell is deployed on unlicensed spectrum. For a legacy system, as each serving cell transmits its HARQ process independently, each serving cell would have its own a maximum number of DL HARQ processes ($M_{DL\_HARQ}$). One difference between the disclosure and a legacy CA mechanism is that if a licensed serving cell operating under non-contention-based transmission assists at least one unlicensed serving cell operating under contention-based transmission, DL HARQ process transmitted on the unlicensed serving cell may be an independent DL HARQ process of the unlicensed serving cell and/or an assisted DL HARQ process of the licensed serving cell. Therefore, the unlicensed serving cell should not have an independent maximum number of DL HARQ processes ($M_{DL\_HARQ}$) value, and the maximum number of DL HARQ processes of the LAA group should be jointly considered for the licensed serving cell(s) and unlicensed serving cell(s). Moreover, the number of bits used to indicate the DL HARQ process number may also be extended for the LAA group. FIG. 17A~FIG. 17G and their corresponding written descriptions provide several examples of the second exemplary embodiment.

In the following examples of the second exemplary embodiment, the first transmission may be transmitted via either the licensed serving cell or the unlicensed serving cell. And the retransmission may also be transmitted via the licensed serving cell or the unlicensed serving cell.

Figure 17A:
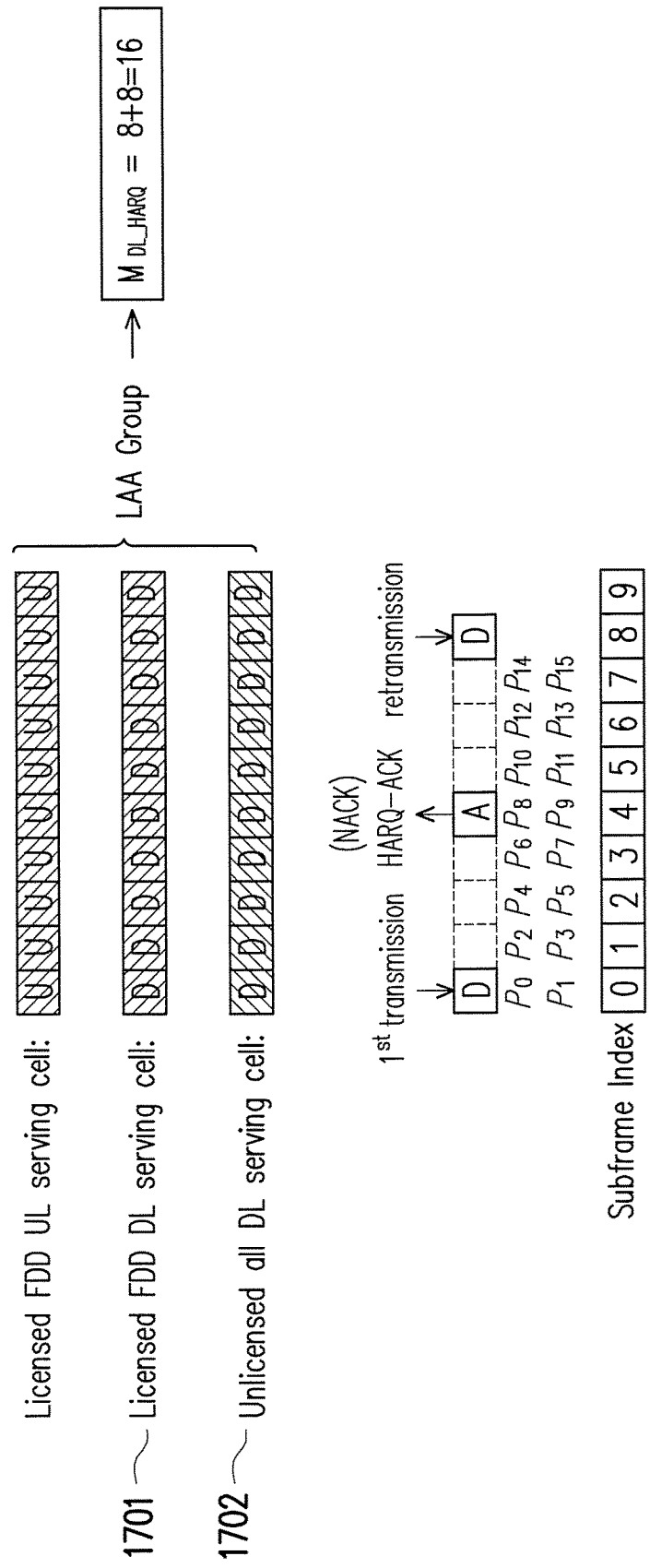
FIG. 17A illustrates the maximum number of DL HARQ processes of a LAA group when a licensed FDD serving cell assists an unlicensed all DL serving cell in accordance with the second exemplary embodiment of the disclosure.

FIG. 17A illustrates a first example in which the maximum number of DL HARQ processes ($M_{DL\_HARQ}$) of the LAA group when a FDD licensed serving cell assists an all DL unlicensed serving cell. In this example, since the $M_{DL\_HARQ}$ for licensed FDD DL serving cell 1701 would be jointly considered with all DL unlicensed serving cell 1702, the maximum number of DL HARQ processes would be the maximum number of DL HARQ processes of the licensed FDD DL serving cell 1701 combined with the maximum number of DL HARQ processes all DL unlicensed serving cell 1702. Since the maximum number of DL HARQ processes for both serving cells 1701 and 1702 are 8 according to FIG. 4, the $M_{DL\_HARQ}$ would increase from 8 to 16. Consequently, the number of bits used to indicate the DL HARQ process number would also be extended from 3-bit to 4-bit since the number of bits used to indicate the DL HARQ process number for the legacy FDD system (3-bit) would only cover 8 processes and is thus not sufficient.

Figure 17B:
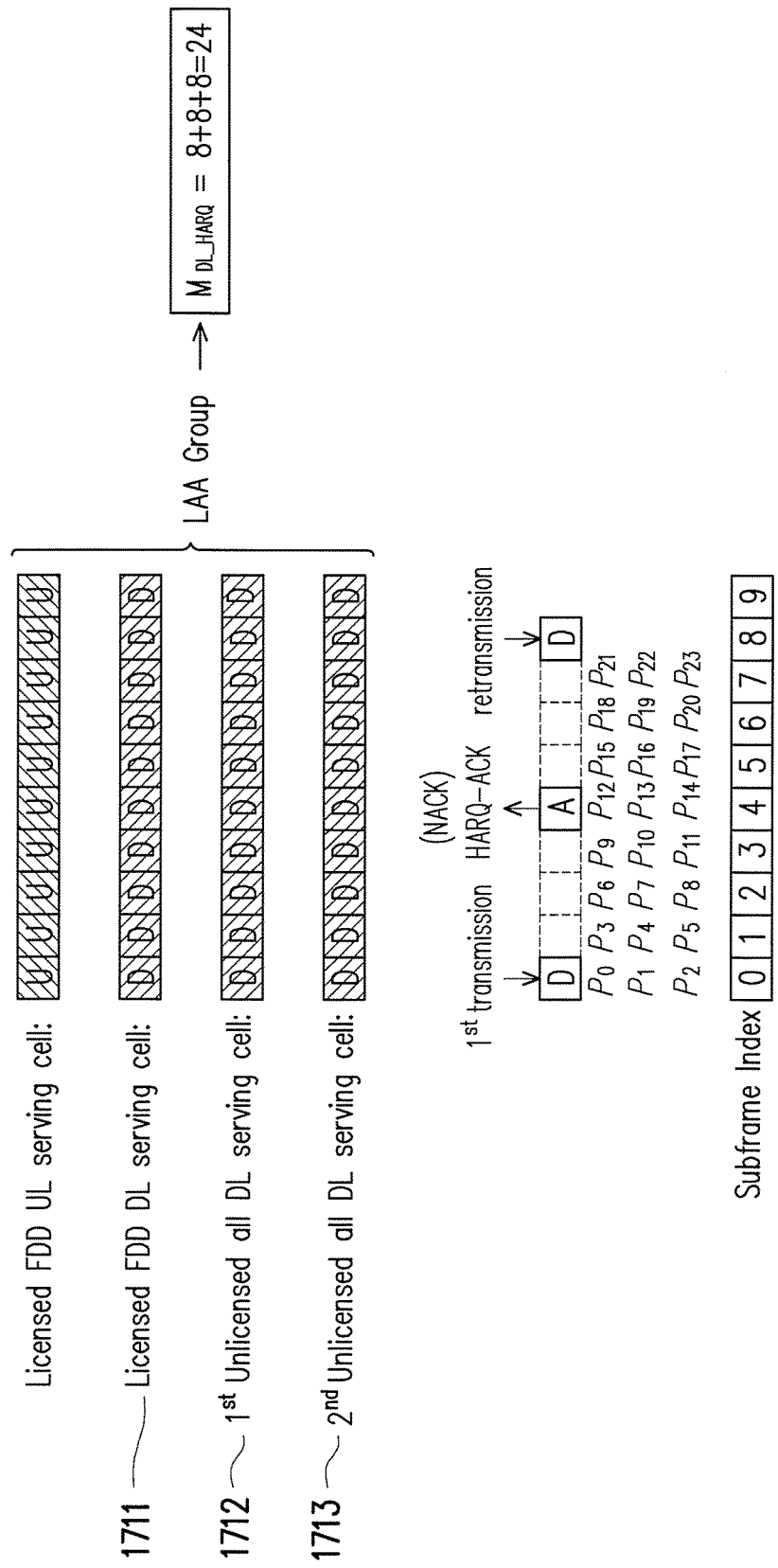
FIG. 17B illustrates the maximum number of DL HARQ processes of a LAA group when a licensed FDD serving cell assists two unlicensed all DL serving cells in accordance with the second exemplary embodiment of the disclosure.

FIG. 17B is a second example illustrates the maximum number of DL HARQ processes ($M_{DL\_HARQ}$) of the LAA group when a FDD licensed serving cell assists two all DL unlicensed serving cell. In this example, similar to the principle of FIG. 17A, the $M_{DL\_HARQ}$ would be jointly considered for the FDD licensed serving cell and the all DL unlicensed serving cells which would include for the licensed FDD DL serving cell 1711, the first unlicensed all DL serving cell 1712 and the second unlicensed all DL serving cell 1713, and thus the maximum number of DL HARQ processes is extended from 8 to 24 as the maximum $M_{DL\_HARQ}$ for all serving cells are 8 according to FIG. 4A Consequently, the number of bits used to indicate the DL HARQ process number should also be extended from 3-bit to 5-bit since the number of bits used to indicate the DL HARQ process number for the legacy FDD system (3-bit) is not sufficient as 5 bits are required to fully represent 24 possibilities.

Figure 17C:
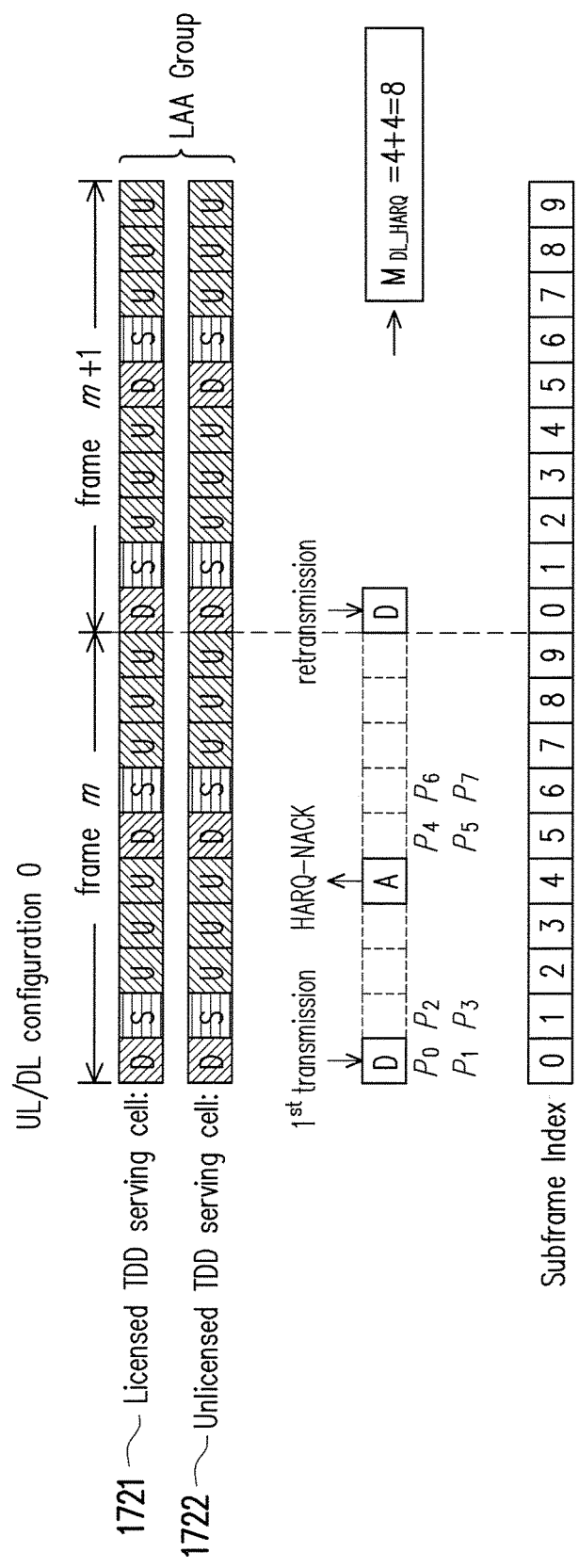
FIG. 17C illustrates the maximum number of DL HARQ processes of a LAA group when a licensed TDD serving cell assists an unlicensed TDD serving cell for which both serving cells are configured with TDD UL/DL configuration 0 in accordance with the second exemplary embodiment of the disclosure.

FIG. 17C is a third example illustrating the maximum number of DL HARQ processes ($M_{DL\_HARQ}$) of the LAA group when a TDD licensed serving cell assists a TDD unlicensed serving cell wherein both serving cells are configured with UL/DL configuration 0. In this example, $M_{DL\_HARQ}$ is jointly considered for the licensed serving cell 1721 and unlicensed serving cell 1722, and thus the maximum number of DL HARQ processes is extended from 4 to 8 (4+4=8) as the $M_{DL\_HARQ}$ for both the licensed serving cell 1721 and unlicensed serving cell 1722 are 4. For a legacy TDD system, the number of bits used to indicate the DL HARQ process number is 4-bit. In this example, the number of bits used to indicate the DL HARQ process number for the LAA group is not modified since 4-bit is sufficient to indicate up to 8 DL HARQ processes.

Figure 17D:
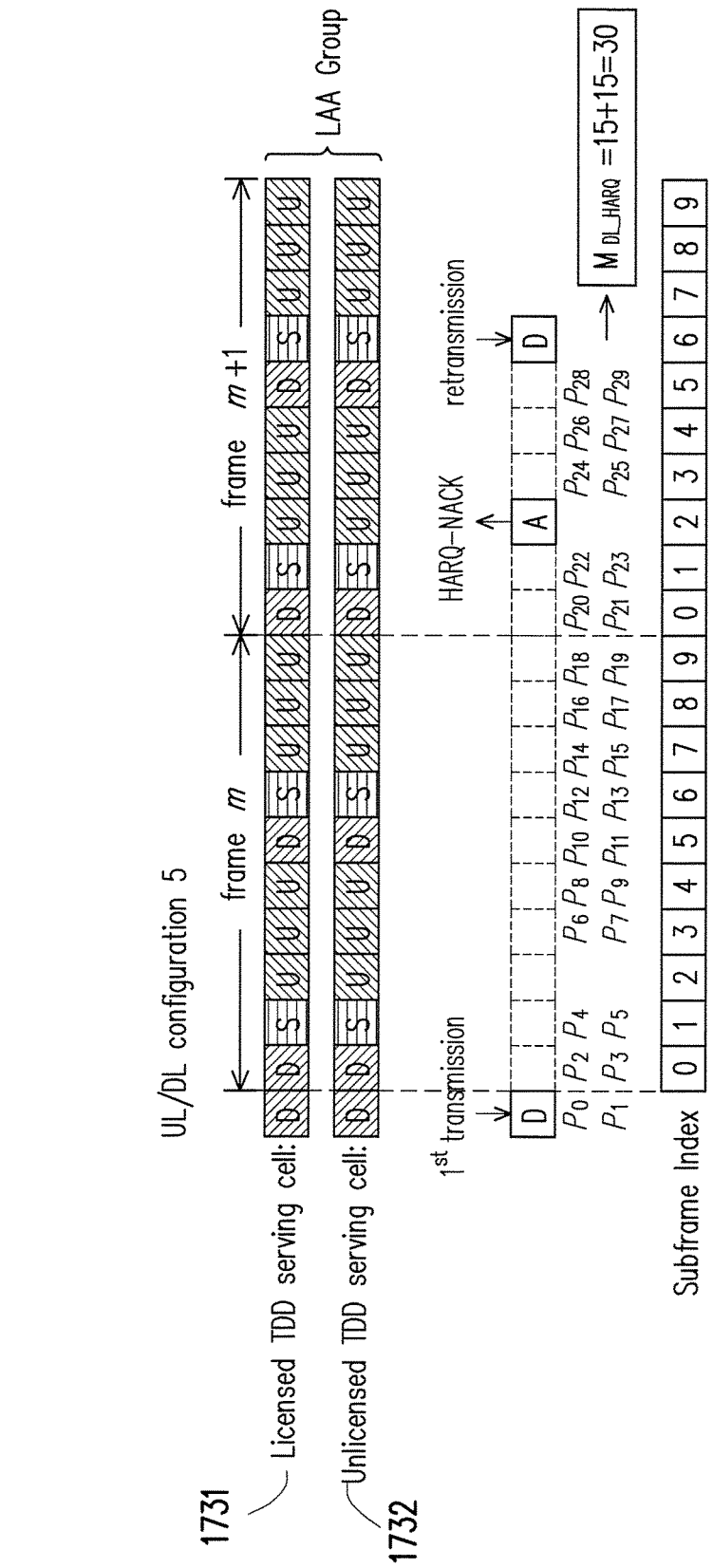
FIG. 17D illustrates the maximum number of DL HARQ processes of a LAA group when a licensed TDD serving cell assists an unlicensed TDD serving cell for which both serving cells are configured with TDD UL/DL configuration 5 in accordance with the second exemplary embodiment of the disclosure.

FIG. 17D is a fourth example illustrating the maximum number of DL HARQ processes ($M_{DL\_HARQ}$) of the LAA group when a TDD licensed serving cell assists a TDD unlicensed serving cell wherein both serving cells are configured with UL/DL configuration 5. In this example, $M_{DL\_HARQ}$ is jointly considered for the licensed serving cell 1731 and unlicensed serving cell 1732. Since the maximum $M_{DL\_HARQ}$ for both the licensed serving cell 1731 and unlicensed serving cell 1732 are 15 according to FIG. 4, and the maximum number of DL HARQ processes would be extended from 15 to 30 (15+15=30). Consequently, the number of bits used to indicate the DL HARQ process number should also be extended from 4-bit to 5-bit since the number of bits used to indicate the DL HARQ process number for a legacy TDD system (4-bit) is not sufficient since 5 bits are required to represent 30 possibilities.

Figure 17E:
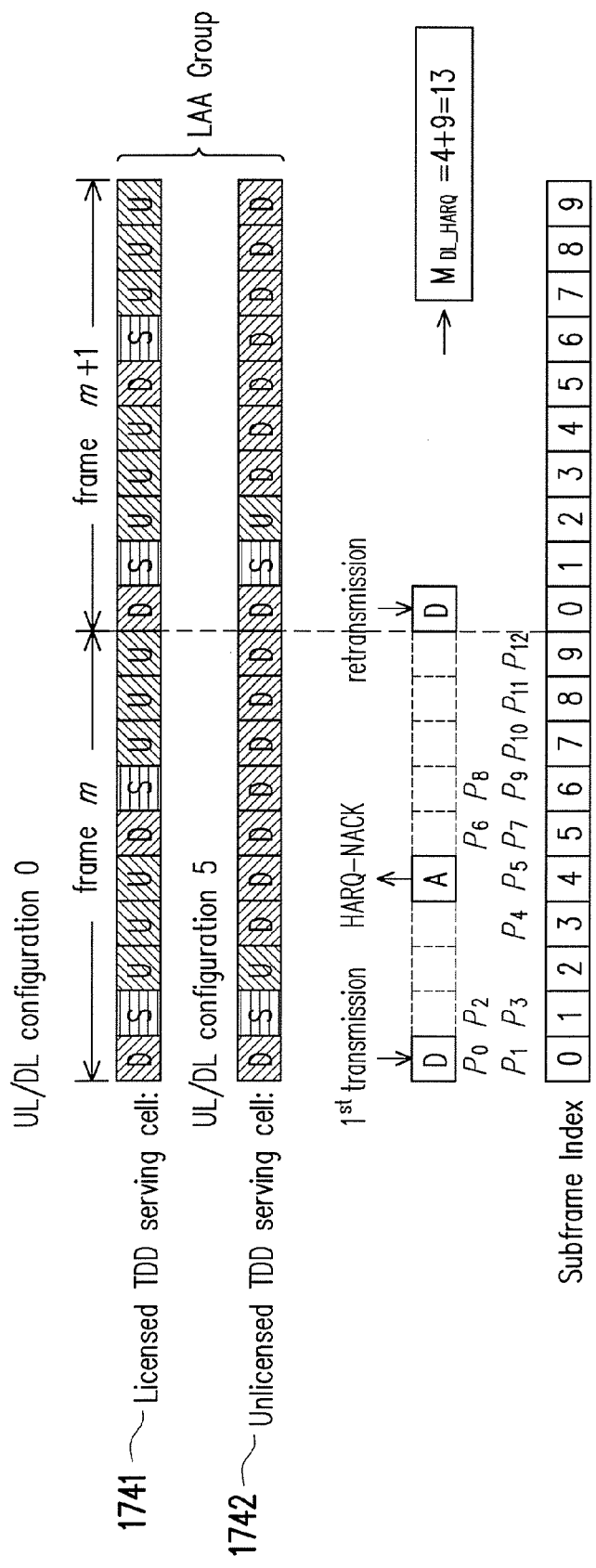
FIG. 17E illustrates the maximum number of DL HARQ processes of a LAA group when a licensed TDD serving cell assists an unlicensed TDD serving cell for which the licensed TDD serving cell is configured with TDD UL/DL configuration 0 and the unlicensed TDD serving cell is configured with TDD UL/DL configuration 5 in accordance with the second exemplary embodiment of the disclosure.

FIG. 17E is a fifth example illustrating the maximum number of DL HARQ processes ($M_{DL\_HARQ}$) of the LAA group when a TDD licensed serving cell assists a TDD unlicensed serving cell in which the TDD licensed serving cell is configured with UL/DL configuration 0 and the TDD unlicensed serving cell is configured with UL/DL configuration 5. In this example, $M_{DL\_HARQ}$ is jointly considered for the licensed serving cell 1741 and unlicensed serving cell 1742. For the exemplary embodiment of FIG. 17E, licensed serving cell 1741 would respond ACK or NACK (ACK/NACK) in subframe 4 of frame m after receiving a DL HARQ process in subframe 0 of frame m. The fastest retransmission for this particular DL HARQ process would occur in subframe 0 of frame m+1 for the licensed serving cell 1741. Within 10 subframes (from subframe 0 to subframe 9 of frame m), there could be a maximum of 13 DL HARQ processes including 4 DL HARQ processes of the licensed serving cell 1741 and 9 DL HARQ processes of the unlicensed serving cell 1742. The $M_{DL\_HARQ}$ in this exemplary embodiment is (4+9)=13.

Figure 17F:
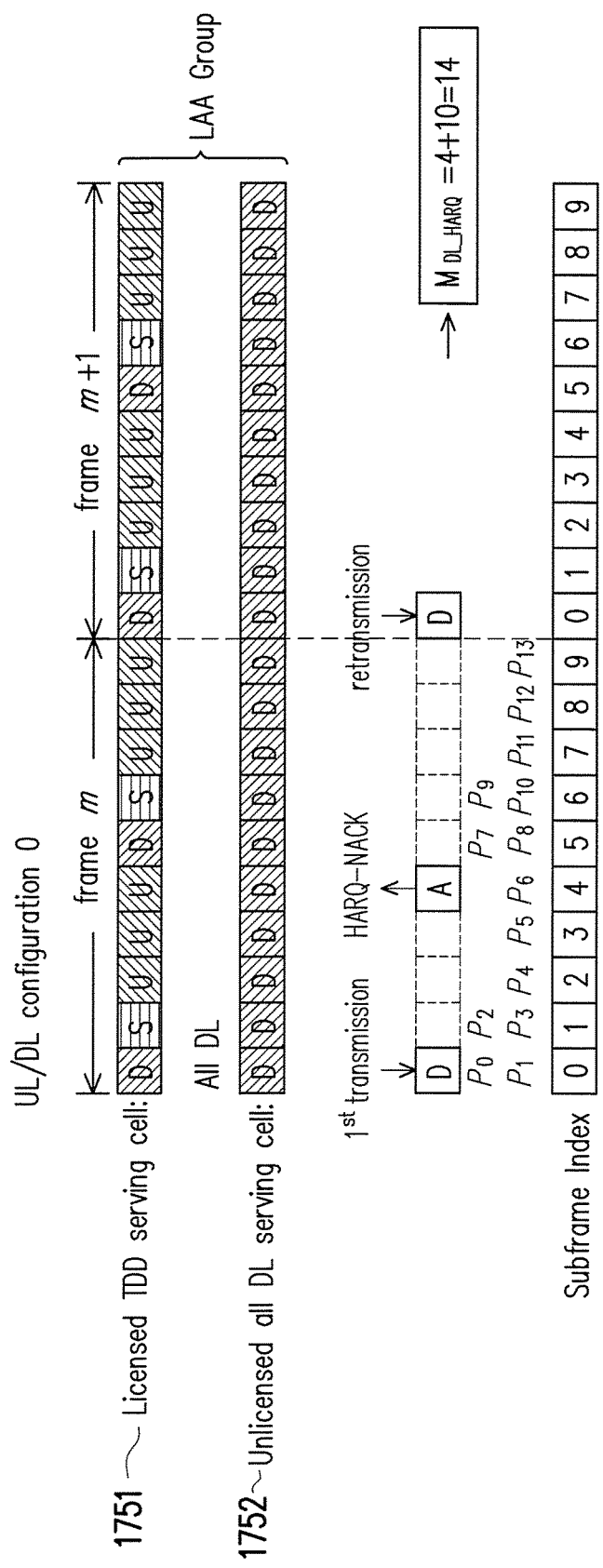
FIG. 17F illustrates the maximum number of DL processes of a LAA group when a licensed TDD serving cell assists an unlicensed all DL serving cell for which the licensed TDD serving cell is configured with TDD UL/DL configuration 0 in accordance with the second exemplary embodiment of the disclosure.

FIG. 17F is a sixth example illustrating the maximum number of DL HARQ processes ($M_{DL\_HARQ}$) of the LAA group when a TDD licensed serving cell 1751 configured with UL/DL configuration 0 assists an all DL unlicensed serving cell 1752. In this example, the combination of $M_{DL\_HARQ}$ for the licensed serving cell 1751 and the unlicensed serving cell 1752 is 14 (4+10=14). Therefore, the maximum number of DL HARQ processes is extended from 4 to 14 which could be represented by 4 bits.

Figure 17G:
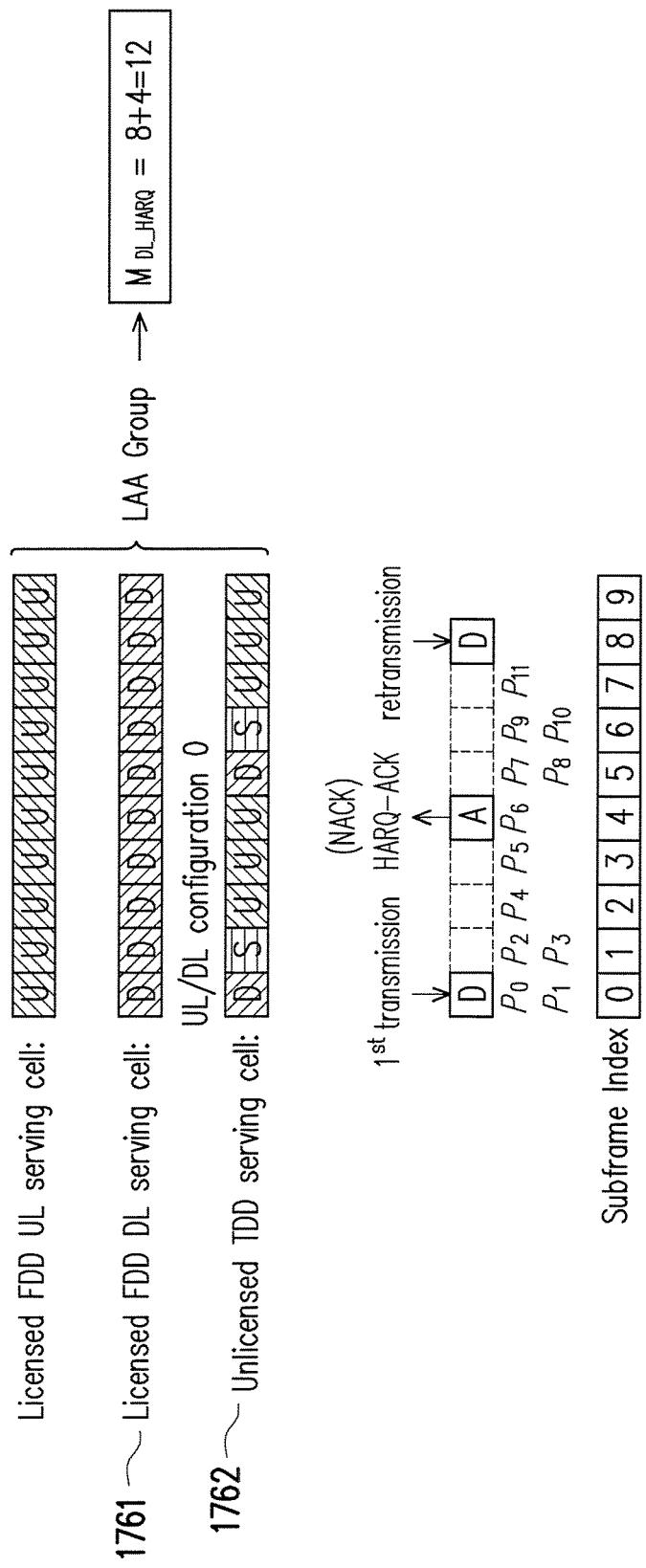
FIG. 17G illustrates the maximum number of DL processes of a LAA group when a licensed FDD serving cell assists an unlicensed TDD serving cell for which the licensed TDD serving cell is configured with TDD UL/DL configuration 0 in accordance with the second exemplary embodiment of the disclosure.

FIG. 17G is a seventh example illustrating the maximum number of DL HARQ processes ($M_{DL\_HARQ}$) of the LAA group when a FDD licensed serving cell 1761 assists an unlicensed serving cell 1762 configured with UL/DL configuration 0. In this example, the combination of $M_{DL\_HARQ}$ for the licensed serving cell 1761 and the unlicensed serving cell 1762 is 12 (8+4=12). Therefore, the maximum number of DL HARQ processes is extended from 4 to 12 bits which could be represented by 4 bits.

Figure 8:
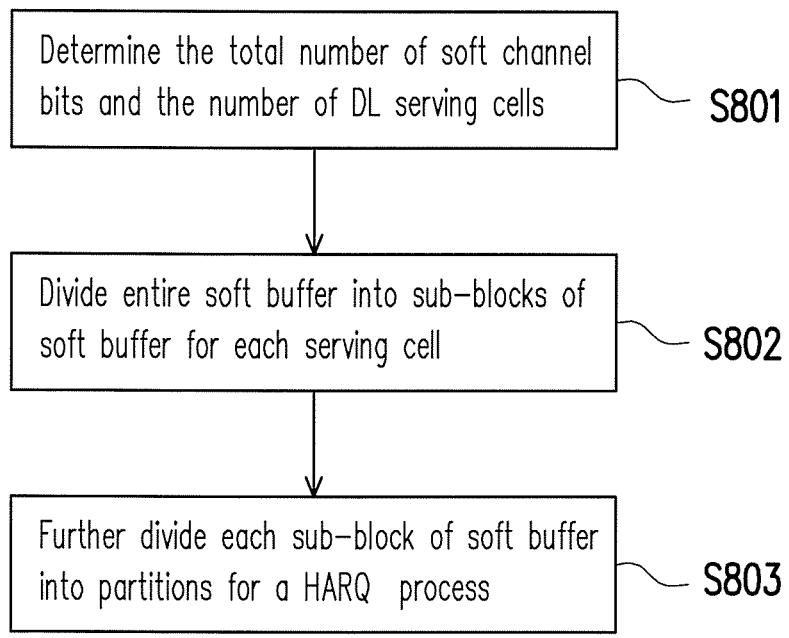
FIG. 8 is a flow chart which illustrates a conventional method of partitioning a soft buffer.
Figure 9:
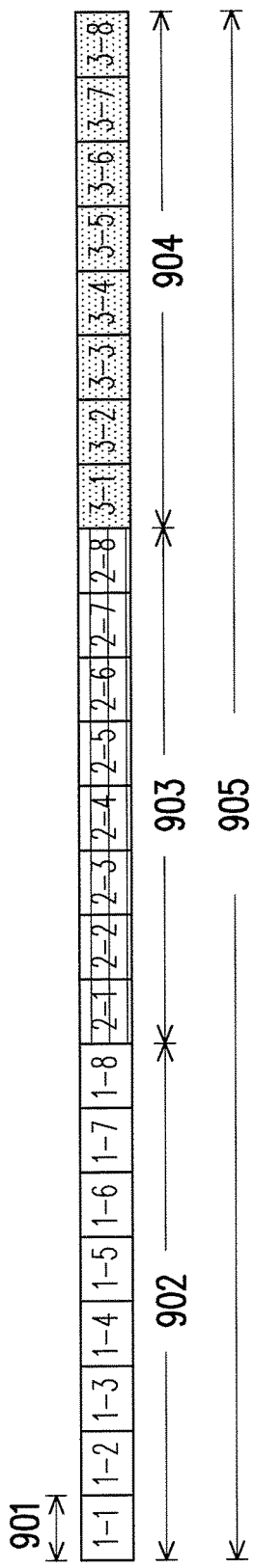
FIG. 9 illustrates the steps of a conventional soft buffer partitioning in a FDD system with 3 DL serving cells.
Figure 10:
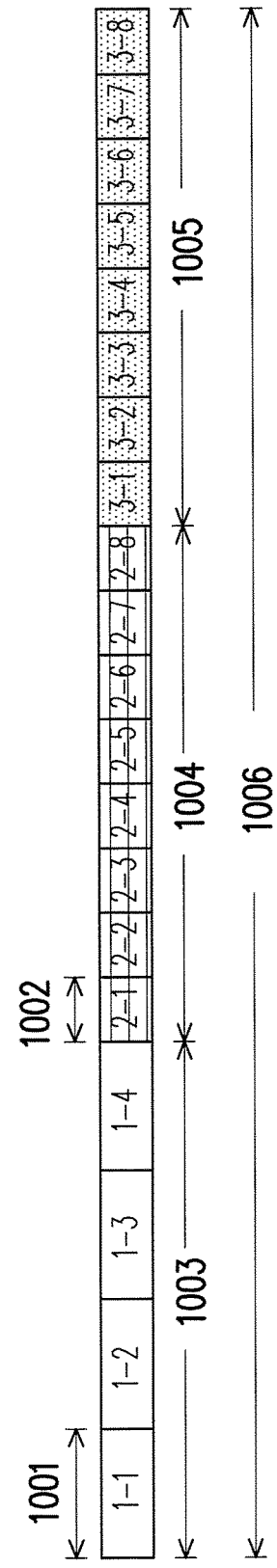
FIG. 10 illustrates the steps of a conventional soft buffer partitioning in a TDD system with 3 TDD serving cells.
Figure 11:
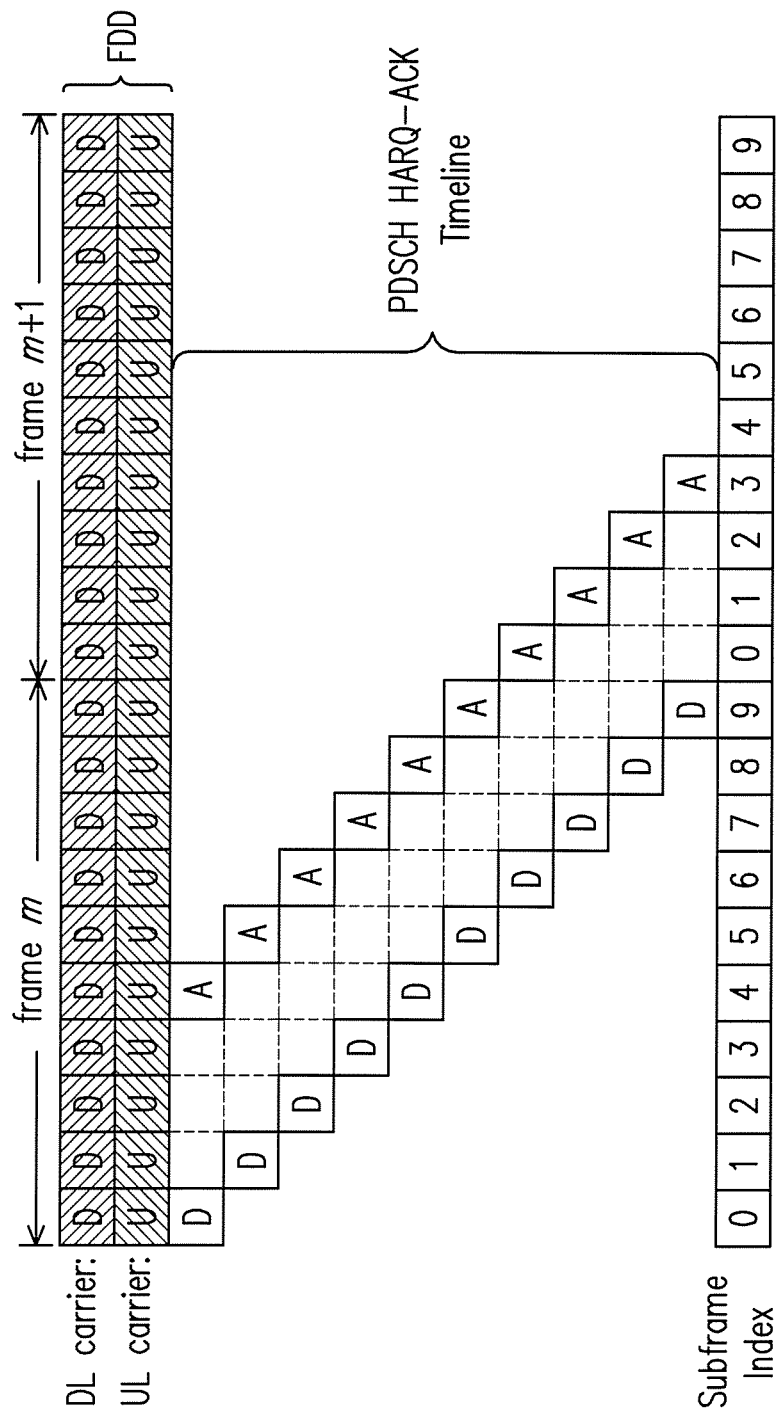
FIG. 11 illustrates a conventional DL HARQ ACK or NACK (ACK/NACK) feedback timeline in a FDD system.
Figure 13A:
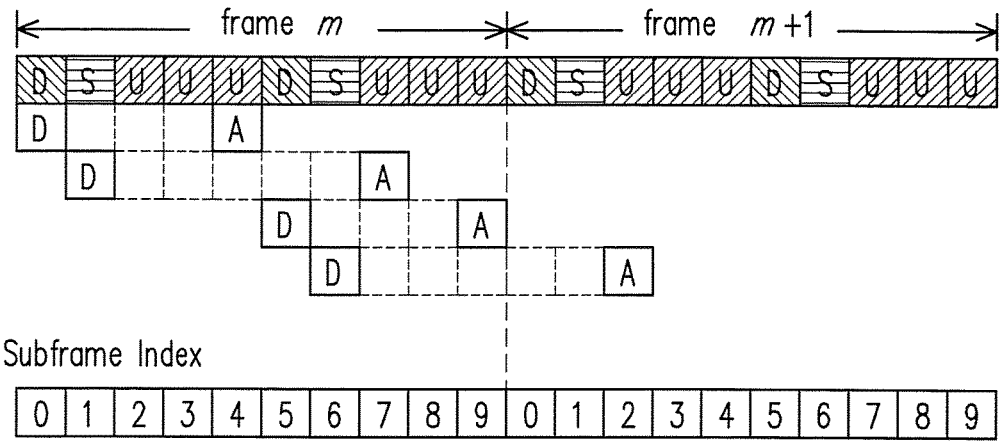
FIG. 13A illustrates DL HARQ ACK or NACK (ACK/NACK) feedback timeline in a TDD single serving cell system which is configured with UL/DL configuration 0.
Figure 13B:
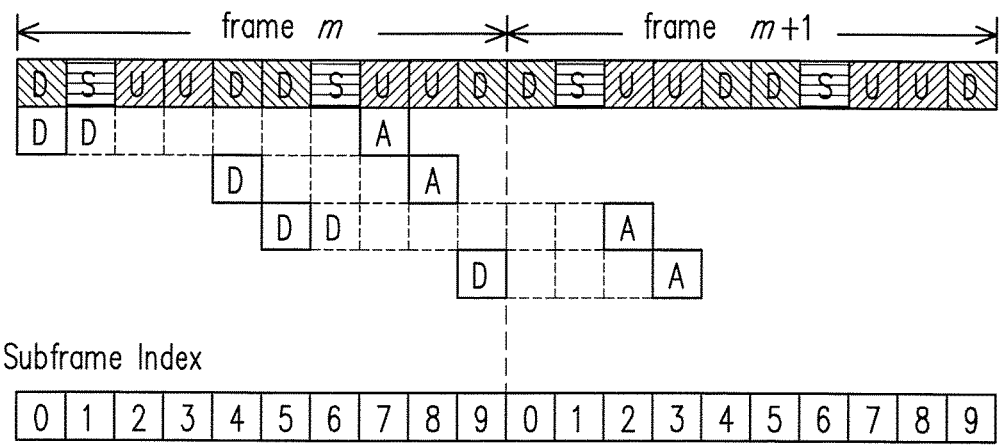
FIG. 13B illustrates DL HARQ ACK or NACK (ACK/NACK) feedback timeline in a TDD single serving cell system which is configured with UL/DL configuration 1.
Figure 13C:
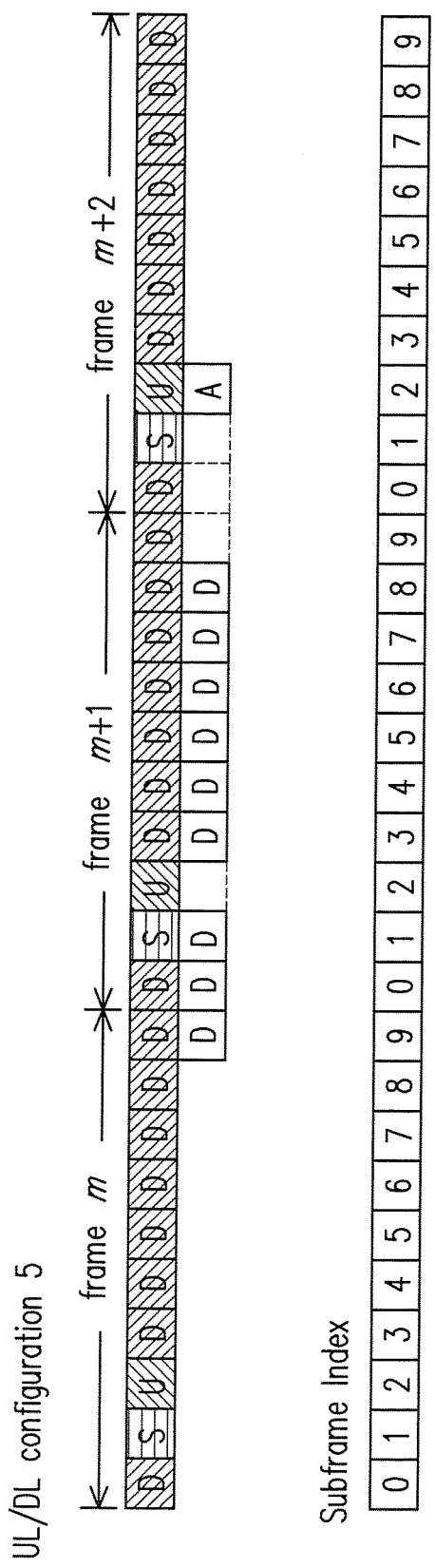
FIG. 13C illustrates DL HARQ ACK or NACK (ACK/NACK) feedback timeline in a TDD single serving cell system which is configured with UL/DL configuration 5.
Figure 15:
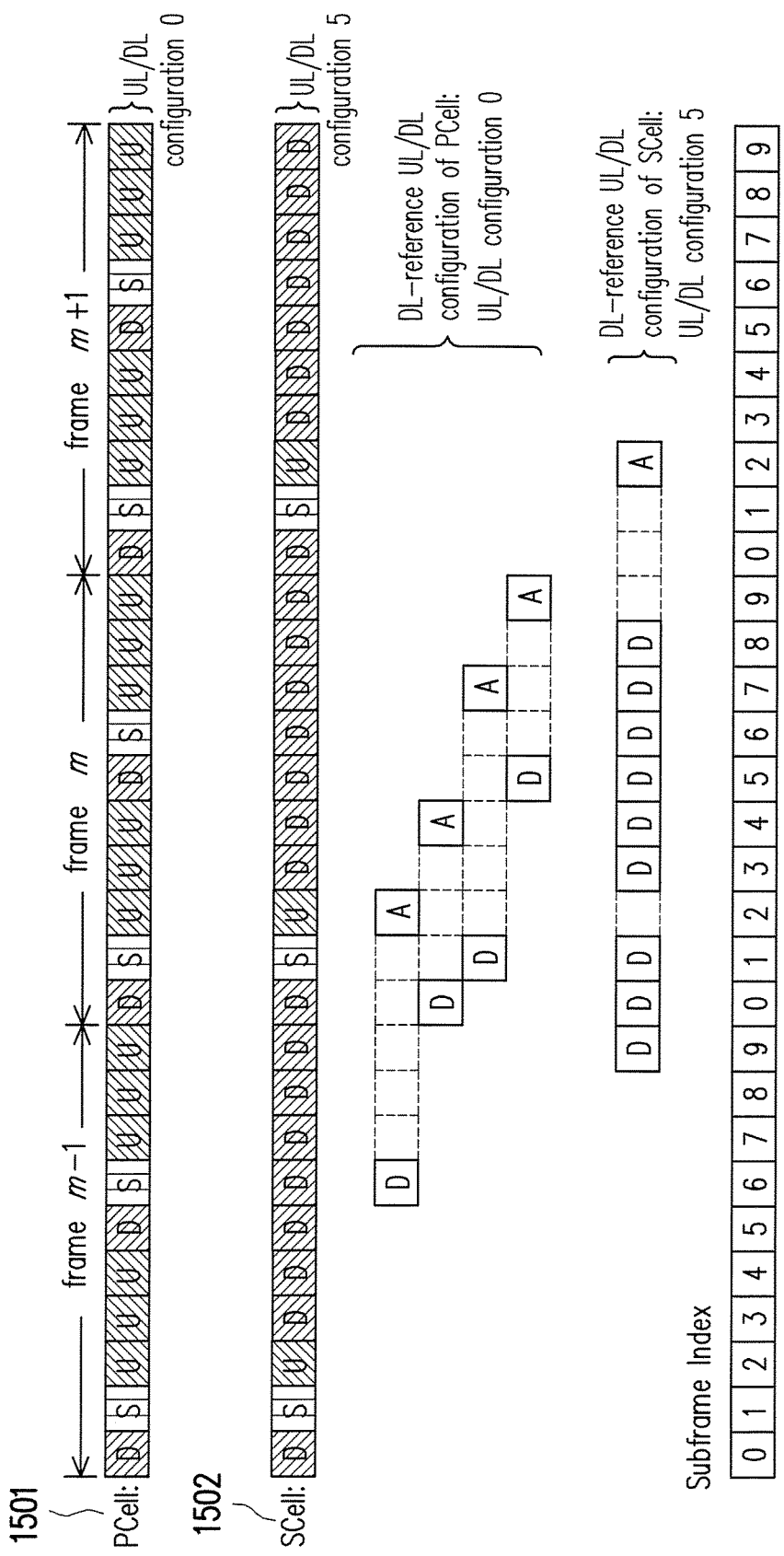
FIG. 15 illustrates DL HARQ ACK or NACK (ACK/NACK) feedback timeline in a TDD CA system in which a PCell and a SCell are configured with different UL/DL configurations.
Figure 18:
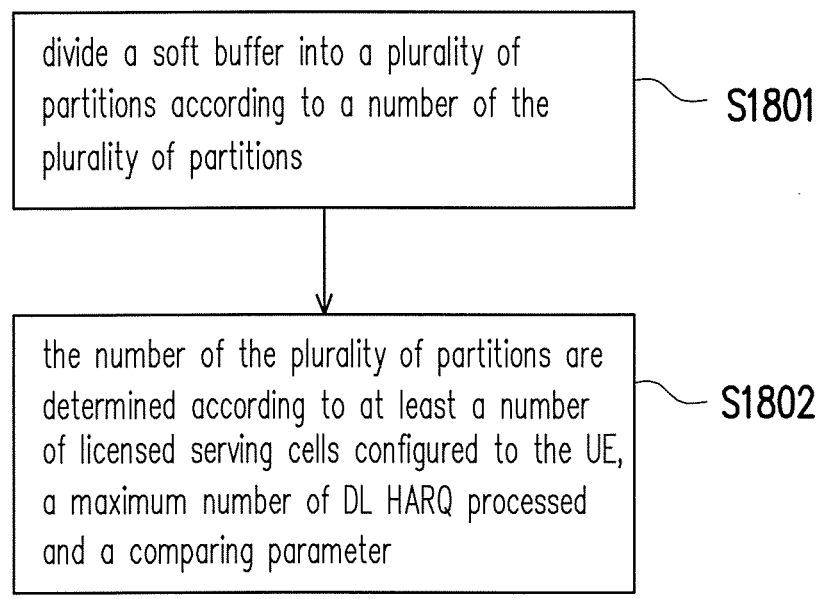
FIG. 18 is a flow chart which illustrates a method of partitioning a soft buffer in accordance with the third exemplary embodiment of the disclosure.

For the third exemplary embodiment, the soft buffer partition rule of FIG. 8 would be modified if a UE is configured with more than one serving cells for which at least one serving cell is deployed on a licensed spectrum and at least one serving cell is deployed on an unlicensed spectrum. For a legacy system, soft buffer is partitioned for each serving cell independently, and hence each serving cell has a dedicated sub-block of soft buffer. One of the differences between a legacy CA mechanism and the disclosure is premised upon the fact that the unlicensed serving cell is a contention-based transmission and the maximum transmission time on the unlicensed serving cell may be limited. Furthermore, DL HARQ process transmitted on the unlicensed serving cell may be an independent DL HARQ process of the unlicensed serving cell and/or an assisted DL HARQ process of the licensed serving cell. In this way, the unlicensed serving cell would not have a dedicated sub-block of soft buffer, and the LAA group should share the sub-block of a soft buffer (e.g., licensed and unlicensed serving cells of the LAA group share the same sub-block of a soft buffer). Therefore, while the UE is configured with more than one serving cell or if the UE is configured with a secondary cell group (SCG) in which at least one serving cell and/or cell group is deployed on unlicensed band, the soft buffer would be partitioned according to the number of licensed serving cells. Subsequently, while the UE is configured with more than one serving cell or if the UE is configured with a SCG in which at least one serving cell and/or cell group is deployed on unlicensed band, the soft buffer is partitioned according to the steps illustrated in FIG. 18.

In step S1801, a soft buffer is partitioned into a plurality of partitions according to a number of the plurality of partitions wherein a size of the soft buffer is $N_{soft}$.

In step S1802, the number of the plurality of partitions are determined according to at least a number of licensed serving cells configured to the UE ($N_{licensed\ cells}^{DL}$), a maximum number of DL HARQ processes ($M_{DL\_HARQ}$) and a comparing parameter ($M_{limit}$).

The $M_{DL\_HARQ}$ parameter could be determined according to the DL-reference UL/DL configuration of the licensed serving cell, and/or $M_{DL\_HARQ}$ could be determined according to the mechanism as proposed in the second exemplary embodiment if the licensed serving cell assists at least one unlicensed serving cell.

$M_{limit}$ is a constant or a configurable parameter. The disclosure proposes $M_{limit}$ to be modified from the legacy system based on the followings.

$M_{limit}$ could be set to equal to K if the licensed serving cell assists at least one unlicensed serving cell wherein K≥8. For example, as shown in FIG. 19A, if the licensed serving cell assists at least one unlicensed serving cell 1901 is determined to be a yes, then $M_{limit}$ is equal to 12; otherwise, $M_{limit}$ is equal 8.

$M_{limit}$ may also be determined according to the number of unlicensed serving cells ($N_{unlicensed\ cells}^{DL}$) in a LAA group 1902. For example, as shown in FIG. 19B, if the number of unlicensed serving cells in a LAA group 1902 is 1, then $M_{limit}$ is 12; if the number of unlicensed serving cells in a LAA group 1902 is 2, then $M_{limit}$ is 16; and if the number of unlicensed serving cells in a LAA group 1902 is 3 or larger, then $M_{limit}$ is 20.

$M_{limit}$ could be configured by a network via higher layer signaling (e.g., radio resource control (RRC), system information block (SIB), or master information block (MIB)) or physical layer signaling (e.g., downlink control information (DCI)).

$M_{limit}$ may also be determined according to the traffic load of the LAA group. For example, as shown in FIG. 19C, $M_{limit}$ could be determined according to the traffic load of the unlicensed serving cell of the LAA group 1903. If the traffic load of the unlicensed serving cell of the LAA group 1903 belongs to the highest category (e.g., high 1904), then $M_{limit}$ is set to be 16; If the traffic load of the unlicensed serving cell of the LAA group 1903 belongs to a medium category (e.g., medium 1905), then $M_{limit}$ is set to be 12; If the traffic load of the unlicensed serving cell of the LAA group 1903 belongs to the lowest category (e.g., low 1906), then $M_{limit}$ is set to be 8.

$M_{limit}$ may also be determined according to traffic load of the unlicensed serving cell of the LAA group and the number of unlicensed serving cells of the LAA group by combining the concept of FIG. 19B and FIG. 19C. The combined diagram is shown in FIG. 19D. The utilization of such diagram is the combination of FIG. 19B and FIG. 19C and thus a repetition of description would not be required.

$M_{limit}$ may also be determined according to the congestion rate of the unlicensed serving cell in the LAA group. $M_{limit}$ could be determined according to FIG. 19E. The utilization of such diagram would be self-explanatory.

As an example, if a UE is configured with $N_{license\ cells}^{DL}$ licensed serving cells and $N_{unlicensed\ cells}^{DL}$ unlicensed serving cells, the soft buffer is partitioned into a plurality of partitions wherein a size of the plurality of partitions are determined according to $$\left\lfloor \frac{N_{soft}}{N_{licensed\ cells}^{DL} \cdot K_{MIMO} \cdot \min(M_{DL\_HARQ}, M_{limit})} \right\rfloor$$

wherein $N_{soft}$ is a size of the soft buffer, $N_{licensed\ cells}^{DL}$ is the number of licensed serving cells configured to the UE, $M_{DL\_HARQ}$ is a maximum number of DL HARQ processes, $M_{limit}$ is a comparing parameter and $K_{MIMO}$ is a maximum number of transport blocks transmittable to the UE in the TTI of a serving cell. For each licensed serving cell and/or LAA group, up to the lesser of or $\min(M_{DL\_HARQ}, M_{limit})$ HARQ processes could be stored in the soft buffer, and the soft buffer size for each HARQ process is at least $$\left\lfloor \frac{N_{soft}}{N_{licensed\ cells}^{DL} \cdot \min(M_{DL\_HARQ}, M_{limit})} \right\rfloor$$

soft channel bits. Furthermore, for each transport block within the HARQ process, the soft buffer size for each HARQ process is $$\left\lfloor \frac{N_{soft}}{N_{licensed\ cells}^{DL} \cdot K_{MIMO} \cdot \min(M_{DL\_HARQ}, M_{limit})} \right\rfloor$$

soft channel bits.

For example, $N_{soft}$ may be divided into multiple partitions for storing soft channel bits according to the following equation:

$$n_{SB} = \min\left( N_{cb}, \left\lfloor \frac{N_{soft}}{C \cdot N_{licensed\ cells}^{DL} \cdot K_{MIMO} \cdot \min(M_{DL\_HARQ}, M_{limit})} \right\rfloor \right) \quad \text{equation 2}$$

For FDD, TDD and FDD-TDD, if the UE is configured with more than one serving cell or if the UE is configured with a SCG, then for each serving cell, for at least $(K_{MIMO} \cdot \min(M_{DL\_HARQ}, M_{limit}))$ transport blocks, upon decoding failure of a code block of a transport block, the UE shall store received soft channel bits corresponding to a range of at least $n_{SB}$ soft channel bits, where:

C is the number of code blocks of the transport block (TB).

$N_{cb}$ is the size of code block of the transport block (TB).

$K_{MIMO}$ is the maximum number of transport blocks transmittable to the UE in the TTI of the serving cell.

$M_{limit}$ is a positive value as introduced previously.

$M_{DL\_HARQ}$ is the maximum number of DL HARQ processes determined according to the DL-reference UL/DL configuration of the licensed serving cell, and/or determined according to a value introduced in the second exemplary embodiment if the licensed serving cell assists at least one unlicensed serving cell.

$N_{licensed\ cells}^{DL}$ is the number of configured licensed serving cells across both a mandatory cell group (MCG) and a SCG if the UE is configured with a SCG; otherwise, $N_{licensed\ cells}^{DL}$ is the number of configured licensed serving cells.

$\min(M_{DL\_HARQ}, M_{limit})$ compares between $M_{DL\_HARQ}$ and $M_{limit}$ and returns the smaller one of $M_{DL\_HARQ}$ and $M_{limit}$ $$\left\lfloor \frac{N_{soft}}{N_{licensed\ cells}^{DL} \cdot K_{MIMO} \cdot \min(M_{DL\_HARQ}, M_{limit})} \right\rfloor$$

returns the largest integer not greater than $$\frac{N_{soft}}{N_{licensed\ cells}^{DL} \cdot K_{MIMO} \cdot \min(M_{DL\_HARQ}, M_{limit})}.$$

Figure 20:
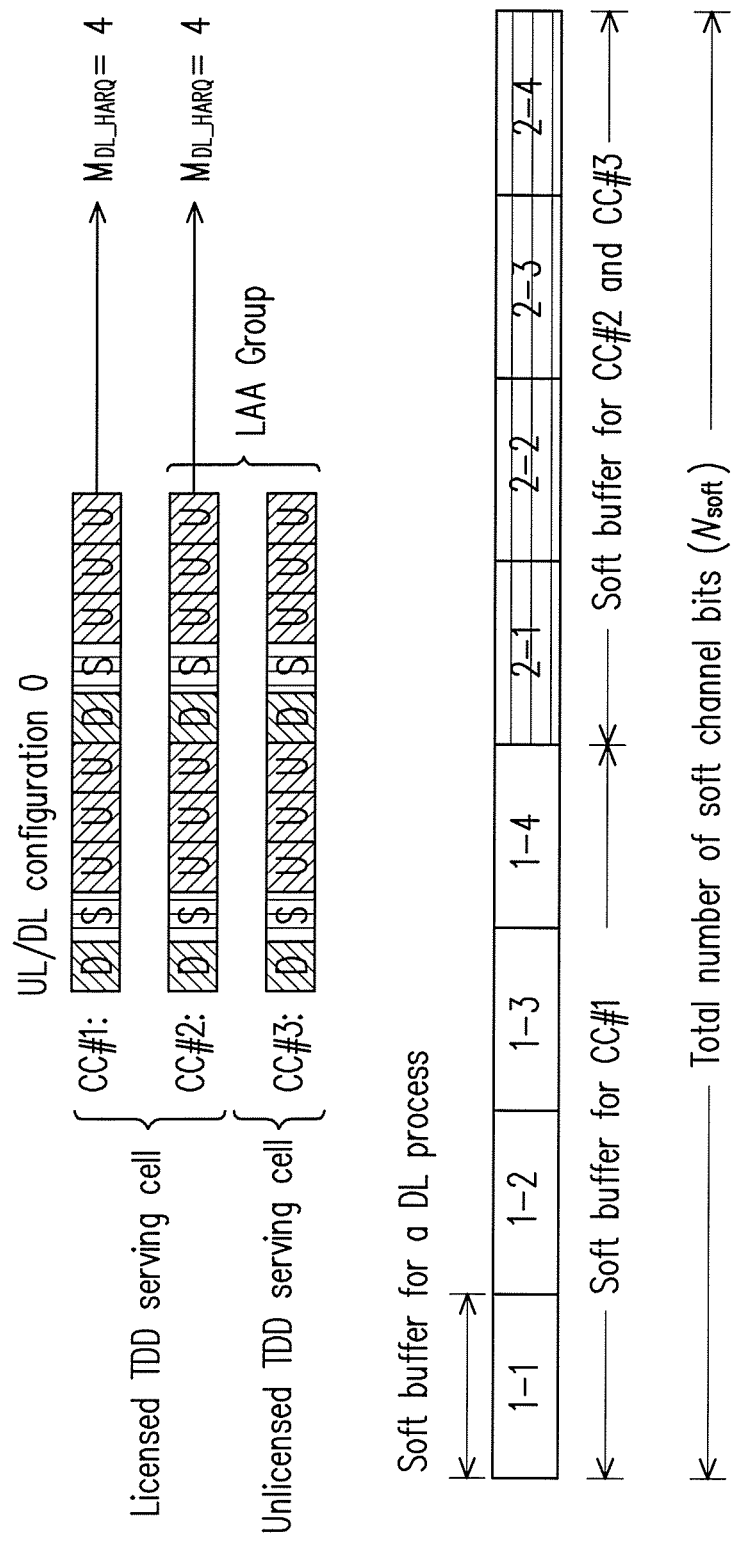
FIG. 20 illustrates an example of configuring two licensed TDD serving cells and an unlicensed TDD serving cell in which one of the licensed TDD serving cells assists the TDD unlicensed serving cell and both of the two licensed TDD serving cells are configured with TDD UL/DL configuration 0 in accordance with the third exemplary embodiment of the disclosure.

FIG. 20~FIG. 23 illustrates various examples of the third proposed exemplary embodiment. FIG. 20 illustrates a first example of the third exemplary embodiment of soft buffer partitioning when UE is configured with two TDD licensed serving cells ($N_{license\ cells}^{DL}=2$) operating with component carrier (CC) #1 and CC#2 as shown in FIG. 20 and a TDD unlicensed serving cell ($N_{unlicensed\ cells}^{DL}=1$) operating with CC#3 where one of the TDD licensed serving cell assists the TDD unlicensed serving cell. Together, the TDD licensed serving cell CC#2 and the unlicensed serving cell CC#3 form a LAA group. In this example, the maximum number of DL HARQ processes ($M_{DL\_HARQ}$) is determined according to the DL-reference UL/DL configuration of the licensed serving cell. Since each serving cell is configured with UL/DL configuration 0, the DL-reference UL/DL configuration of the licensed serving cell is UL/DL configuration 0. In other words, $M_{DL\_HARQ}$ is determined according to the UL/DL configuration 0 and is equal to 4 for the licensed serving cells. Therefore, the soft buffer is partitioned by applying the concept of FIG. 18.

In step S1801, a soft buffer is partitioned into a plurality of partitions according to a number of the plurality of partitions wherein a size of the soft buffer is $N_{soft}$.

In step S1802, the number of the plurality of partitions is determined at least according to a number of licensed serving cells ($N_{license\ cells}^{DL}=2$), a maximum number of DL HARQ processes ($M_{DL\_HARQ}=4$) and a comparing parameter $M_{limit}$. Moreover, the soft buffer is divided into $N_{license\ cells}^{DL}$ sub-blocks of soft buffer. And each sub-block of soft buffer is divided into $\min(M_{DL\_HARQ}, M_{limit})$ partitions for a HARQ process wherein each partition for a HARQ process with a size $$\left\lfloor \frac{N_{soft}}{N_{licensed\ cells}^{DL} \cdot \min(M_{DL\_HARQ}, M_{limit})} \right\rfloor = \left\lfloor \frac{N_{soft}}{2 \cdot \min(M_{DL\_HARQ}, M_{limit})} \right\rfloor$$

wherein in this example, $M_{DL\_HARQ}$ is determined according to the DL-reference UL/DL configuration of the licensed serving cell ($M_{DL\_HARQ}$=4). In this example, $M_{limit}$ is equal to 8. Therefore, each partition for a HARQ process with a size $$\left\lfloor \frac{N_{soft}}{N_{licensed\ cells}^{DL} \cdot \min(M_{DL_{HARQ}}, M_{limit})} \right\rfloor = \left\lfloor \frac{N_{soft}}{2 \cdot \min(4, 8)} \right\rfloor = \left\lfloor \frac{N_{soft}}{8} \right\rfloor.$$

As the result of the soft buffer partitioning, the entire soft buffer is divided into 8 partitions where partitions 1-1, 1-2, 1-3, and 1-4 are for CC#1, and 2-1, 2-2, 2-3, and 2-4 are shared between CC#2 and CC#3.

Figure 21:
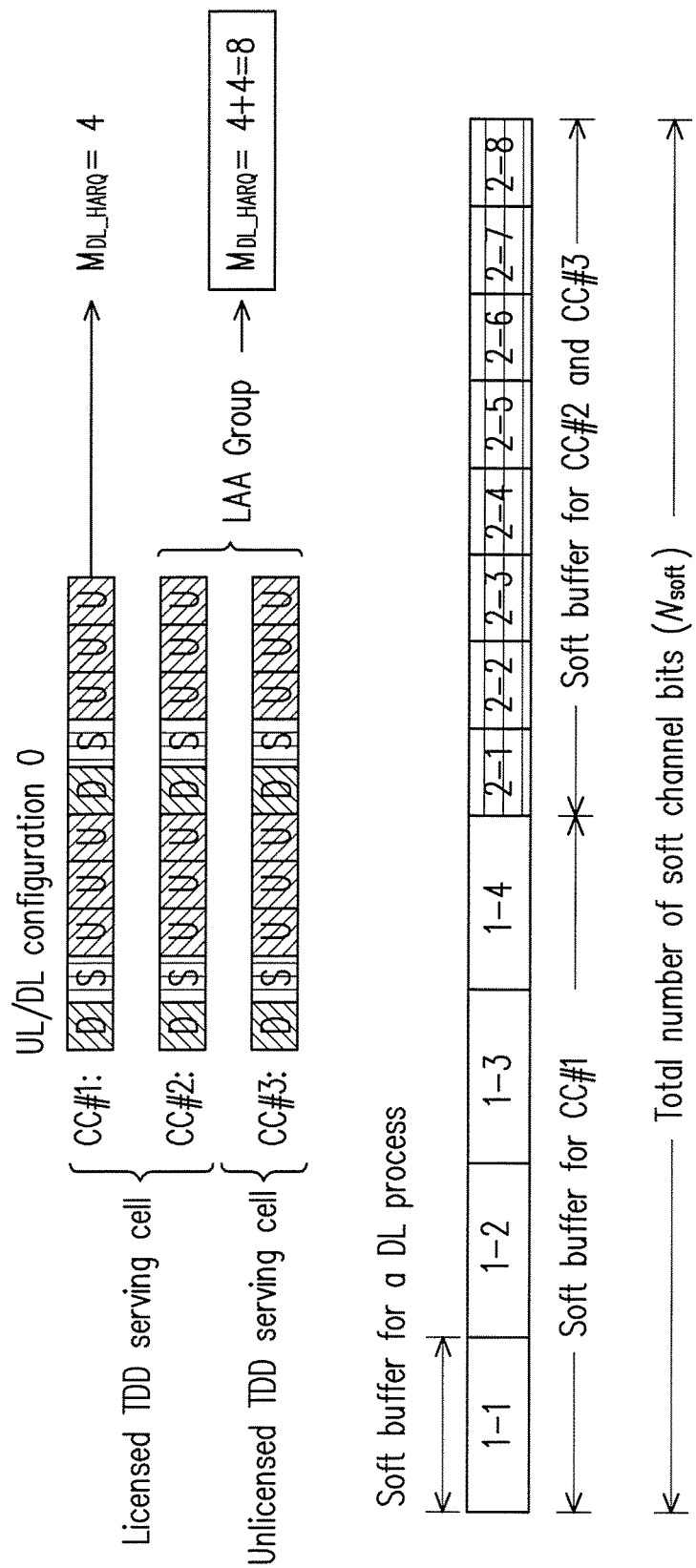
FIG. 21 illustrates an example of configuring two licensed TDD serving cells and an unlicensed TDD serving cell in which one of the licensed TDD serving cells assists the unlicensed TDD serving cell and both of the two licensed TDD serving cells are configured with TDD UL/DL configuration 0 in accordance with the third exemplary embodiment of the disclosure.

FIG. 21 illustrates a second example of the third exemplary embodiment of soft buffer partitioning when UE is configured with two TDD licensed serving cells ($N_{licensed\ cells}^{DL}$=2) operating with CC#1 and CC#2 and a TDD unlicensed serving cell ($N_{unlicensed\ cells}^{DL}$=1) operating with CC#3 where one of the TDD licensed serving cell assists the TDD unlicensed serving cell, and the TDD licensed serving cell CC#2 and the unlicensed TDD serving cell CC#3 form a LAA group. In this example, the maximum number of DL HARQ processes ($M_{DL\_HARQ}$) is determined according to a value introduced in the second exemplary embodiment if the licensed serving cell assists the unlicensed serving cell. Since each serving cell is configured with UL/DL configuration 0, the maximum number of DL HARQ processes ($M_{DL\_HARQ}$) of the licensed serving cell CC#1 would be determined according to its DL-reference UL/DL configuration and the maximum number of DL HARQ processes ($M_{DL\_HARQ}$) of the LAA group (CC#2 and CC#3) would be determined according to the illustrated example of FIG. 17C. In other words, $M_{DL\_HARQ}$=4 for CC#1 and $M_{DL\_HARQ}$=8 for the LAA group (CC#2 and CC#3). Therefore, the soft buffer is partitioned as follows by applying the concept of FIG. 18.

In step 1801, at least one sub-block of the soft buffer is divided into a plurality of partitions according to the number of the plurality of partitions.

In step S1802, the number of the plurality of partitions is determined at least according to a number of licensed serving cells ($N_{licensed\ cells}^{DL}$=2), a maximum number of DL HARQ processes ($M_{DL\_HARQ}$) and a parameter $M_{limit}$. Moreover, the soft buffer is divided into $N_{licensed\ cells}^{DL}$ sub-blocks of soft buffer. And each sub-block of soft buffer is divided into min($M_{DL\_HARQ}$, $M_{limit}$) partitions for a HARQ process wherein each partition for a HARQ process with a size $$\left\lfloor \frac{N_{soft}}{N_{licensed\ cells}^{DL} \cdot \min(M_{DL\_HARQ}, M_{limit})} \right\rfloor = \left\lfloor \frac{N_{soft}}{2 \cdot \min(M_{DL\_HARQ}, M_{limit})} \right\rfloor$$

wherein in this example, $M_{DL\_HARQ}$=4 for CC#1 and $M_{DL\_HARQ}$=8 for the LAA group (CC#2 and CC#3). In this example, $M_{limit}$ is equal to 8. Therefore, for CC#1, each partition for a HARQ process with a size $$\left\lfloor \frac{N_{soft}}{N_{licensed\ cells}^{DL} \cdot \min(M_{DL_{HARQ}}, M_{limit})} \right\rfloor = \left\lfloor \frac{N_{soft}}{2 \cdot \min(4, 8)} \right\rfloor = \left\lfloor \frac{N_{soft}}{8} \right\rfloor.$$

For the LAA group (CC#2 and CC#3), $$\left\lfloor \frac{N_{soft}}{N_{licensed\ cells}^{DL} \cdot \min(M_{DL_{HARQ}}, M_{limit})} \right\rfloor = \left\lfloor \frac{N_{soft}}{2 \cdot \min(8, 8)} \right\rfloor = \left\lfloor \frac{N_{soft}}{16} \right\rfloor.$$

As the result of the partitions, partitions 1-1, 1-2, 1-3, and 1-4 are allocated for CC#1, and partition 2-1, 2-2, 2-3, 2-4, 2-5, 2-6, 2-7, and 2-8 are allocated for and shared between CC#2 and CC#3. The licensed serving cell and the unlicensed serving cell would share the same partition space.

Figure 4A:
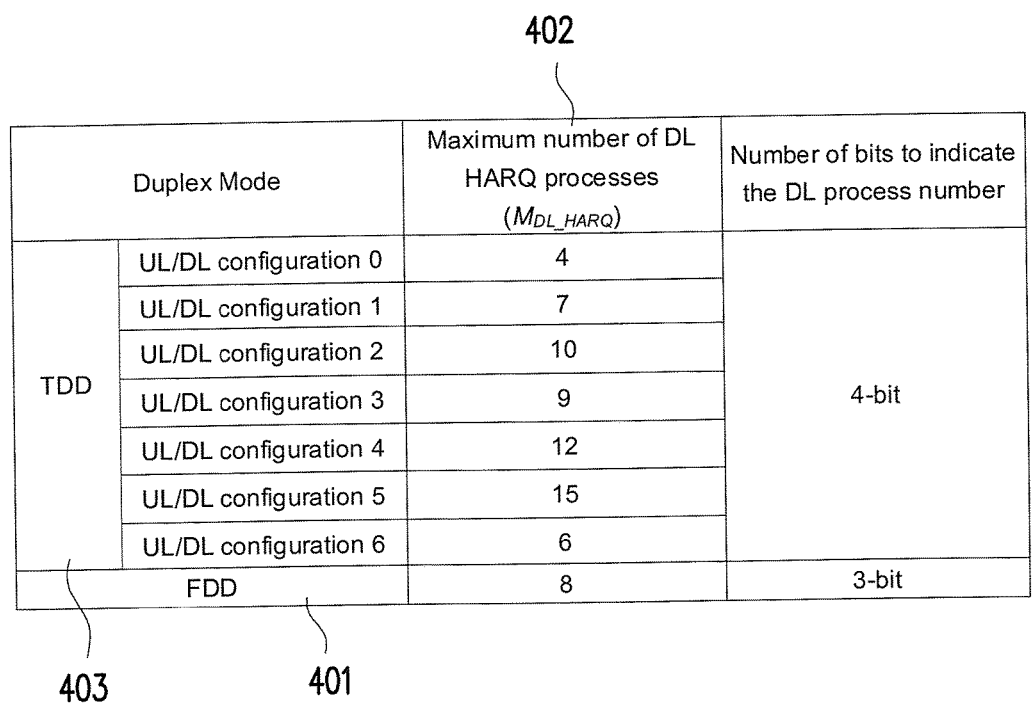
FIG. 4A illustrates maximum number of DL HARQ processes and the number of bits to indicate the DL HARQ process number for TDD and FDD duplex mode.
Figure 4B:
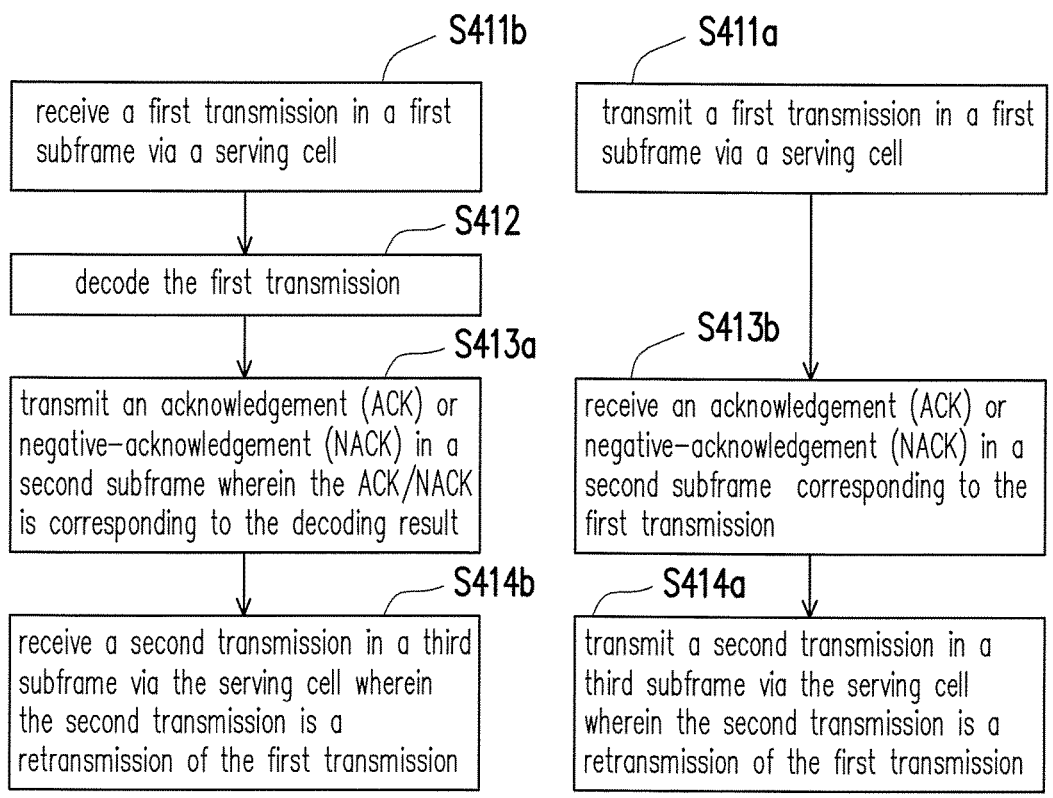
FIG. 4B illustrates a current LTE HARQ ACK or NACK (ACK/NACK) feedback process.
Figure 5A:
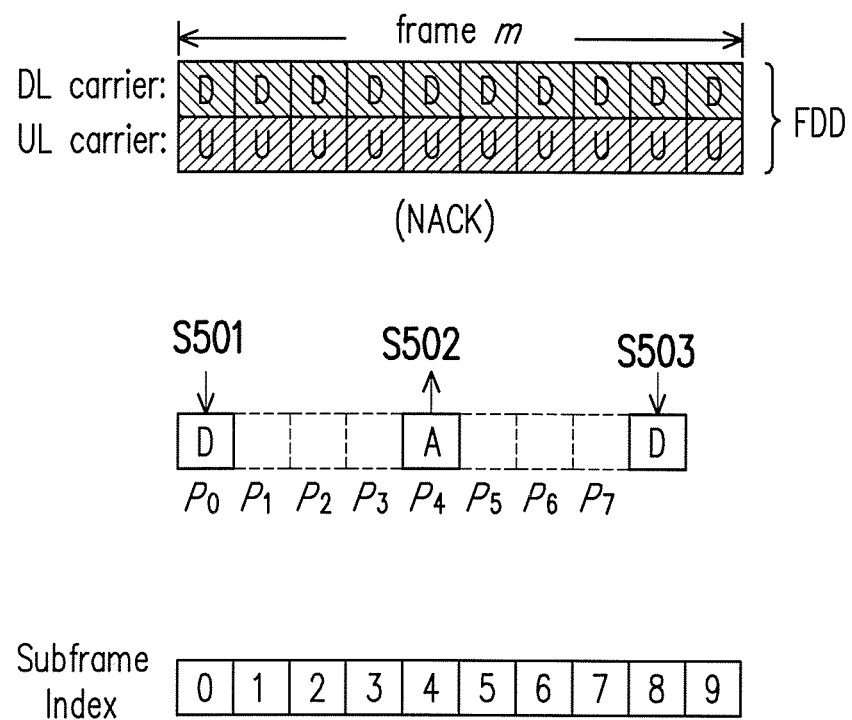
FIG. 5A illustrates an example of the maximum number of DL HARQ processes in FDD mode.
Figure 5B:
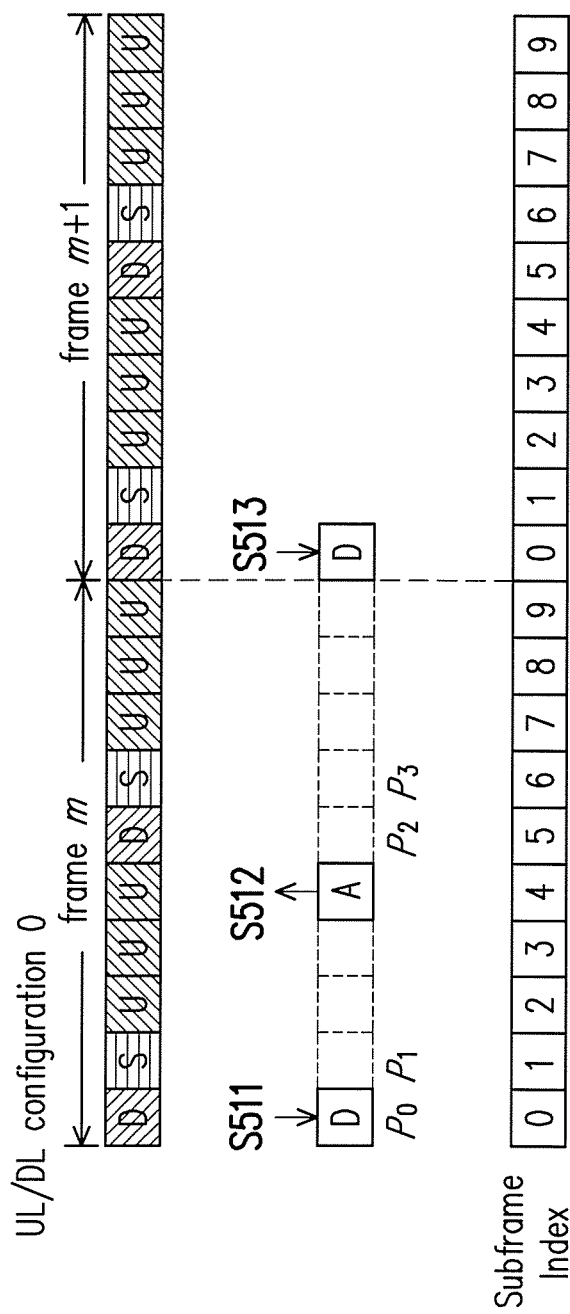
FIG. 5B illustrates an example of the maximum number of DL HARQ processes in TDD mode in UL/DL configuration 0.
Figure 5C:
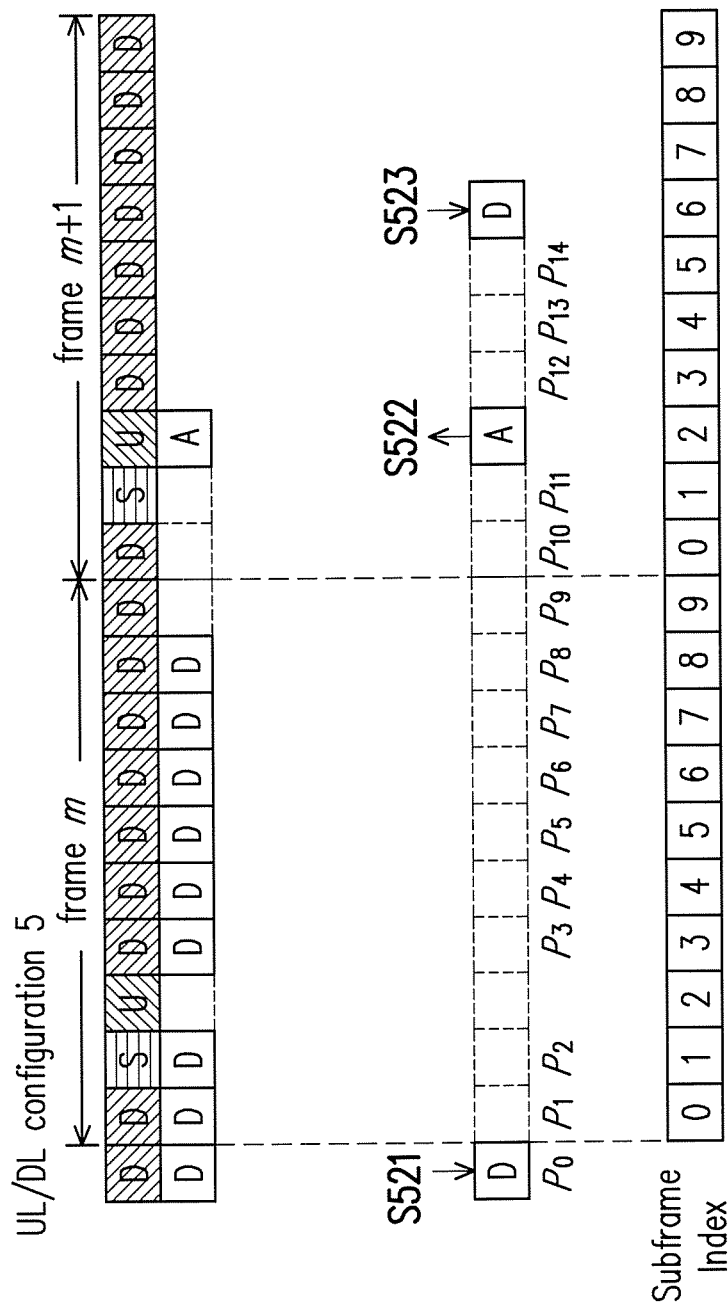
FIG. 5C illustrates an example of the maximum number of DL HARQ processes in TDD mode in UL/DL configuration 5.
Figure 6A:
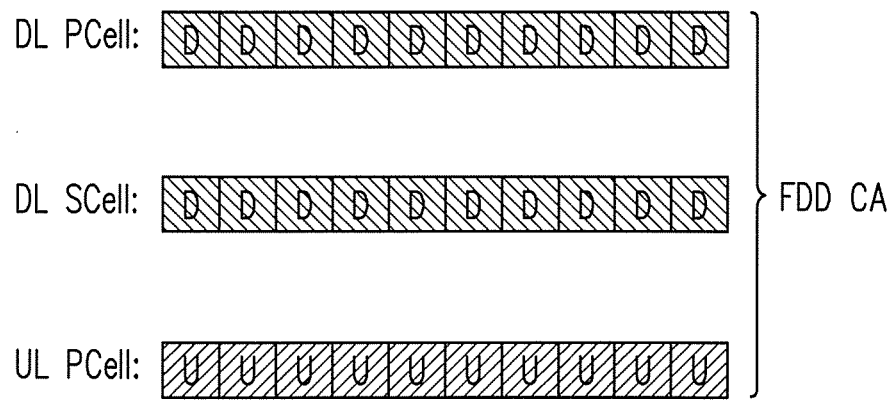
FIG. 6A illustrates an example of CA in FDD mode.
Figure 6B:
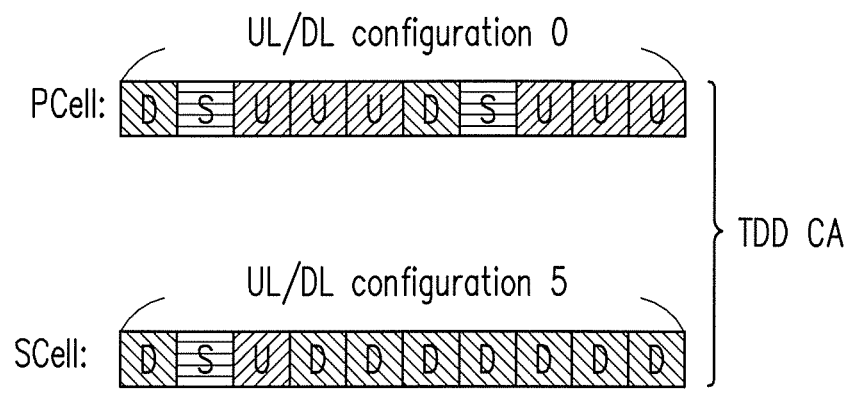
FIG. 6B illustrates and example of CA in TDD mode.
Figure 22:
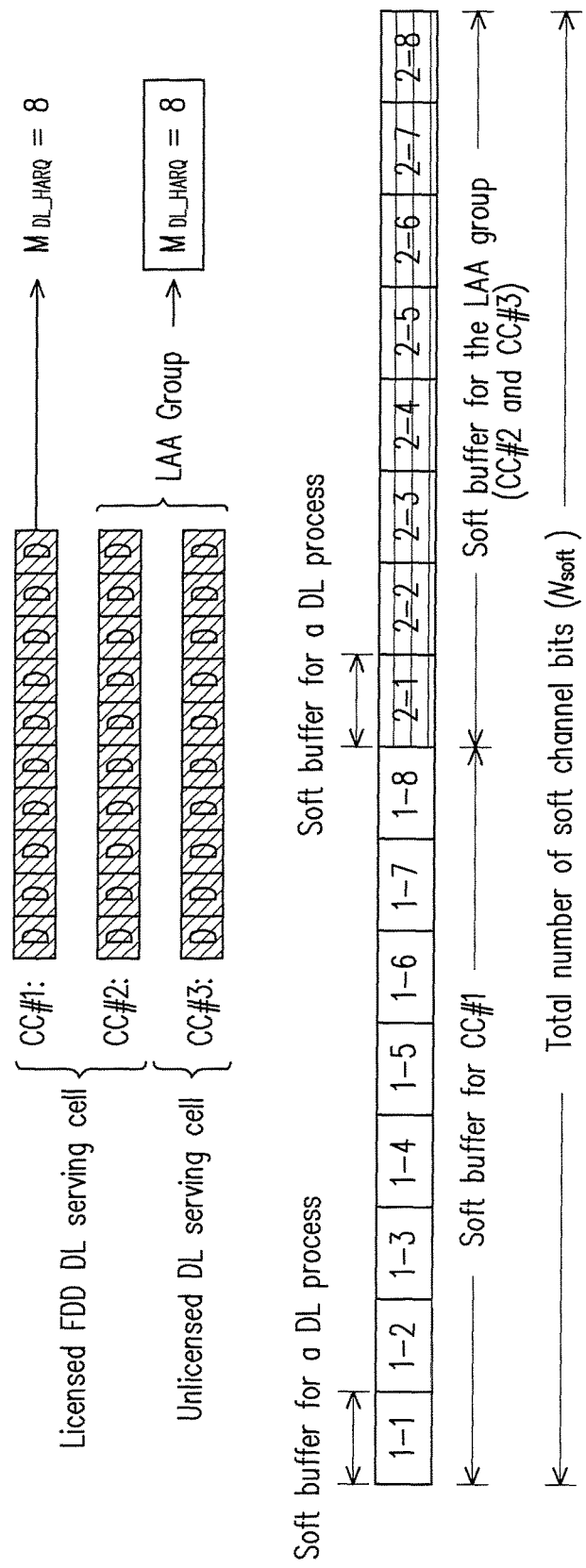
FIG. 22 illustrates an example of configuring two licensed FDD DL serving cells and an unlicensed FDD DL serving cell in which one of the licensed FDD DL serving cells assists the unlicensed FDD DL serving cell in accordance with the third exemplary embodiment of the disclosure.

FIG. 22 illustrates a third example of the third exemplary embodiment of soft buffer partitioning when UE is configured with two FDD licensed serving cells ($N_{licensed\ cells}^{DL}$=2) operating with CC#1 and CC#2 and an all DL unlicensed serving cell ($N_{unlicensed\ cells}^{DL}$=1) operating with CC#3. In this example, the maximum number of DL HARQ processes ($M_{DL\_HARQ}$) is determined according to a value introduced in the second exemplary embodiment if the licensed serving cell assists the unlicensed serving cell; hence, the maximum number of DL HARQ processes ($M_{DL\_HARQ}$) of the licensed serving cell CC#1 and the LAA group (CC#2 and CC#3) are determined according to FDD's rule as shown in FIG. 4. In other words, $M_{DL\_HARQ}$=8 for CC#1 and the LAA group (CC#2 and CC#3). Therefore, the soft buffer is partitioned by applying the concept of FIG. 18.

In step S1801, a soft buffer is partitioned into a plurality of partitions according to a number of the plurality of partitions wherein a size of the soft buffer is $N_{soft}$.

In step S1802, the number of the plurality of partitions is determined at least according to a number of licensed serving cells ($N_{licensed\ cells}^{DL}$=2), a maximum number of DL HARQ processes ($M_{DL\_HARQ}$) and a comparing parameter $M_{limit}$. Moreover, the soft buffer is divided into $N_{licensed\ cells}^{DL}$ sub-blocks of soft butter. And each sub-block of soft butter is divided into min($M_{DL\_HARQ}$, $M_{limit}$) partitions for a HARQ process wherein each partition for a HARQ process with a size $$\left\lfloor \frac{N_{soft}}{N_{licensed\ cells}^{DL} \cdot \min(M_{DL\_HARQ}, M_{limit})} \right\rfloor = \left\lfloor \frac{N_{soft}}{2 \cdot \min(M_{DL\_HARQ}, M_{limit})} \right\rfloor$$

wherein in this example, $M_{DL\_HARQ}$=8 for CC#1 and the LAA group (CC#2 and CC#3). In this example, $M_{limit}$ is equal to 8. Therefore, for CC#1, each partition for a HARQ process with a $$\text{size} \left\lfloor \frac{N_{soft}}{N_{licensed\ cells}^{DL} \cdot \min(M_{DL_{HARQ}}, M_{limit})} \right\rfloor = \left\lfloor \frac{N_{soft}}{2 \cdot \min(8, 8)} \right\rfloor = \left\lfloor \frac{N_{soft}}{16} \right\rfloor.$$

For the LAA group (CC#2 and CC#3), $$\left\lfloor \frac{N_{soft}}{N_{licensed\ cells}^{DL} \cdot \min(M_{DL_{HARQ}}, M_{limit})} \right\rfloor = \left\lfloor \frac{N_{soft}}{2 \cdot \min(8, 8)} \right\rfloor = \left\lfloor \frac{N_{soft}}{16} \right\rfloor.$$

As the result of the partitions, partitions 1-1, 1-2, 1-3, 1-4, 1-5, 1-6, 1-7, and 1-8 are allocated for CC#1, and partition 2-1, 2-2, 2-3, 2-4, 2-5, 2-6, 2-7, and 2-8 are allocated for and shared between CC#2 and CC#3. The licensed serving cell and the unlicensed serving cell would share the same partition space.

Figure 23:
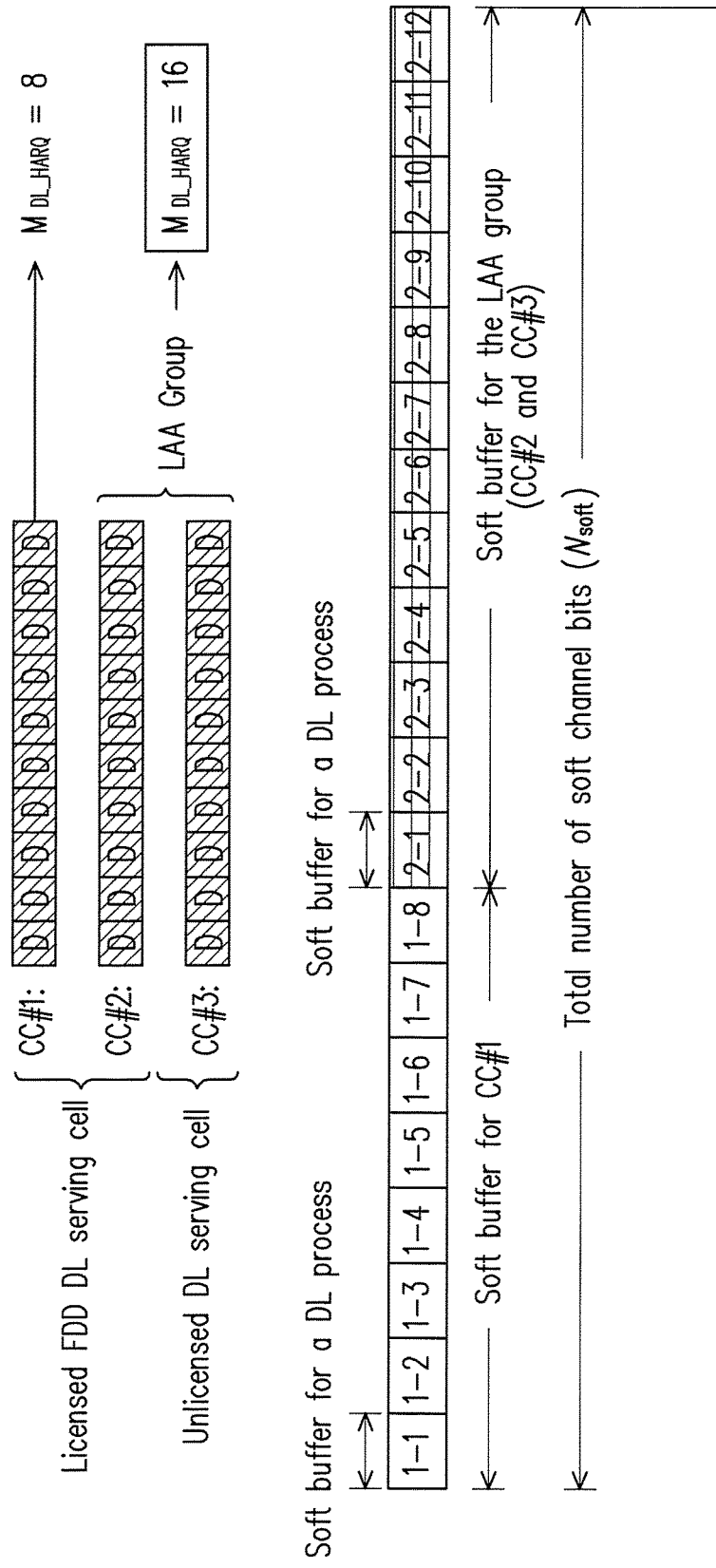
FIG. 23 illustrates an example of configuring two licensed FDD DL serving cells and an unlicensed FDD DL serving cell in which one of the licensed FDD DL serving cells assists the unlicensed FDD DL serving cell in accordance with the third exemplary embodiment of the disclosure.

FIG. 23 illustrates a fourth example of the third exemplary embodiment of soft buffer partitioning when UE is configured with two FDD licensed serving cells ($N_{licensed\ cells}^{DL}$=2) operating with CC#1 and CC#2, and an all DL unlicensed serving cell ($N_{unlicensed\ cells}^{DL}$=1) operating with CC#3. In this example, the maximum number of DL HARQ processes ($M_{DL\_HARQ}$) is determined according to a value introduced in the second exemplary embodiment if the licensed serving cell assists the unlicensed serving cell, and hence, the maximum number of DL HARQ processes ($M_{DL\_HARQ}$) of the licensed serving cell CC#1 is determined according to FDD's rule as shown in FIG. 4A and the maximum number of DL HARQ processes ($M_{DL\_HARQ}$) of the LAA group (CC#2 and CC#3) is determined according to the illustrated example of FIG. 17A. In other words, $M_{DL\_HARQ}=8$ for CC#1 and $M_{DL\_HARQ}=16$ for the LAA group (CC#2 and CC#3). Therefore, the soft buffer is partitioned by applying the concept of FIG. 18.

In step S1801, a soft buffer is partitioned into a plurality of partitions according to a number of the plurality of partitions wherein a size of the soft buffer is $N_{soft}$.

In step S1802, the number of the plurality of partitions is determined at least according to a number of licensed serving cells ($N_{licensed\ cells}^{DL}=2$), a maximum number of DL HARQ processes ($M_{DL\_HARQ}$) and a comparing parameter $M_{limit}$. Moreover, the soft buffer is divided into $N_{licensed\ cells}^{DL}$ sub-blocks of soft buffer. And each sub-block of soft buffer is divided into $\min(M_{DL\_HARQ}, M_{limit})$ partitions for a HARQ process wherein each partition for a HARQ process with a size $$\left\lfloor \frac{N_{soft}}{N_{licensed\ cells}^{DL} \cdot \min(M_{DL\_HARQ}, M_{limit})} \right\rfloor = \left\lfloor \frac{N_{soft}}{2 \cdot \min(M_{DL\_HARQ}, M_{limit})} \right\rfloor$$

wherein $M_{DL\_HARQ}=8$ for CC#1 and $M_{DL\_HARQ}=16$ for the LAA group (CC#2 and CC#3). In this example, $M_{limit}$ is determined according to FIG. 19A. Hence, $M_{limit}$ is equal to 8 for CC#1 and $M_{limit}$ is equal to 12 for the LAA group (CC#2 and CC#3).

Therefore, each partition for a HARQ process with a size $$\left\lfloor \frac{N_{soft}}{N_{cells}^{DL} \cdot \min(M_{DL_{HARQ}}, M_{limit})} \right\rfloor = \left\lfloor \frac{N_{soft}}{N_{licensed\ cells}^{DL} \cdot \min(M_{DL_{HARQ}}, M_{limit})} \right\rfloor.$$

For CC#1, the partition size is $$\left\lfloor \frac{N_{soft}}{2 \cdot \min(8, 8)} \right\rfloor = \left\lfloor \frac{N_{soft}}{16} \right\rfloor.$$

For the LAA group (CC#2 and CC#3), the partition size is $$\left\lfloor \frac{N_{soft}}{2 \cdot \min(16, 12)} \right\rfloor = \left\lfloor \frac{N_{soft}}{24} \right\rfloor.$$

As the result of the partitions, partitions 1-1, 1-2, 1-3, 1-4, 1-5, 1-6, 1-7, and 1-8 are allocated for CC#1, and partition 2-1, 2-2, 2-3, 2-4, 2-5, 2-6, 2-7, 2-8, 2-9, 2-10, 2-11, and 2-12 are allocated for and shared between CC#2 and CC#3. The licensed serving cell and the unlicensed serving cell would share the same partition space.

The disclosure proposes a fourth exemplary embodiment of determining the HARQ ACK or NACK (ACK/NACK) feedback timeline. Conventionally, a UE may transmit PDSCH HARQ ACK/NACK in subframe number n to report a PDSCH transmission indicated by a corresponding PDCCH within subframe number n−k where k∈K and k is a positive integer as stated in Table 10.1.3.1-1 in TS 36.213.

For serving cell C, a UE would transmit PDSCH HARQ ACK/NACK in subframe n to report a PDSCH transmission indicated by a corresponding PDCCH within subframe n−k where where k∈$K_C$. $K_C$ is determined according to its DL-reference UL-DL configuration and subframe number. For PCell, DL-reference UL/DL configuration is PCell's configuration. For SCell, DL-reference UL/DL configuration is determined according to table 10.2-1 in TS 36.213. The DL-reference UL/DL configuration for serving cell based on pair formed of a primary cell UL/DL configuration and a secondary cell UL/DL configuration is stated in Table 10.2-1 in TS 36.213. For example, when a UE is configured with 2 serving cells in which the PCell is configured with UL/DL configuration 0 and SCell is configured with UL/DL configuration 5, then for PCell, PDSCH HARQ ACK/NACK follows UL/DL configuration 0 and for SCell, PDSCH HARQ ACK/NACK feedback timeline follows UL/DL configuration. However, in order to hasten the feedback of DL HARQ ACK/NACK and to re-balance the uplink control overhead, the disclosure proposes new guideline to modify the DL HARQ ACK/NACK feedback timeline of a LAA group as well as to modify existing downlink association set indexes for various UL/DL configurations.

In the fourth exemplary embodiment, the DL hybrid automatic response request acknowledgment or negative-acknowledgment (HARQ ACK or NACK) feedback timeline is modified if the retransmission can be transmitted in the other serving cell.

For a legacy CA system, the DL HARQ ACK or NACK (ACK/NACK) feedback timeline which corresponds to a DL HARQ process that has been received in a serving cell is determined according the serving cell's DL-reference UL/DL configuration. If at least one serving cell is configured with a different UL/DL configuration, the at least one serving cell would have a different DL-reference UL/DL configuration. In this way, DL HARQ ACK/NACK feedback timeline of PCell and SCell could be different for a legacy TDD CA system. For the fourth exemplary embodiment, because different UL/DL configurations are configured to different serving cells, the DL HARQ ACK/NACK feedback corresponding to the same subframe may be transmitted on different subframe.

One difference between the fourth exemplary embodiment and the legacy CA mechanism is that if a licensed serving cell which is non-contention based assists at least one unlicensed serving cell which is contention-based, DL HARQ process transmitted on the unlicensed serving cell may be an independent DL HARQ process of the unlicensed serving cell and/or an assisted DL HARQ process of the licensed serving cell. Therefore, for a LAA group, DL HARQ ACK/NACK feedback corresponding to the same subframe is expected to be transmitted on the same subframe. Thus, while the UE is configured with more than one serving cell or if the UE is configured with a secondary cell group (SCG) where at least one serving cell and/or cell group is deployed on unlicensed band, the DL HARQ ACK/NACK feedback timeline of the LAA group would modified accordingly as the following three rules:

The first rule is that, if a subframe n is a downlink subframe for both licensed and unlicensed serving cell, the corresponding DL HARQ ACK/NACK feedback is transmitted by a UE in the same UL subframe.

The second rule is that, the DL HARQ ACK/NACK corresponding to the DL subframes of the unlicensed serving cell is uniformly distributed over the UL subframes of the licensed serving cells as much as possible.

The third rule is that, the DL HARQ ACK/NACK feedback corresponding to the DL subframe n of the unlicensed serving cell is transmitted on the uplink subframe which is closest to subframe n+c where c is a constant such as, for example, c=4.

Figure 24:
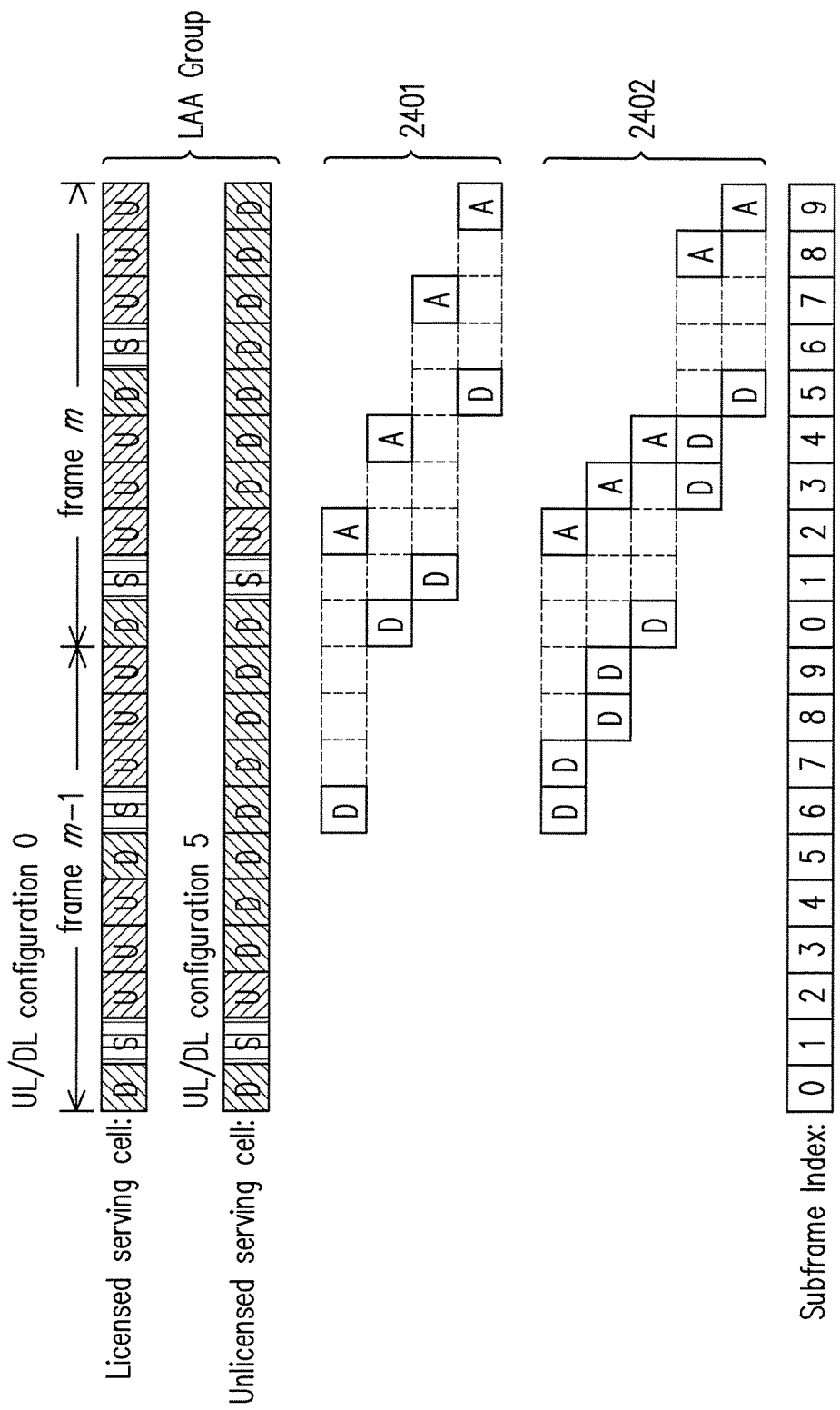
FIG. 24 illustrates an example of handling HARQ ACK or NACK (ACK/NACK) feedback timeline for TDD interband CA system in accordance with a fourth exemplary embodiment of the disclosure where the licensed serving cell is configured with UL/DL configuration 0 and unlicensed serving cell is configured with UL/DL configuration 5.

FIG. 24 illustrates the application of the above mentioned rules in an example of a DL HARQ ACK/NACK feedback timeline of the proposed fourth exemplary embodiment which assumes a TDD CA system where the licensed serving cell is configured with UL/DL configuration 0 and the unlicensed serving cell is configured with UL/DL configuration 5. Thus, DL-reference UL/DL configuration of the licensed serving cell is UL/DL configuration 0 and DL-reference configuration of the unlicensed serving cell is determined by downlink association set index $K_0$, as shown in FIG. 25 which is a modified version of a downlink associated set index chart. In this scenario, the DL HARQ ACK/NACK feedback corresponding to the same subframe may be transmitted on different subframe. In one embodiment, since a UE may receive DL HARQ process in subframe 0 of frame m of both serving cells, the UE may transmit the corresponding DL HARQ ACK/NACK feedback of the both serving cells' DL HARQ process on subframe 4 of frame m.

It could be noticed that the proposed DL HARQ ACK/NACK feedback timeline of the unlicensed serving cell in a LAA group is different from a conventional inter-band CA communication system. In the conventional inter-band CA communication system, if a downlink transmission is received in subframe 9 of frame m−1 as well as subframe 0, 1, 3, 4, 5, 6, 7, 8 of frame m, the corresponding ACK/NACK would only be transmitted in subframe 2 of frame m+1. For the DL HARQ ACK/NACK feedback timeline 2401 of the licensed serving cell, the PDSCH HARQ ACK/NACK feedback timeline follows UL/DL configuration 0 as shown in FIG. 24. However, according to the fourth exemplary embodiment, the DL HARQ ACK/NACK feedback timeline 2402 of the unlicensed serving cell is different. In FIG. 24, if HARQ ACK/NACK is transmitted in subframe index 2 of frame m, the corresponding downlink transmission would have been received in subframe 6 and/or 7 of frame m−1; if HARQ ACK/NACK is transmitted in subframe index 3 of frame m, the corresponding downlink transmission would have been received in subframe 8 and/or 9 of frame m−1; if HARQ ACK/NACK is transmitted in subframe index 4 of frame m, a downlink transmission would have been received in subframe 0 of frame m; if HARQ ACK/NACK is transmitted in subframe index 8 of frame m, the corresponding downlink transmission would have been received in subframe 3 and/or 4 in frame m; and if HARQ ACK/NACK is transmitted in subframe index 9 of frame m, the corresponding downlink transmission would have been received in subframe 5 of frame m.

Therefore, for the unlicensed serving cell in the LAA group, the DL HARQ ACK/NACK feedback timeline could be modified according to the above mentioned rules where the DL HARQ ACK/NACK feedback timeline is determined according to the downlink association set index. For a UE configured with at least one licensed TDD serving cell and at least one unlicensed TDD serving cell, a UE would transmit a DL HARQ ACK/NACK feedback in response to at least one DL PDSCH transmission in subframe n to report DL HARQ transmission indicated by a corresponding DL control channel (e.g., PDCCH or ePDCCH) within subframe n−k where k∈$K_i$ related to its UL/DL configuration of the unlicensed serving cell and i is related to the UL/DL configuration of the licensed serving cell. For example, when the licensed serving cell is configured with TDD UL/DL configuration i, the downlink association set index of the unlicensed serving cell is determined by $K_i$. In general, the application of the three rules above would require the downlink association set index ($K_i$) to be modified when the licensed serving cell is configured with UL/DL configurations 0, 1, 2, 3, 4, 5, and 6. The modifications are shown in the following figures.

FIG. 26 illustrates downlink association set index {$k_0$, $k_1$, ..., $k_{M-1}$} when the licensed serving cell is configured with UL/DL configuration 1. FIG. 27 illustrates Downlink association set index $K_2$: {$k_0$, $k_1$, ..., $k_{M-1}$} when the licensed serving cell is configured with UL/DL configuration 2. FIG. 28 illustrates Downlink association set index $K_3$: {$k_0$, $k_1$, ..., $k_{M-1}$} when the licensed serving cell is configured with UL/DL configuration 3. FIG. 29 illustrates Downlink association set index $K_4$: {$k_0$, $k_1$, ..., $k_{M-1}$} when the licensed serving cell is configured with UL/DL configuration 4. FIG. 30 illustrates Downlink association set index $K_5$: {$k_0$, $k_1$, ..., $k_{M-1}$} when the licensed serving cell is configured with UL/DL configuration 5. FIG. 31 illustrates Downlink association set index $K_6$: {$k_0$, $k_1$, ..., $k_{M-1}$} when the licensed serving cell is configured with UL/DL configuration 6.

For CA enhancement, data-offloading and coexistence with other unlicensed spectrum deployments will be increasingly important for the future LTE deployments in order to cope with increased throughput and capacity needs. Hence, for CA enhancement, at least one serving cell is deployed on unlicensed band which supports contention-based communication and at least one serving cell is deployed on licensed band which supports non-contention-based communication such as the LTE-LAA. The disclosure provides the mechanism to meet the realization of a communication operation of LTE-LAA.

In view of the aforementioned descriptions, the present disclosure is suitable for being used in a wireless communication system and is able to provide a method of handling communication operation in a communication system. If a licensed serving cell assists at least one unlicensed serving cell, the licensed and unlicensed serving cells may be considered as a licensed-assisted access (LAA) group.

In the first of the proposed exemplary embodiment, the disclosure proposes that the retransmission may be transmitted on one of the configured serving cell of the LAA group.

In the second of the proposed exemplary embodiment, the disclosure proposes that the maximum number of DL HARQ processes of a LAA group be jointly considered.

In the third of the proposed exemplary embodiment, the soft buffer partition mechanism is proposed for the licensed and unlicensed serving cells sharing the same sub-block of soft buffer. In this way, the partitions of the soft buffer could operate efficiently and the performance of HARQ retransmission could be increased.

In the fourth proposed exemplary embodiment, the DL HARQ ACK or NACK (ACK/NACK) feedback timeline of the LAA group and the corresponding downlink association set index are modified. In this way, the feedback of the DL HARQ ACK/NACK would occur as soon as possible, and the uplink control overhead would be properly balanced.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of handling a communication operation of a mobile device in a wireless communication system, applicable to the mobile device which is configured with a plurality of serving cells comprising a first serving cell and a second serving cell by a network of the wireless communication system, the method comprising:
  receiving a first transmission in a first subframe via the first serving cell and decoding the first transmission;
  generating a decoding result in response to decoding the first transmission;
  storing at least one soft channel bit of the first transmission in at least one partitions of a soft buffer if the first transmission is not successfully decoded, wherein the soft buffer is divided into the plurality of partitions according to at least $N_{soft}$, $N_{licensed\ cells}^{DL}$, $M_{DL\_HARQ}$, and $M_{limit}$, wherein $N_{soft}$ is a size of the soft buffer, $N_{licensed\ cells}^{DL}$ is a number of licensed serving cells configured to the mobile ceased cells device, $M_{DL\_HARQ}$ is a maximum number of DL HARQ processes and $M_{limit}$ is a constant or a configurable parameter, wherein $M_{limit}$ is determined according to at least one of the following:
    whether one of the licensed serving cells assists one of unlicensed serving cells;
    a number of unlicensed serving cells configured to the mobile device;
    a traffic load category of the one of the unlicensed serving cells;
    a congestion rate of the one of the unlicensed serving cells; and
    a permutation of the traffic load category and the number of the unlicensed serving cells;
  transmitting an acknowledgement (ACK) or negative-acknowledgement (NACK) in a second subframe, wherein the ACK or NACK corresponds to the decoding result; and
  receiving a second transmission in a third subframe via the second serving cell wherein the second transmission is a retransmission of the first transmission.

2. The method of claim 1, wherein the first serving cell is either a licensed serving cell or an unlicensed serving cell.

3. The method of claim 1, wherein the second serving cell is either a licensed serving cell or an unlicensed serving cell.

4. The method of claim 1, wherein the first serving cell and the second serving cell are either the same or different.

5. The method of claim 1, wherein the second subframe is after the first subframe.

6. The method of claim 1, the third subframe is after the second subframe.

7. The method of claim 1, wherein the soft buffer is divided according to:

$$\left\lfloor \frac{N_{soft}}{N_{licensed\ cells}^{DL} \cdot K_{MIMO} \cdot \min(M_{DL\_HARQ}, M_{limit})} \right\rfloor,$$

wherein $N_{soft}$ is a size of the soft buffer, $N_{licensed\ cells}^{DL}$ is a number of licensed serving cells configured to the mobile device, is a maximum number of DL HARQ processes, $M_{limit}$ is a constant or a configurable parameter, $K_{MIMO}$ is a maximum number of transport blocks transmittable to the mobile device per transmission time interval (TTI).

8. The method of claim 1, wherein $M_{limit}$ is 12 if the one of the licensed serving cells assists the one of the unlicensed serving cell.

9. The method of claim 1, wherein $M_{limit}$ is 12, 16, or 20 if the number of the unlicensed serving cells configured to the mobile device is 1, 2, or 3 respectively.

10. The method of claim 1, wherein $M_{limit}$ is 16, 12, and 8 if the traffic load category of the one of the unlicensed serving cells is high, medium, and low respectively.

11. The method of claim 1, wherein $M_{limit}$ is 8, 12, and 16 if the congestion rate of the one of the unlicensed serving cells is high, medium, and low respectively.

12. The method of claim 1, wherein $M_{limit}$ is configured by a network via higher layer signaling or physical layer signaling.

13. The method of claim 12, the higher layer signaling is transmitted by radio resource control (RRC), system information block (SIB) or master information block (MIB).

14. The method of claim 12, the physical layer signaling is transmitted by downlink control information (DCI).

15. The method of claim 1, wherein the first serving cell and the second serving cell share a $M_{DL\_HARQ}$.

16. The method of claim 15, wherein if the first serving cell is a frequency domain duplexing (FDD) DL serving cell and the second serving cell is an all DL serving cell, then the $M_{DL\_HARQ}$ is 16.

17. The method of claim 16, wherein if the mobile device is further configured with a third serving cell, then the $M_{DL\_HARQ\ is}$ 24.

18. The method of claim 15, wherein if both the first serving cell and the second serving cell are configured with uplink (UL)/DL configuration of 0, then the $M_{DL\_HARQ}$ is 8.

19. The method of claim 15, wherein if both the first serving cell and the second serving cell are configured with UL/DL configuration 5 then the $M_{DL\_HARQ}$ is 30.

20. The method of claim 15, wherein if the first serving cell is configured with UL/DL configuration of 0 and the second serving cell is configured with UL/DL configuration of 5, then the $M_{DL\_HARQ}$ is 13.

21. The method of claim 15, wherein if the first serving cell is configured with UL/DL configuration of 0 and the second serving cell is an all DL serving cell then the $M_{DL\_HARQ}$ is 14.

22. The method of claim 15, wherein if the first serving cell is configured as a FDD DL serving cell and the second serving cell is configured with UL/DL configuration 0 then the $M_{DL\_HARQ}$ is 12.

23. The method of claim 1, wherein if the second subframe is a subframe with subframe number n, the first subframe is a subframe with subframe number n−k where k is a positive integer.

24. The method of claim 23, wherein k is a constant.

25. The method of claim 23, wherein k∈K and K is a downlink association set index comprising at least one element.

26. The method of claim 25, wherein if the first serving cell is configured with UL/DL configuration 0, the downlink association set index (K) is determined according to a table below:

| Second serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 6 | 4 | 4 | — | — | 6 | 4 | 4 |
| 2 | — | — | 6 | 5, 4 | 4 | — | — | 6 | 5, 4 | 4 |
| 3 | — | — | 6, 5 | 5, 4 | 4 | — | — | 6 | — | 4 |
| 4 | — | — | 6, 5 | 5, 4 | 4 | — | — | 6 | 4 | 4 |
| 5 | — | — | 6, 5 | 5, 4 | 4 | — | — | 6 | 5, 4 | 4 |
| 6 | — | — | 6 | 4 | 4 | — | — | 6 | — | 4. |

27. The method of claim 25, wherein if the first serving cell is configured with UL/DL configuration 1, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 7, 6 | — | — | — | — | 7, 6 | — | — |
| 1 | — | — | 7, 6 | 4 | — | — | — | 7, 6 | 4 | — |
| 2 | — | — | 7, 6 | 5, 4 | — | — | — | 7, 6 | 5, 4 | — |
| 3 | — | — | 7, 6 | 6, 5, 4 | — | — | — | 7, 6 | — | — |
| 4 | — | — | 7, 6 | 6, 5, 4 | — | — | — | 7, 6 | 4 | — |
| 5 | — | — | 7, 6 | 6, 5, 4 | — | — | — | 7, 6 | 6, 5, 4 | — |
| 6 | — | — | 7, 6 | 4 | — | — | — | 7, 6 | — | —. |

28. The method of claim 25, wherein if the first serving cell is configured with UL/DL configuration 2, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 7, 6 | — | — | — | — | 7, 6 | — | — |
| 1 | — | — | 8, 7, 6 | — | — | — | — | 8, 7, 6 | — | — |
| 2 | — | — | 8, 7, 4, 6 | — | — | — | — | 8, 7, 4, 6 | — | — |
| 3 | — | — | 7, 6, 5, 4 | — | — | — | — | 8, 7, 6 | — | — |
| 4 | — | — | 8, 7, 6, 5, 4 | — | — | — | — | 8, 7, 6 | — | — |
| 5 | — | — | 8, 7, 6, 5, 4 | — | — | — | — | 8, 7, 6, 4 | — | — |
| 6 | — | — | 7, 6 | — | — | — | — | 8, 7, 6 | — | —. |

29. The method of claim 25, wherein if the first serving cell is configured with UL/DL configuration 3, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 11, 7, 6 | — | 4 | — | — | — | — | — |
| 1 | — | — | 11, 8, 7, 6 | — | 5, 4 | — | — | — | — | — |
| 2 | — | — | 11, 9, 8, 7, 6 | 5 | 5, 4 | — | — | — | — | — |
| 3 | — | — | 7, 6, 11 | 6, 5, 4 | — | — | — | — | — | — |
| 4 | — | — | 11, 8, 7, 6 | 6, 5, 4 | — | — | — | — | — | — |
| 5 | — | — | 11, 9, 8, 7, 6 | 6, 5, 4 | — | — | — | — | — | — |
| 6 | — | — | 11, 7, 6 | — | 5, 4 | — | — | — | — | —. |

30. The method of claim 25, wherein if the first serving cell is configured with UL/DL configuration 4, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 12, 11, 7 | 7 | — | — | — | — | — | — |
| 1 | — | — | 12, 11, 8, 7 | 7, 4 | — | — | — | — | — | — |
| 2 | — | — | 12, 11, 9, 8, 7 | 7, 5, 4 | — | — | — | — | — | — |
| 3 | — | — | 12, 11, 7 | 7, 6, 5, 4 | — | — | — | — | — | — |
| 4 | — | — | 12, 8, 7, 11 | 6, 5, 4, 7 | — | — | — | — | — | — |
| 5 | — | — | 12, 11, 9, 8, 7 | 7, 6, 5, 4 | — | — | — | — | — | — |
| 6 | — | — | 12, 11, 7 | 7, 4 | — | — | — | — | — | —. |

31. The method of claim 25, wherein if the first serving cell is configured with UL/DL configuration 5, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 12, 11, 7, 6, | — | — | — | — | — | — | — |
| 1 | — | — | 13, 12, 11, 8, 7, 6, | — | — | — | — | — | — | — |
| 2 | — | — | 13, 12, 11, 9, 8, 7, 6, 4 | — | — | — | — | — | — | — |
| 3 | — | — | 13, 12, 11, 7, 6, 5, 4 | — | — | — | — | — | — | — |
| 4 | — | — | 13, 12, 11, 8, 7, 6, 5, 4 | — | — | — | — | — | — | — |
| 5 | — | — | 13, 12, 9, , 8, 7 5, 4, 11, 6 | — | — | — | — | — | — | — |
| 6 | — | — | 13, 12, 11, 7, 6 | — | — | — | — | — | — | —. |

32. The method of claim 25, wherein if the first serving cell is configured with UL/DL configuration 6, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 7 | 7 | — | — | — | 7 | 7 | — |
| 1 | — | — | 8, 7 | 7 | 5 | — | — | 7 | 7 | — |

-continued

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 2 | — | — | 8, 7 | 7 | 6, 5 | — | — | 7 | 7, 5 | — |
| 3 | — | — | 7 | 7, 6 | 6, 5 | — | — | 7 | 7 | — |
| 4 | — | — | 8, 7 | 7, 6 | 6, 5 | — | — | 7 | 7 | — |
| 5 | — | — | 8, 7 | 7, 6 | 6, 5 | — | — | 7 | 7, 6, 5 | — |
| 6 | — | — | 7 | 7 | 5 | — | — | 7 | 7 | —. |

33. A method of handling a communication operation of a mobile device in a wireless communication system for a network of the wireless communication system, applicable to a network which configures the mobile device with a plurality of serving cells comprising a first serving cell and a second serving cell, the method comprising:
transmitting a first transmission in a first subframe via the first serving cell;
receiving an acknowledgement (ACK) or negative-acknowledgement (NACK) in a second subframe wherein the ACK or NACK is corresponding to the first transmission; and
transmitting a second transmission in a third subframe via the second serving cell wherein the second transmission is a retransmission of the first transmission, wherein if the second subframe is a subframe with subframe number n, the first subframe is a subframe with subframe number n−k where k is a positive integer; and k∈K, wherein K is a downlink association set index determined at least according to UL/DL configuration of the first serving cell and UL/DL configuration of the second serving cell.

34. The method of claim 33, wherein the first serving cell is either a licensed serving cell or an unlicensed serving cell.

35. The method of claim 33, wherein the second serving cell is either a licensed serving cell or an unlicensed serving cell.

36. The method of claim 33, the first serving cell and the second serving cell are the same or different.

37. The method of claim 33, the third subframe is after the second subframe.

38. The method of claim 33, wherein k is a constant.

39. The method of claim 33, wherein the downlink association set index (K) comprises at least one element.

40. The method of claim 39, wherein if the first serving cell is configured with UL/DL configuration 0, the downlink association set index (K) is determined according to a table below:

| Second serving cell's UL/DL Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 6 | 4 | 4 | — | — | 6 | 4 | 4 |
| 2 | — | — | 6 | 5, 4 | 4 | — | — | 6 | 5, 4 | 4 |
| 3 | — | — | 6, 5 | 5, 4 | 4 | — | — | 6 | — | 4 |
| 4 | — | — | 6, 5 | 5, 4 | 4 | — | — | 6 | 4 | 4 |
| 5 | — | — | 6, 5 | 5, 4 | 4 | — | — | 6 | 5, 4 | 4 |
| 6 | — | — | 6 | 4 | 4 | — | — | 6 | — | 4. |

41. The method of claim 39, wherein if the first serving cell is configured with UL/DL configuration 1, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 7, 6 | — | — | — | — | 7, 6 | — | — |
| 1 | — | — | 7, 6 | 4 | — | — | — | 7, 6 | 4 | — |
| 2 | — | — | 7, 6 | 5, 4 | — | — | — | 7, 6 | 5, 4 | — |
| 3 | — | — | 7, 6 6, 5, 4 | — | — | — | — | 7, 6 | — | — |
| 4 | — | — | 7, 6 6, 5, 4 | — | — | — | — | 7, 6 | 4 | — |
| 5 | — | — | 7, 6 6, 5, 4 | — | — | — | — | 7, 6 6, 5, 4 | — | — |
| 6 | — | — | 7, 6 | 4 | — | — | — | 7, 6 | — | —. |

42. The method of claim 39, wherein if the first serving cell is configured with UL/DL configuration 2, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 7, 6 | — | — | — | — | 7, 6 | — | — |
| 1 | — | — | 8, 7, 6 | — | — | — | — | 8, 7, 6 | — | — |
| 2 | — | — | 8, 7, 4, 6 | — | — | — | — | 8, 7, 4, 6 | — | — |
| 3 | — | — | 7, 6, 5, 4 | — | — | — | — | 8, 7, 6 | — | — |
| 4 | — | — | 8, 7, 6, 5, 4 | — | — | — | — | 8, 7, 6 | — | — |
| 5 | — | — | 8, 7, 6, 5, 4 | — | — | — | — | 8, 7, 6, 4 | — | — |
| 6 | — | — | 7, 6 | — | — | — | — | 8, 7, 6 | — | —. |

43. The method of claim 39, wherein if the first serving cell is configured with UL/DL configuration 3, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 11, 7, 6 | — | 4 | — | — | — | — | — |
| 1 | — | — | 11, 8, 7, 6 | — | 5, 4 | — | — | — | — | — |
| 2 | — | — | 11, 9, 8, 7, 6 | 5 | 5, 4 | — | — | — | — | — |
| 3 | — | — | 7, 6, 11 | 6, 5 | 5, 4 | — | — | — | — | — |
| 4 | — | — | 11, 8, 7, 6 | 6, 5 | 5, 4 | — | — | — | — | — |
| 5 | — | — | 11, 9, 8, 7, 6 | 6, 5 | 5, 4 | — | — | — | — | — |
| 6 | — | — | 11, 7, 6 | — | 5, 4 | — | — | — | — | —. |

44. The method of claim 39, wherein if the first serving cell is configured with UL/DL configuration 4, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 12, 11, 7 | 7 | — | — | — | — | — | — |
| 1 | — | — | 12, 11, 8, 7 | 7, 4 | — | — | — | — | — | — |
| 2 | — | — | 12, 11, 9, 8, 7 | 7, 5, 4 | — | — | — | — | — | — |
| 3 | — | — | 12, 11, 7 | 7, 6, 5, 4 | — | — | — | — | — | — |

-continued

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 12, 11, 9, 8, 7 | 7, 6, 5, 4 | — | — | — | — | — | — |
| 6 | — | — | 12, 11, 7 | 7, 4 | — | — | — | — | — | —. |

45. The method of claim 39, wherein if the first serving cell is configured with UL/DL configuration 5, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 12, 11, 7, 6, | — | — | — | — | — | — | — |
| 1 | — | — | 13, 12, 11, 8, 7, | — | — | — | — | — | — | — |
| 2 | — | — | 6, 13, 12, 11, 9, 8, 7, 6, 4 | — | — | — | — | — | — | — |
| 3 | — | — | 13, 12, 11, 7, 6, 5, 4 | — | — | — | — | — | — | — |
| 4 | — | — | 13, 12, 11, 8, 7, 6, 5, 4 | — | — | — | — | — | — | — |
| 5 | — | — | 13, 12, 9, 8, 7, 5, 4, 11, 6 | — | — | — | — | — | — | — |
| 6 | — | — | 13, 12, 11, 7, 6 | — | — | — | — | — | — | —. |

46. The method of claim 39, wherein if the first serving cell is configured with UL/DL configuration 6, the downlink association set index (K) is determined according to a table below:

| Second serving cell's UL/DL configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | — | — | 7 | 7 | — | — | — | 7 | 7 | — |
| 1 | — | — | 8, 7 | 7 | 5 | — | — | 7 | 7 | — |
| 2 | — | — | 8, 7 | 7 | 6, 5 | — | — | 7 | 7, 5 | — |
| 3 | — | — | 7 | 7, 6 | 6, 5 | — | — | 7 | 7 | — |
| 4 | — | — | 8, 7 | 7, 6 | 6, 5 | — | — | 7 | 7 | — |
| 5 | — | — | 8, 7 | 7, 6 | 6, 5 | — | — | 7 | 7, 6, 5 | — |
| 6 | — | — | 7 | 7 | 5 | — | — | 7 | 7 | —. |

* * * * *